United States Patent
Wang

(10) Patent No.: US 11,337,060 B2
(45) Date of Patent: May 17, 2022

(54) ELECTRONIC BUSINESS CARD PRIVACY PROTECTION SYSTEM PREVENTS DISPLAYING USER ACCOUNT INFORMATION

(71) Applicant: HUAWEI TECHNOLOGIES CO., LTD., Guangdong (CN)

(72) Inventor: Zhe Wang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 355 days.

(21) Appl. No.: 16/479,670

(22) PCT Filed: Jan. 19, 2018

(86) PCT No.: PCT/CN2018/073523
§ 371 (c)(1),
(2) Date: Jul. 22, 2019

(87) PCT Pub. No.: WO2018/133853
PCT Pub. Date: Jul. 26, 2018

(65) Prior Publication Data
US 2021/0368335 A1 Nov. 25, 2021

(30) Foreign Application Priority Data
Jan. 22, 2017 (CN) .......................... 201710047257.6

(51) Int. Cl.
*H04W 12/02* (2009.01)
*G06F 16/9535* (2019.01)
(Continued)

(52) U.S. Cl.
CPC .............. *H04W 12/02* (2013.01); *G06F 3/14* (2013.01); *G06F 16/9535* (2019.01);
(Continued)

(58) Field of Classification Search
CPC ...... G06F 3/14; G06F 3/0488; G06F 16/9535; G06F 21/34; G06Q 10/109; G06Q 20/325;
(Continued)

(56) References Cited

U.S. PATENT DOCUMENTS

2010/0302591 A1* 12/2010 Lapstun ............. H04N 1/32778
358/1.15
2011/0145049 A1* 6/2011 Hertel ................. G06Q 20/325
705/14.23
(Continued)

FOREIGN PATENT DOCUMENTS

| CN | 1862572 A | 11/2006 |
|----|-----------|---------|
| CN | 101360142 A | 2/2009 |

(Continued)

OTHER PUBLICATIONS

Extended European Search Report issued in European Application No. 18741424.8 dated Sep. 20, 2019, 6 pages.
(Continued)

*Primary Examiner* — Le H Luu
(74) *Attorney, Agent, or Firm* — Fish & Richardson P.C.

(57) ABSTRACT

Example communication methods and devices are described to reduce possibility that account information of a contact corresponding to an electronic business card is leaked. One example method includes receiving a first electronic business card sent by a second terminal. The first electronic business card is an electronic business card of a user corresponding to a client of a third terminal or a client of the second terminal. A first identifier used to identify an account of a user corresponding to the first electronic business card is displayed based on the first electronic business card. Displaying the first user account is skipped.

20 Claims, 43 Drawing Sheets

(51) Int. Cl.
  *G06F 3/14* (2006.01)
  *G06Q 10/10* (2012.01)
  *H04L 67/306* (2022.01)
  *H04W 12/08* (2021.01)
  *H04L 29/06* (2006.01)
  *H04M 1/2757* (2020.01)
  *H04W 4/16* (2009.01)

(52) U.S. Cl.
  CPC ....... *G06Q 10/109* (2013.01); *H04L 63/0407* (2013.01); *H04L 63/10* (2013.01); *H04L 67/306* (2013.01); *H04M 1/2757* (2020.01); *H04W 12/08* (2013.01); *H04W 4/16* (2013.01)

(58) Field of Classification Search
  CPC .......... G06Q 20/3676; G06Q 30/0241; G06Q 30/04; H04L 63/0407; H04L 63/10; H04L 67/306; H04L 51/16; H04M 1/2575; H04W 4/16; H04W 12/02; H04W 12/08; H04W 4/21; H04W 8/24; H04N 1/32778
  See application file for complete search history.

(56) References Cited

U.S. PATENT DOCUMENTS

| | | | | |
|---|---|---|---|---|
| 2012/0066757 A1* | 3/2012 | Vysogorets | ............. | G06F 21/34 726/9 |
| 2012/0330830 A1* | 12/2012 | Mason | ................... | G06Q 30/04 705/41 |
| 2013/0042110 A1* | 2/2013 | Shablygin | ............... | G06F 21/34 713/168 |
| 2013/0185368 A1 | 7/2013 | Nordstrom et al. | | |
| 2013/0303134 A1 | 11/2013 | Ramnani | | |
| 2014/0025519 A1* | 1/2014 | Thomas | .................. | H04L 51/16 705/21 |
| 2014/0047564 A1 | 2/2014 | McCann et al. | | |
| 2014/0066044 A1* | 3/2014 | Ramnani | ................. | H04W 8/24 455/418 |
| 2014/0256312 A1 | 9/2014 | Luo et al. | | |
| 2014/0351028 A1* | 11/2014 | Killoh | ................ | G06Q 30/0241 705/14.4 |
| 2015/0339667 A1* | 11/2015 | Dua | ................... | G06Q 20/3674 705/16 |
| 2016/0132608 A1* | 5/2016 | Rathod | ................... | H04W 4/21 707/722 |
| 2016/0259497 A1* | 9/2016 | Foss | ...................... | G06F 3/0488 |

FOREIGN PATENT DOCUMENTS

| | | |
|---|---|---|
| CN | 101399872 A | 4/2009 |
| CN | 103209113 A | 7/2013 |
| CN | 103618989 A | 3/2014 |
| CN | 105681176 A | 6/2016 |
| CN | 106804034 A | 6/2017 |

OTHER PUBLICATIONS

PCT International Search Report and Written Opinion in International Application No. PCT/CN2018/073,523 dated Apr. 4, 2018, 15 pages (With English Translation).

Office Action issued in Chinese Application No. 201880002113.1 dated Dec. 25, 2019, 35 pages (with English translation).

* cited by examiner (b)

(c)

ELECTRONIC BUSINESS CARD PRIVACY PROTECTION SYSTEM PREVENTS DISPLAYING USER ACCOUNT INFORMATION

CROSS-REFERENCE TO RELATED APPLICATIONS

This application is a National Stage of International Application No. PCT/CN2018/073523, filed on Jan. 19, 2018, which claims priority to Chinese Patent Application No. 201710047257.6, filed on Jan. 22, 2017. Both of the aforementioned applications are hereby incorporated by reference in their entireties.

TECHNICAL FIELD

This application relates to the field of communications technologies, and in particular, to a communication method and a device.

BACKGROUND

As informatization of the society develops, people pay increasing attention to information security. However, currently, rapid development of communications technologies greatly enhances information flowability and also increases possibility of information leakage. For example, when a person shares an electronic business card on an electronic terminal, individual private information such as a phone number and address information included in the electronic business card is easy to leak. If the electronic business card is leaked, the person may be harassed by various advertisements and fraud calls.

To avoid leakage of an electronic business card, a terminal may encrypt the to-be-shared electronic business card, and allow only an authorized user to obtain a key through a network to decrypt the encrypted electronic business card to obtain the decrypted electronic business card. However, in the foregoing solution, the electronic business card decrypted by the authorized user is probably leaked through screen capture or photographing.

SUMMARY

Embodiments of this application provide a communication method and a device, to reduce a possibility that account information of a contact corresponding to an electronic business card is leaked.

According to a first aspect, an embodiment of this application provides a communication method. The communication method includes: receiving, by a first terminal, a first electronic business card sent by a second terminal, where the first electronic business card is an electronic business card of a user corresponding to a client of a third terminal or a client of the second terminal; and displaying, based on the first electronic business card, a first identifier used to identify an account (that is, the first user account) of a user corresponding to the first electronic business card, but skipping displaying the first user account, where the first user account is the account of the user corresponding to the first electronic business card. In the communication method provided in this embodiment of this application, the first terminal cannot directly communicate, based on the first identifier, with a terminal of the user corresponding to the first user account, and instead, needs to obtain the first user account based on the first identifier, to communicate with the terminal of the user corresponding to the first user account.

After receiving the first electronic business card pushed by the second terminal, the first terminal may display only the identifier used to identify the first user account instead of displaying the first user account. In this way, even if another terminal steals the first electronic business card from the first terminal, the another terminal cannot display the first user account either. In addition, the same as that the first terminal cannot directly communicate, based on the first identifier, with the terminal of the user corresponding to the first user account, even if the another terminal steals the first electronic business card, the another terminal cannot directly communicate with the terminal of the user corresponding to the first user account either, and needs to obtain the first user account based on the first identifier, to communicate with the terminal of the user corresponding to the first user account. In this way, even if the electronic business card is leaked, a terminal stealing the electronic business card possibly cannot communicate with the terminal corresponding to the electronic business card. Therefore, the terminal corresponding to the electronic business card is less possible to receive harassment information or a harassment call.

In a possible design method of the first aspect, after displaying the first identifier based on the first electronic business card, in response to an operation performed by a user on a first interface including the first identifier, the first terminal may send a first communication message used to request to communicate with the terminal of the user corresponding to the first user account identified by the first identifier to a server, and display a second interface requested to communicate with the terminal of the user corresponding to the first user account. The first communication message includes the first identifier, and the first communication message may include any one of an instant messaging message, an email, and a voice call request.

In another possible design method of the first aspect, the first communication message is a voice call request, the first communication message further includes a second identifier used to identify a second user account, the second user account is an account of a user corresponding to a client of the first terminal, and the first identifier is different from the second identifier. After sending the first communication message, if the second user account identified by the second identifier is an authorized account of the first user account, the first terminal may receive the first user account sent by the server. A terminal of a user corresponding to the authorized account of the first user account has permission of communicating with the terminal of the user corresponding to the first user account. In response to receiving of the first user account, the first terminal may request, based on the first user account, to perform voice communication with the terminal of the user corresponding to the first user account.

Only when the second user account identified by the second identifier is an authorized account of the first user account, the server sends the first user account to the first terminal, and the first terminal can request, based on the first user account, to perform voice communication with the terminal of the user corresponding to the first user account. Therefore, the terminal corresponding to the first electronic business card can be less possible to receive harassment information or a harassment call.

In another possible design method of the first aspect, after requesting, based on the first user account, to perform voice communication with the terminal of the user corresponding to the first user account, to prevent the first user account in the first terminal from being stolen, the first terminal may delete the first user account.

In another possible design method of the first aspect, after sending the first communication message, if the second user account identified by the second identifier is a rejected account of the first user account, the first terminal may receive a communication failure message sent by the server, where the communication failure message is used to indicate that communication between the first terminal and the terminal of the user corresponding to the first user account fails. A terminal of a user corresponding to the rejected account of the first user account has no permission of communicating with the terminal of the user corresponding to the first user account. The first terminal may send first prompt information in response to receiving of the communication failure message, where the first prompt information is used to indicate that the communication between the first terminal and the terminal of the user corresponding to the first user account fails.

When the second user account identified by the second identifier is a rejected account of the first user account, the server sends the communication failure message to the first terminal, that is, the communication between the first terminal and the terminal of the user corresponding to the first user account fails. Therefore, the terminal corresponding to the first electronic business card can be less possible to receive harassment information or a harassment call.

In another possible design method of the first aspect, when another terminal (a terminal corresponding to a user account identified by a third identifier) requests to communicate with the first terminal, or a second electronic business card (that is, an electronic business card of the user corresponding to the client on the first terminal) is pushed to another terminal (the terminal corresponding to the user account identified by the third identifier), the first terminal receives an authorization request sent by the server to confirm with the first terminal whether to determine the user account identified by the third identifier as an authorized account of the second user account. The authorization request includes the third identifier. A terminal of a user corresponding to the authorized account of the second user account has permission of communicating with the first terminal. In response to receiving of the authorization request, the first terminal may display a third interface including an authorization acceptance option and an authorization rejection option, so that the user chooses whether to determine the user account identified by the third identifier as an authorized account of the second user account. In response to a selection operation performed by the user on the authorization acceptance option on the third interface, the first terminal sends a first authorization response to the server, to indicate that the first terminal allows determining the user account identified by the third identifier as an authorized account of the second user account. In response to a selection operation performed by the user on the authorization rejection option on the third interface, the first terminal sends a second authorization response to the server, to indicate that the first terminal rejects to determine the user account identified by the third identifier as an authorized account of the second user account.

In another possible design method of the first aspect, when the second electronic business card (that is, the electronic business card of the user corresponding to the client on the first terminal) is pushed to another terminal (a terminal corresponding to a user account identified by a fourth identifier), the first terminal receives a first notification message sent by the server. The first notification message includes the fourth identifier. The first notification message is used to indicate that the second identifier is pushed to the terminal of a user corresponding to the user account identified by the fourth identifier. The first terminal may send second prompt information in response to receiving of the first notification message, where the second prompt information is used to indicate that the second identifier is pushed to the terminal of the user corresponding to the user account identified by the fourth identifier.

In another possible design method of the first aspect, the first terminal may further manage authorized accounts and rejected accounts of the user account of the second terminal in batches. Specifically, the method in this embodiment of this application may further include: displaying, by the first terminal, a fourth interface including a plurality of identifiers stored in the first terminal, where each identifier is used to identify a user account; and in response to a first selection operation performed by the user on some of the plurality of identifiers and/or a second selection operation performed by the user on some of the plurality of identifiers, sending an authorization message including an authorization permission identifier and/or an authorization rejection identifier to the server, where the authorization permission identifier includes an identifier that is of the plurality of identifiers and that corresponds to the first selection operation, the authorization rejection identifier includes an identifier that is of the plurality of identifiers and that corresponds to the second selection operation, and the authorization permission identifier is different from the authorization rejection identifier.

In another possible design method of the first aspect, the first terminal may display the identifier corresponding to the first selection operation and the identifier corresponding to the second selection operation in different display manners, to distinguish the authorization identifier from the authorization rejection identifier and display an authorization relationship between the second user account and another account to the user. Specifically, the method in this embodiment of this application may further include: in response to the first selection operation, displaying, by the first terminal on the fourth interface in a first preset manner, the identifier corresponding to the first selection operation; and in response to the second selection operation, displaying, on the fourth interface in a second preset manner, the identifier corresponding to the second selection operation, where the first preset manner is different from the second preset manner.

In another possible design method of the first aspect, the first terminal may further push the electronic business card to another terminal. Specifically, the method in this embodiment of this application may further include: in response to a pushing operation performed by the user on a fifth interface including the second identifier, sending, by the first terminal, a second electronic business card including the second identifier to the second terminal.

According to a second aspect, an embodiment of this application provides a communication method. The communication method includes: receiving, by a server, a business card push message sent by a second terminal, where the business card push message is used to request to push a first electronic business card to a first terminal, the first electronic business card includes a first identifier used to identify a first user account, the first electronic business card is an electronic business card of a user corresponding to a client of a third terminal or a client of the second terminal, and the first user account is an account of the user corresponding to the first electronic business card; and sending, by the server, the first electronic business card to the first terminal in response to receiving of the business card push message. In the communication method provided in this embodiment of this application, the first terminal cannot directly communicate, based on the first identifier, with a terminal of the user corresponding to the first user account, and instead, needs to obtain the first user account based on the first identifier, to communicate with the terminal of the user corresponding to the first user account.

The first electronic business card that the second terminal requests the server to forward includes only the first identifier used to identify the first user account. In addition, even if the first terminal obtains the first electronic business card, the first terminal cannot directly communicate with the terminal of the user corresponding to the first user account either, and needs to obtain the first user account based on the first identifier, to communicate with the terminal of the user corresponding to the first user account. In this way, even if the electronic business card is leaked, a terminal stealing the electronic business card possibly cannot communicate with the terminal corresponding to the electronic business card. Therefore, the terminal corresponding to the electronic business card is less possible to receive harassment information or a harassment call.

In a possible design method of the second aspect, the business card push message further includes a second identifier, the second identifier is used to identify a second user account, the second user account is an account of a user corresponding to a client of the first terminal, and the first identifier is different from the second identifier.

In another possible design method of the second aspect, because the first electronic business card is the electronic business card of the user corresponding to the client of the third terminal or the client of the second terminal, in response to receiving of the business card push message, the server may determine whether the first electronic business card is the electronic business card of the user corresponding to the client of the second terminal. When the first electronic business card is the electronic business card of the user corresponding to the client of the second terminal, the server stores the second identifier in first authorization information of the first user account. The server stores first authorization information of a plurality of user accounts, the first authorization information of the first user account includes a plurality of authorization identifiers, each authorization identifier is used to identify an authorized account of the first user account, and a terminal of a user corresponding to the authorized account has permission of communicating with the terminal of the user corresponding to the first user account.

It may be understood that if the first electronic business card is the electronic business card of the user corresponding to the client of the second terminal, it indicates that the first electronic business card including the first identifier is sent by the terminal of the user corresponding to the first user account. The terminal of the user corresponding to the first user account actively pushes the first electronic business card to the first terminal, and it indicates that the terminal of the user corresponding to the first user account allows determining the second user account (that is, the user account corresponding to the second terminal) as an authorized account of the first user account. In this case, the server may store the second identifier in the first authorization information of the first user account. After the server stores the second identifier in the first authorization information of the first user account, the second user account identified by the second identifier becomes an authorized account of the first user account, and the first terminal corresponding to the second user account may have permission of communicating with the terminal of the user corresponding to the first user account.

Optionally, the first authorization information of a user account may include an identifier of an authorized account of the user account; or may not include an identifier of an authorized account of the user account and include an authorized account of the user account. This embodiment of this application sets no limit thereto.

In another possible design method of the second aspect, after the server sends the first electronic business card to the first terminal, the first terminal may send a first communication message used to request to communicate with the terminal of the user corresponding to the first user account identified by the first identifier. That is, the server receives the first communication message sent by the first terminal, where the first communication message includes the first identifier and the second identifier. In response to receiving of the first communication message, the server may query the first authorization information of the first user account identified by the first identifier, to determine whether the second user account identified by the second identifier is an authorized account of the first user account; and when the second user account is an authorized account of the first user account, the server obtains the first user account based on the first identifier, and provides, for the first terminal based on the first user account, a service of communicating with the terminal of the user corresponding to the first user account.

When the first authorization information of the first user account includes the second identifier or the second user account, it indicates that the second user account is an authorized account of the first user account; when the first authorization information of the first user account does not include the second identifier or the second user account, it indicates that the second user account is not an authorized account of the first user account. Only when the second user account is an authorized account of the first user account, the server provides, for the first terminal, the service of communicating with the terminal of the user corresponding to the first user account. Therefore, the terminal corresponding to the electronic business card can be less possible to receive harassment information or a harassment call.

In another possible design method of the second aspect, the server further stores second authorization information of a plurality of user accounts, second authorization information of the first user account includes a plurality of rejection identifiers, each rejection identifier is used to identify a rejected account of the first user account, and a terminal of a user corresponding to the rejected account has no permission of communicating with the terminal of the user corresponding to the first user account.

That the second user account is not an authorized account of the first user account includes the following two cases: (1) the second user account is a rejected account of the first user account; and (2) the second user account is neither an authorized account of the first user account nor a rejected account of the first user account. Therefore, when the second user account is not an authorized account of the first user account, the server may query the second authorization information of the first user account to determine whether the second user account is a rejected account of the first user account. When the second user account is not a rejected account of the first user account, the server sends an authorization request to the terminal of the user corresponding to the first user account, to confirm with the terminal of the user corresponding to the first user account whether to determine the second user account as an authorized account.

In an aspect, after the server sends the authorization request to the terminal of the user corresponding to the first user account, the user corresponding to the first user account may allow to determine the second user account as an authorized account. In this case, the server receives a first authorization response sent by the terminal of the user corresponding to the first user account, where the first authorization response indicates that the terminal of the user corresponding to the first user account allows determining the second user account as an authorized account; and in response to receiving of the first authorization response, the server obtains the first user account based on the first identifier, and provides, for the first terminal based on the first user account, the service of communicating with the terminal of the user corresponding to the first user account.

In another aspect, the user corresponding to the first user account may alternatively reject to determine the second user account as an authorized account. In this case, the server receives a second authorization response sent by the terminal of the user corresponding to the first user account, where the second authorization response indicates that the terminal of the user corresponding to the first user account rejects to determine the second user account as an authorized account. In response to receiving of the second authorization response, the server may send a communication failure message to the first terminal, to indicate that communication between the first terminal and the terminal of the user corresponding to the first user account fails.

Even if the first terminal obtains the first electronic business card, after the first terminal sends, to the server based on the first identifier, the first communication message used to request to communicate with the terminal of the user corresponding to the first user account, if the second user account is not an authorized terminal of the first user account, the first terminal cannot communicate with the terminal of the user corresponding to the first user account, and can communicate with the terminal of the user corresponding to the first user account only when obtaining authorization by the terminal of the user corresponding to the first user account. In this way, even if the electronic business card is leaked, a terminal stealing the electronic business card possibly cannot communicate with the terminal corresponding to the electronic business card. Therefore, the terminal corresponding to the electronic business card is less possible to receive harassment information or a harassment call.

In another possible design method of the second aspect, if the server receives the first authorization response, it indicates that the terminal of the user corresponding to the first user account allows determining the second user account as an authorized account. In this case, in response to receiving of the first authorization response, the server may store the second identifier in the first authorization information of the first user account, and determine the second user account as an authorized account of the first user account.

In another possible design method of the second aspect, if the server receives the second authorization response, it indicates that the terminal of the user corresponding to the first user account rejects to determine the second user account as an authorized account. In this case, in response to receiving of the second authorization response, the server may store the second identifier in the second authorization information of the first user account.

In another possible design method of the second aspect, when the second user account is a rejected account of the first user account, the server may send the communication failure message to the first terminal, where the communication failure message is used to indicate that the communication between the first terminal and the terminal of the user corresponding to the first user account fails.

In another possible design method of the second aspect, in response to receiving of the business card push message, when the first electronic business card is the electronic business card of the user corresponding to the client on the third terminal, the server sends a first notification message or an authorization request to the third terminal. For message descriptions of the first notification message and the authorization request, refer to related descriptions in other possible design methods of the second aspect, and details are not described herein again in this embodiment of this application.

In another possible design method of the second aspect, the terminal may further manage, in batches, authorized accounts and rejected accounts of a user account logged in to in the client of the terminal. Specifically, the method in this embodiment of this application may further include: receiving, by the server, an authorization message that is sent by the third terminal and that includes an authorization permission identifier and/or an authorization rejection identifier, where both the authorization permission identifier and the authorization rejection identifier are identifiers stored by the third terminal to identify user accounts, and the authorization permission identifier is different from the authorization rejection identifier; and in response to receiving of the authorization message, storing, by the server, the authorization permission identifier in first authorization information of an account of the user corresponding to the client on the third terminal, and storing the authorization rejection identifier in second authorization information of the account of the user corresponding to the client on the third terminal.

In this embodiment of this application, the third terminal may add different tags to the authorization permission identifier and the authorization rejection identifier, so that the server can recognize the authorization permission identifier and the authorization rejection identifier from the plurality of identifiers included in the authorization message.

It may be understood that the user not only may add an authorized account and a rejected account for the first user account, but also may modify an authorized account of the first user account to a rejected account and modify a rejected account of the first user account to an authorized account. In addition, one user account cannot be both an authorized account and a rejected account of the first user account. On this basis, in another possible design method of the first aspect, when the first authorization information includes the authorization rejection identifier, the server deletes the authorization rejection identifier from the first authorization information; when the second authorization information includes the authorization permission identifier, the server deletes the authorization permission identifier from the second authorization information.

In another possible design method of the second aspect, the first communication message includes an instant messaging message or an email. The providing, for the first terminal based on the first user account, a service of communicating with the terminal of the user corresponding to the first user account includes: forwarding, by the server based on the first user account, the first communication message to the terminal of the user corresponding to the first user account.

In another possible design method of the second aspect, the first communication message is a voice call request. The providing, for the first terminal based on the first user account, a service of communicating with the terminal of the user corresponding to the first user account includes: sending, by the server, the first user account to the first terminal, where the first user account is invisible to a user on the first terminal; and in response to receiving of a second communication message that is sent by the first terminal and that includes the first user account, initiating, by the server, voice paging to the terminal of the user corresponding to the first user account.

According to a third aspect, an embodiment of this application provides a terminal. The terminal is a first terminal, and the first terminal includes: a receiving unit, a display unit, and a communications unit. The receiving unit is configured to receive a first electronic business card sent by a second terminal, where the first electronic business card is an electronic business card of a user corresponding to a client of a third terminal or a client of the second terminal. The display unit is configured to: display a first identifier based on the first electronic business card, but skip displaying a first user account, where the first user account is an account of the user corresponding to the first electronic business card, and the first identifier is used to identify the first user account. The communications unit is configured to communicate with another terminal, where the communications unit cannot directly communicate, based on the first identifier, with a terminal of the user corresponding to the first user account, and instead, obtains the first user account based on the first identifier, to communicate with the terminal of the user corresponding to the first user account.

It should be noted that in this embodiment of this application, an authorization request, an authorization message, and a notification message (for example, a first notification message) may include only an identifier of a user account, and not include the user account.

In a possible design method of the third aspect, the first terminal further includes: a sending unit. The sending unit is configured to: after the display unit displays the first identifier based on the first electronic business card, send a first communication message to a server in response to an operation performed by a user on a first interface including the first identifier, where the first communication message includes the first identifier, the first communication message is used to request to communicate with the terminal of the user corresponding to the first user account identified by the first identifier, and the first communication message includes any one of an instant messaging message, an email, and a voice call request. The display unit is further configured to: display a second interface after the sending unit sends the first communication message, where the second interface is an interface on which the first terminal requests to communicate with the terminal of the user corresponding to the first user account.

In another possible design method of the third aspect, the first communication message sent by the sending unit is a voice call request, the first communication message further includes a second identifier, the second identifier is used to identify a second user account, the second user account is an account of a user corresponding to a client of the first terminal, and the first identifier is different from the second identifier. The receiving unit is further configured to: after the sending unit sends the first communication message to the server, receive the first user account sent by the server, where the first user account is invisible to a user on the first terminal, the first user account is sent by the server when the second user account identified by the second identifier is an authorized account of the first user account, and a terminal of a user corresponding to the authorized account of the first user account has permission of communicating with the terminal of the user corresponding to the first user account. The communications unit is further configured to: in response to receiving of the first user account by the receiving unit, request, based on the first user account, to perform voice communication with the terminal of the user corresponding to the first user account.

In another possible design method of the third aspect, the first terminal further includes: a deletion unit. The deletion unit is configured to delete the first user account after the communications unit requests, based on the first user account, to perform voice communication with the terminal of the user corresponding to the first user account.

In another possible design method of the third aspect, the first communication message sent by the sending unit further includes a second identifier, the second identifier is used to identify a second user account, the second user account is the account of the user corresponding to the client of the first terminal, and the first identifier is different from the second identifier. The receiving unit is further configured to: after the sending unit sends the first communication message to the server, receive a communication failure message sent by the server, where the communication failure message is used to indicate that communication between the first terminal and the terminal of the user corresponding to the first user account fails, the communication failure message is sent by the server when the second user account identified by the second identifier is a rejected account of the first user account, and a terminal of a user corresponding to the rejected account of the first user account has no permission of communicating with the terminal of the user corresponding to the first user account. A prompt unit is further configured to send first prompt information in response to receiving of the communication failure message by the receiving unit, where the first prompt information is used to indicate that the communication between the first terminal and the terminal of the user corresponding to the first user account fails.

In another possible design method of the third aspect, the receiving unit is further configured to receive an authorization request sent by the server, where the authorization request includes a third identifier, the authorization request is used to confirm with the first terminal whether to determine a user account identified by the third identifier as an authorized account of the second user account, the second user account is the account of the user corresponding to the client on the first terminal, and a terminal of a user corresponding to the authorized account of the second user account has permission of communicating with the first terminal. The display unit is further configured to: in response to receiving of the authorization request by the receiving unit, display a third interface including an authorization acceptance option and an authorization rejection option. The sending unit is further configured to: in response to a selection operation performed by the user on the authorization acceptance option on the third interface displayed by the display unit, send a first authorization response to the server, where the first authorization response indicates that the first terminal allows determining the user account identified by the third identifier as an authorized account of the second user account. The sending unit is further configured to: in response to a selection operation performed by the user on the authorization rejection option on the third interface displayed by the display unit, send a second authorization response to the server, where the second authorization response indicates that the first terminal rejects to determine the user account identified by the third identifier as an authorized account of the second user account.

In another possible design method of the third aspect, the receiving unit is further configured to receive a first notification message sent by the server, where the first notification message includes a fourth identifier, the first notification message is used to indicate that the second identifier is pushed to a terminal of a user corresponding to a user account identified by the fourth identifier, the second identifier is used to identify the second user account, the second user account is the account of the user corresponding to the client on the first terminal, and the second identifier is different from the fourth identifier. The prompt unit is further configured to send second prompt information in response to receiving of the first notification message by the receiving unit, where the second prompt information is used to indicate that the second identifier is pushed to the terminal of the user corresponding to the user account identified by the fourth identifier.

In another possible design method of the third aspect, the display unit is further configured to display a fourth interface, the fourth interface includes a plurality of identifiers stored in the first terminal, and each identifier is used to identify a user account. The sending unit is further configured to: in response to a first selection operation performed by the user on some of the plurality of identifiers displayed by the display unit and/or a second selection operation performed by the user on some of the plurality of identifiers, send an authorization message to the server, where the authorization message includes an authorization permission identifier and/or an authorization rejection identifier, the authorization permission identifier includes an identifier that is of the plurality of identifiers and that corresponds to the first selection operation, the authorization rejection identifier includes an identifier that is of the plurality of identifiers and that corresponds to the second selection operation, and the authorization permission identifier is different from the authorization rejection identifier.

In another possible design method of the third aspect, the display unit is further configured to: in response to the first selection operation, display, on the fourth interface in a first preset manner, the identifier corresponding to the first selection operation; and in response to the second selection operation, and display, on the fourth interface in a second preset manner, the identifier corresponding to the second selection operation, where the first preset manner is different from the second preset manner.

In another possible design method of the third aspect, the sending unit is further configured to: in response to a pushing operation performed by the user on a fifth interface including the second identifier, send a second electronic business card including the second identifier to the second terminal, where the second identifier is used to identify the second user account, and the second user account is the account of the user corresponding to the client on the first terminal.

According to a fourth aspect, an embodiment of this application provides a server. The server includes: a receiving unit and a sending unit. The receiving unit is configured to receive a business card push message sent by a second terminal, where the business card push message is used to request to push a first electronic business card to a first terminal, the first electronic business card includes a first identifier, the first identifier is used to identify a first user account, the first electronic business card is an electronic business card of a user corresponding to a client of a third terminal or a client of the second terminal, and the first user account is an account of the user corresponding to the first electronic business card. The sending unit is configured to: in response to receiving of the business card push message by the receiving unit, send the first electronic business card to the first terminal, where the first terminal cannot directly communicate, based on the first identifier, with a terminal of the user corresponding to the first user account, and instead, obtains the first user account based on the first identifier, to communicate with the terminal of the user corresponding to the first user account.

In another possible design method of the fourth aspect, the business card push message received by the receiving unit further includes a second identifier, the second identifier is used to identify a second user account, the second user account is an account of a user corresponding to a client of the first terminal, and the first identifier is different from the second identifier. The server further includes: a storage unit. The storage unit is configured to: in response to receiving of the business card push message by the receiving unit, when the first electronic business card is the electronic business card of the user corresponding to the client on the second terminal, store, by the server, the second identifier in first authorization information of the first user account, where the storage unit stores first authorization information of a plurality of user accounts, the first authorization information of the first user account includes a plurality of authorization identifiers, each authorization identifier is used to identify an authorized account of the first user account, and a terminal of a user corresponding to the authorized account has permission of communicating with the terminal of the user corresponding to the first user account.

In another possible design method of the fourth aspect, the receiving unit is further configured to: after the sending unit sends the first electronic business card to the first terminal, receive a first communication message sent by the first terminal, where the first communication message includes the first identifier, the first communication message is used to request to communicate with the terminal of the user corresponding to the first user account identified by the first identifier, the first communication message further includes the second identifier, the second identifier is used to identify the second user account, and the second user account is the account of the user corresponding to the client of the first terminal. The server further includes: a query unit and a communication service unit. The query unit is configured to query the first authorization information of the first user account identified by the first identifier, to determine whether the second user account identified by the second identifier is an authorized account of the first user account, where the first authorization information includes a plurality of authorization identifiers, each authorization identifier is used to identify an authorized account of the first user account, and a terminal of a user corresponding to the authorized account has permission of communicating with the terminal of the user corresponding to the first user account. The communication service unit is configured to: when the query unit obtains through query that the second user account is an authorized account of the first user account, obtain the first user account based on the first identifier, and provide, for the first terminal based on the first user account, a service of communicating with the terminal of the user corresponding to the first user account.

In another possible design method of the fourth aspect, the storage unit further stores second authorization information of a plurality of user accounts, second authorization information of the first user account includes a plurality of rejection identifiers, each rejection identifier is used to identify a rejected account of the first user account, and a terminal of a user corresponding to the rejected account has no permission of communicating with the terminal of the user corresponding to the first user account. The query unit is further configured to: when the second user account is not an authorized account of the first user account, query the second authorization information of the first user account to determine whether the second user account is a rejected account of the first user account. The sending unit is further configured to: when the query unit obtains through query that the second user account is not a rejected account of the first user account, send an authorization request to the terminal of the user corresponding to the first user account, where the authorization request includes the second identifier, and the authorization request is used to confirm with the terminal of the user corresponding to the first user account whether to determine the second user account as an authorized account. The receiving unit is further configured to receive a first authorization response sent by the terminal of the user corresponding to the first user account, where the first authorization response indicates that the terminal of the user corresponding to the first user account allows determining the second user account as an authorized account. The communication service unit is further configured to: in response to receiving of the first authorization response by the receiving unit, obtain the first user account based on the first identifier, and provide, for the first terminal based on the first user account, the service of communicating with the terminal of the user corresponding to the first user account.

In another possible design method of the fourth aspect, the storage unit is further configured to: in response to receiving of the first authorization response by the receiving unit, store the second identifier in the first authorization information of the first user account.

In another possible design method of the fourth aspect, the receiving unit is further configured to receive a second authorization response sent by the terminal of the user corresponding to the first user account, where the second authorization response indicates that the terminal of the user corresponding to the first user account rejects to determine the second user account as an authorized account. The sending unit is further configured to: in response to receiving of the second authorization response by the receiving unit, send a communication failure message to the first terminal, where the communication failure message is used to indicate that communication between the first terminal and the terminal of the user corresponding to the first user account fails.

In another possible design method of the fourth aspect, the storage unit is further configured to: in response to receiving of the second authorization response by the receiving unit, store the second identifier in the second authorization information of the first user account.

In another possible design method of the fourth aspect, the sending unit is further configured to: when the query unit obtains through query that the second user account is a rejected account of the first user account, send the communication failure message to the first terminal, where the communication failure message is used to indicate that the communication between the first terminal and the terminal of the user corresponding to the first user account fails.

In another possible design method of the fourth aspect, the sending unit is further configured to: when the query unit obtains through query that the first electronic business card is the electronic business card of the user corresponding to the client on the third terminal, send a first notification message or an authorization request to the third terminal.

The first notification message sent by the sending unit includes the second identifier, the first notification message is used to indicate that the first identifier is pushed to the terminal of the user corresponding to the user account identified by the second identifier, the authorization request sent by the sending unit includes the second identifier, and the authorization request is used to confirm with the third terminal whether to determine the user account identified by the second identifier as an authorized account.

In another possible design method of the fourth aspect, the receiving unit is further configured to receive an authorization message sent by the third terminal, where the authorization message includes an authorization permission identifier and/or an authorization rejection identifier, both the authorization permission identifier and the authorization rejection identifier are identifiers stored in the third terminal to identify user accounts, and the authorization permission identifier is different from the authorization rejection identifier. The storage unit is configured to: in response to receiving of the authorization message, store the authorization permission identifier in first authorization information of an account of the user corresponding to the client on the third terminal, and store the authorization rejection identifier in second authorization information of the account of the user corresponding to the client on the third terminal.

In another possible design method of the fourth aspect, the server further includes: a deletion unit. The deletion unit is configured to: when the first authorization information includes the authorization rejection identifier, delete the authorization rejection identifier from the first authorization information; and when the second authorization information includes the authorization permission identifier, delete the authorization permission identifier from the second authorization information.

In another possible design method of the fourth aspect, the first communication message received by the receiving unit includes an instant messaging message or an email. The communication service unit is specifically configured to forward, based on the first user account, the first communication message to the terminal of the user corresponding to the first user account.

In another possible design method of the fourth aspect, the first communication message received by the receiving unit is a voice call request. The communication service unit is specifically configured to send the first user account to the first terminal, where the first user account is invisible to a user on the first terminal. The receiving unit is further configured to receive a second communication message that is sent by the first terminal and that includes the first user account. The sending unit is further configured to: in response to receiving of a second communication message that is sent by the first terminal and received by the receiving unit and that includes the first user account, initiate voice paging to the terminal of the user corresponding to the first user account.

According to a fifth aspect, an embodiment of this application provides a terminal. The terminal is a second terminal, and the second terminal includes: a processor, a memory, a communications interface, and a display. The memory, the communications interface, and the display are coupled to the processor, the memory is configured to store computer program code, the computer program code includes a computer instruction, and the memory includes a non-volatile storage medium. When the processor executes the computer instruction, the communications interface is configured to receive a first electronic business card sent by the second terminal, where the first electronic business card is an electronic business card of a user corresponding to a client of a third terminal or a client of the second terminal. The display is configured to: display a first identifier based on the first electronic business card received by the communications interface, but skip displaying a first user account, where the first user account is an account of the user corresponding to the first electronic business card, and the first identifier is used to identify the first user account. The communications interface is further configured to be incapable of directly communicating, based on the first identifier, with a terminal of the user corresponding to the first user account, and instead, obtains the first user account based on the first identifier, to communicate with the terminal of the user corresponding to the first user account.

In a possible design method of the fifth aspect, the communications interface is further configured to: after the display displays the first identifier based on the first electronic business card, send a first communication message to a server, and display a second interface in response to an operation performed by the user on a first interface including the first identifier, where the first communication message sent by the communications interface includes the first identifier, the first communication message is used to request to communicate with the terminal of the user corresponding to the first user account identified by the first identifier, the second interface is an interface on which the first terminal requests to communicate with the terminal of the user corresponding to the first user account, and the first communication message includes any one of an instant messaging message, an email, and a voice call request.

In another possible design method of the fifth aspect, the first communication message sent by the communications interface is a voice call request, the first communication message further includes a second identifier, the second identifier is used to identify a second user account, the second user account is an account of a user corresponding to a client of the first terminal, and the first identifier is different from the second identifier. The communications interface is further configured to: after sending the first communication message to the server, receive the first user account sent by the server, where the first user account is invisible to a user on the first terminal, the first user account is sent by the server when the second user account identified by the second identifier is an authorized account of the first user account, and a terminal of a user corresponding to the authorized account of the first user account has permission of communicating with the terminal of the user corresponding to the first user account. The communications interface is further configured to: in response to receiving of the first user account, request, based on the first user account, to perform voice communication with the terminal of the user corresponding to the first user account.

In another possible design method of the fifth aspect, the processor is further configured to delete the first user account after the communications interface requests, based on the first user account, to perform voice communication with the terminal of the user corresponding to the first user account.

In another possible design method of the fifth aspect, the first communication message sent by the communications interface further includes a second identifier, the second identifier is used to identify a second user account, the second user account is the account of the user corresponding to the client of the first terminal, and the first identifier is different from the second identifier. The communications interface is further configured to: after sending the first communication message to the server, receive a communication failure message sent by the server, where the communication failure message is used to indicate that communication between the first terminal and the terminal of the user corresponding to the first user account fails, the communication failure message is sent by the server when the second user account identified by the second identifier is a rejected account of the first user account, and a terminal of a user corresponding to the rejected account of the first user account has no permission of communicating with the terminal of the user corresponding to the first user account. The processor is further configured to send first prompt information in response to receiving of the communication failure message by the communications interface, where the first prompt information is used to indicate that the communication between the first terminal and the terminal of the user corresponding to the first user account fails.

In another possible design method of the fifth aspect, the communications interface is further configured to receive an authorization request sent by the server, where the authorization request includes a third identifier, the authorization request is used to confirm with the first terminal whether to determine a user account identified by the third identifier as an authorized account of the second user account, the second user account is the account of the user corresponding to the client on the first terminal, and a terminal of a user corresponding to the authorized account of the second user account has permission of communicating with the first terminal. The display is further configured to: in response to receiving of the authorization request by the communications interface, display a third interface including an authorization acceptance option and an authorization rejection option. The communications interface is further configured to: in response to a selection operation performed by the user on the authorization acceptance option on the third interface, send a first authorization response to the server, where the first authorization response indicates that the first terminal allows determining the user account identified by the third identifier as an authorized account of the second user account. In response to a selection operation performed by the user on the authorization rejection option on the third interface, the first terminal sends a second authorization response to the server, where the second authorization response indicates that the first terminal rejects to determine the user account identified by the third identifier as an authorized account of the second user account.

In another possible design method of the fifth aspect, the communications interface is further configured to receive a first notification message sent by the server, where the first notification message includes a fourth identifier, the first notification message is used to indicate that the second identifier is pushed to a terminal of a user corresponding to a user account identified by the fourth identifier, the second identifier is used to identify the second user account, the second user account is the account of the user corresponding to the client on the first terminal, and the second identifier is different from the fourth identifier. The processor is further configured to send second prompt information in response to receiving of the first notification message by the communications interface, where the second prompt information is used to indicate that the second identifier is pushed to the terminal of the user corresponding to the user account identified by the fourth identifier.

In another possible design method of the fifth aspect, the display is further configured to display a fourth interface, the fourth interface includes a plurality of identifiers stored in the first terminal, and each identifier is used to identify a user account. The communications interface is further configured to: in response to a first selection operation performed by the user on some of the plurality of identifiers displayed by the display and/or a second selection operation performed by the user on some of the plurality of identifiers, send an authorization message to the server, where the authorization message includes an authorization permission identifier and/or an authorization rejection identifier, the authorization permission identifier includes an identifier that is of the plurality of identifiers and that corresponds to the first selection operation, the authorization rejection identifier includes an identifier that is of the plurality of identifiers and that corresponds to the second selection operation, and the authorization permission identifier is different from the authorization rejection identifier.

In another possible design method of the fifth aspect, the display is further configured to: in response to the first selection operation, display, on the fourth interface in a first preset manner, the identifier corresponding to the first selection operation; and in response to the second selection operation, and display, on the fourth interface in a second preset manner, the identifier corresponding to the second selection operation, where the first preset manner is different from the second preset manner.

In another possible design method of the fifth aspect, the communications interface is further configured to: in response to a pushing operation performed by the user on a fifth interface including the second identifier, send a second electronic business card including the second identifier to the second terminal, where the second identifier is used to identify the second user account, and the second user account is the account of the user corresponding to the client on the first terminal.

According to a sixth aspect, an embodiment of this application provides a server, including: a processor, a memory, and a communications interface. The memory and the communications interface are coupled to the processor, the memory is configured to store computer program code, the computer program code includes a computer instruction, and the memory includes a non-volatile storage medium. When the processor executes the computer instruction, the communications interface is configured to: receive a business card push message sent by a second terminal, where the business card push message is used to request to push a first electronic business card to a first terminal, the first electronic business card includes a first identifier, the first identifier is used to identify a first user account, the first electronic business card is an electronic business card of a user corresponding to a client of a third terminal or a client of the second terminal, and the first user account is an account of the user corresponding to the first electronic business card; and in response to receiving of the business card push message, send the first electronic business card to the first terminal, where the first terminal cannot directly communicate, based on the first identifier, with a terminal of the user corresponding to the first user account, and instead, obtains the first user account based on the first identifier, to communicate with the terminal of the user corresponding to the first user account.

In a possible design method of the sixth aspect, the business card push message received by the communications interface further includes a second identifier, the second identifier is used to identify a second user account, the second user account is an account of a user corresponding to a client of the first terminal, and the first identifier is different from the second identifier. The processor is further configured to: in response to receiving of the business card push message by the communications interface, when the first electronic business card is an electronic business card of a user corresponding to a client on the second terminal, store the second identifier in first authorization information of the first user account that is stored by the memory, where the memory stores first authorization information of a plurality of user accounts, the first authorization information of the first user account includes a plurality of authorization identifiers, each authorization identifier is used to identify an authorized account of the first user account, and a terminal of a user corresponding to the authorized account has permission of communicating with the terminal of the user corresponding to the first user account.

In another possible design method of the sixth aspect, the communications interface is further configured to: after sending the first electronic business card to the first terminal, receive a first communication message sent by the first terminal, where the first communication message includes the first identifier, the first communication message is used to request to communicate with the terminal of the user corresponding to the first user account identified by the first identifier, the first communication message further includes the second identifier, the second identifier is used to identify the second user account, and the second user account is the account of the user corresponding to the client of the first terminal. The processor is further configured to query the first authorization information of the first user account identified by the first identifier, to determine whether the second user account identified by the second identifier is an authorized account of the first user account, where the first authorization information includes a plurality of authorization identifiers, each authorization identifier is used to identify an authorized account of the first user account, and a terminal of a user corresponding to the authorized account has permission of communicating with the terminal of the user corresponding to the first user account. The processor is further configured to: when obtaining through query that the second user account is an authorized account of the first user account, obtain the first user account based on the first identifier. The communications interface is further configured to provide, for the first terminal based on the first user account obtained by the processor, a service of communicating with the terminal of the user corresponding to the first user account.

In another possible design method of the sixth aspect, the memory further stores second authorization information of a plurality of user accounts, second authorization information of the first user account includes a plurality of rejection identifiers, each rejection identifier is used to identify a rejected account of the first user account, and a terminal of a user corresponding to the rejected account has no permission of communicating with the terminal of the user corresponding to the first user account. The processor is further configured to: when the second user account is not an authorized account of the first user account, query the second authorization information of the first user account to determine whether the second user account is a rejected account of the first user account. The communications interface is further configured to: when the second user account is not a rejected account of the first user account, send an authorization request to the terminal of the user corresponding to the first user account, where the authorization request includes the second identifier, and the authorization request is used to confirm with the terminal of the user corresponding to the first user account whether to determine the second user account as an authorized account. The communications interface is further configured to receive a first authorization response sent by the terminal of the user corresponding to the first user account, where the first authorization response indicates that the terminal of the user corresponding to the first user account allows determining the second user account as an authorized account. The processor is further configured to: in response to receiving of the first authorization response, obtain the first user account based on the first identifier. The communications interface is further configured to provide, for the first terminal based on the first user account obtained by the processor, the service of communicating with the terminal of the user corresponding to the first user account.

In another possible design method of the sixth aspect, the processor is further configured to: in response to receiving of the first authorization response by the communications interface, store the second identifier in the first authorization information of the first user account that is stored by the memory.

In another possible design method of the sixth aspect, the communications interface is further configured to: receive a second authorization response sent by the terminal of the user corresponding to the first user account, where the second authorization response indicates that the terminal of the user corresponding to the first user account rejects to determine the second user account as an authorized account; and in response to receiving of the second authorization response, send a communication failure message to the first terminal, where the communication failure message is used to indicate that communication between the first terminal and the terminal of the user corresponding to the first user account fails.

In another possible design method of the sixth aspect, the processor is further configured to: in response to receiving of the second authorization response by the communications interface, store the second identifier in the second authorization information of the first user account.

In another possible design method of the sixth aspect, the communications interface is further configured to: when the second user account is a rejected account of the first user account, send the communication failure message to the first terminal, where the communication failure message is used to indicate that the communication between the first terminal and the terminal of the user corresponding to the first user account fails.

In another possible design method of the sixth aspect, the communications interface is further configured to: when the first electronic business card is the electronic business card of the user corresponding to the client on the third terminal, send a first notification message or an authorization request to the third terminal. The first notification message sent by the communications interface includes the second identifier, the first notification message is used to indicate that the first identifier is pushed to the terminal of the user corresponding to the user account identified by the second identifier, the authorization request sent by the communications interface includes the second identifier, and the authorization request is used to confirm with the third terminal whether to determine the user account identified by the second identifier as an authorized account.

In another possible design method of the sixth aspect, the communications interface is further configured to receive an authorization message sent by the third terminal, where the authorization message includes an authorization permission identifier and/or an authorization rejection identifier, both the authorization permission identifier and the authorization rejection identifier are identifiers stored in the third terminal to identify user accounts, and the authorization permission identifier is different from the authorization rejection identifier. The processor is configured to: in response to receiving of the authorization message by the communications interface, store the authorization permission identifier in first authorization information that is of an account of the user corresponding to the client on the third terminal and that is stored by the memory, and store the authorization rejection identifier in second authorization information that is of the account of the user corresponding to the client on the third terminal and that is stored by the memory.

In another possible design method of the sixth aspect, the processor is further configured to: when the first authorization information includes the authorization rejection identifier, delete the authorization rejection identifier from the first authorization information stored by the memory; when the second authorization information includes the authorization permission identifier, the server deletes the authorization permission identifier from the second authorization information stored by the memory.

In another possible design method of the sixth aspect, the first communication message sent by the communications interface includes an instant messaging message or an email. The communications interface is specifically configured to forward, based on the first user account, the first communication message to the terminal of the user corresponding to the first user account.

In another possible design method of the sixth aspect, the first communication message sent by the communications interface is a voice call request. The communications interface is specifically configured to: send the first user account to the first terminal, where the first user account is invisible to a user on the first terminal; receive a second communication message that is sent by the first terminal and that includes the first user account; and in response to receiving of the second communication message sent by the first terminal, initiate voice paging to the terminal of the user corresponding to the first user account.

According to a seventh aspect, an embodiment of this application provides a control device. The control device includes a processor and a memory, the memory is configured to store computer program code, the computer program code includes a computer instruction, and when the processor executes the computer instruction, the control device performs the communication method according to the first aspect and the second aspect of this application and any possible design method thereof.

According to an eighth aspect, an embodiment of this application provides a computer storage medium. The computer storage medium includes a computer instruction, and when the computer instruction runs on a server, the server is caused to perform the communication method according to the second aspect of this application and any possible design method thereof.

According to a ninth aspect, an embodiment of this application provides a computer storage medium. The computer storage medium includes a computer instruction, and when the computer instruction runs on a terminal, the terminal is caused to perform the communication method according to the first aspect of this application and any possible design method thereof.

According to a tenth aspect, an embodiment of this application provides a computer program product. When the computer program product runs on a computer, the computer is caused to perform the communication method according to the first aspect or the second aspect of this application and any possible design method thereof.

In the embodiments of this application, names of the terminals constitute no limitation on the terminals, and during actual implementation, the devices may appear in other names. All devices with functions similar to those in the embodiments of this application fall within the scope of the claims of this application and equivalent technologies of this application.

In addition, for technical effects of any design manner in the third aspect to the tenth aspect, refer to technical effects of different design methods in the first aspect and the second aspect. Details are not described herein again.

According to an eleventh aspect, an embodiment of this application provides a communication method. The communication method includes: first, receiving, by a first terminal, user information of a user that is sent by a second terminal; then, displaying, by the first terminal, a first interface based on the user information of the user, where the first interface includes a first identifier and does not display first contact information of the user, and the first identifier is used to identify the first contact information of the user; and subsequently, in response to detection of an operation on the first interface, displaying, by the first terminal, a second interface, where the second interface is used to establish communication with a terminal corresponding to the user or a client of the terminal, and the second interface includes the first identifier and does not display the first contact information of the user.

BRIEF DESCRIPTION OF DRAWINGS

FIG. 23A-1 and FIG. 23A-2 are a schematic diagram 20 of an example of an interface of a terminal according to an embodiment of this application;

FIG. 23B-1 and FIG. 23B-2 are a schematic diagram 21 of an example of an interface of a terminal according to an embodiment of this application;

DESCRIPTION OF EMBODIMENTS

A communication method provided in the embodiments of this application may be applied to any terminal having a friend making function such as a mobile phone, a tablet computer, a wearable device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA). This is not limited in the embodiments of this application.

Figure 1:
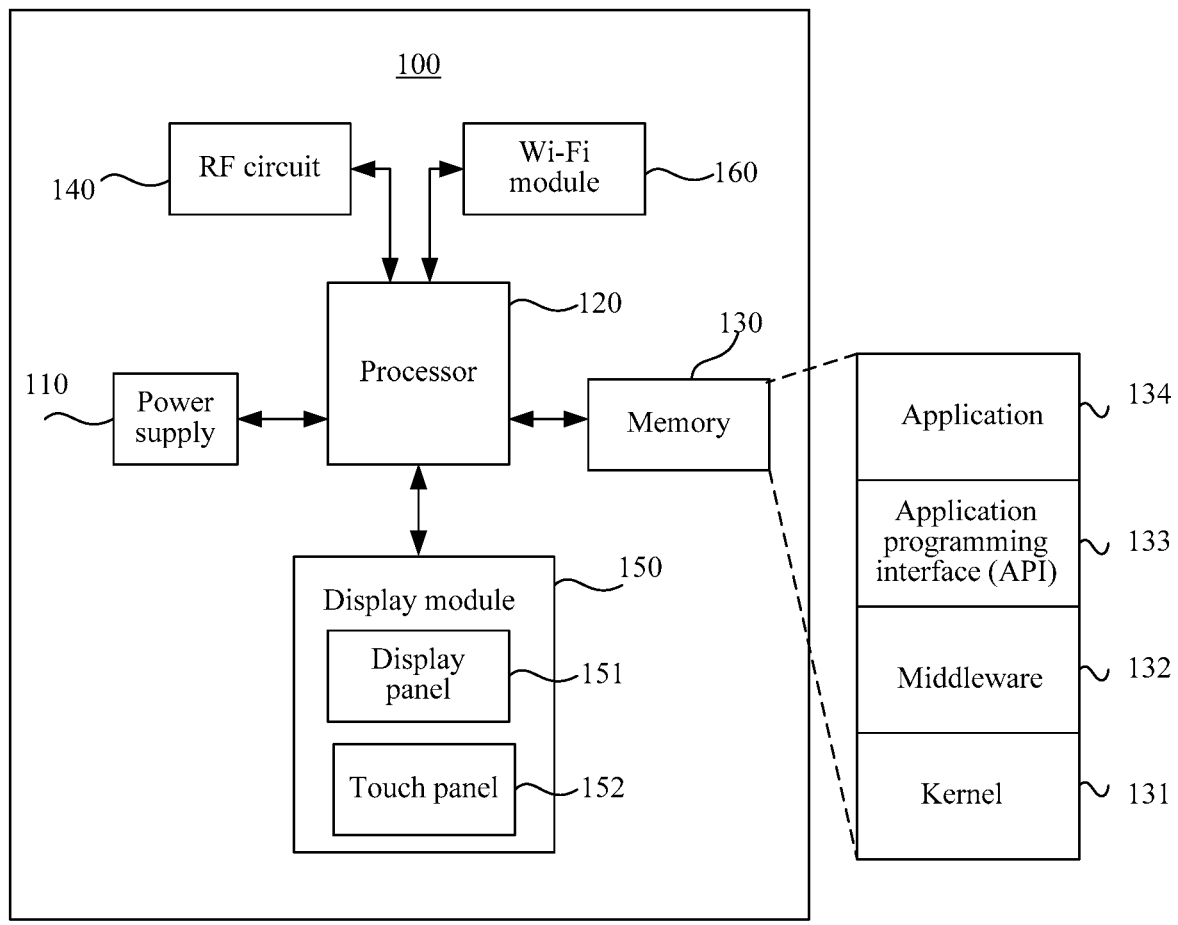
FIG. 1 is a schematic structural diagram of hardware of a mobile phone according to an embodiment of this application.

Referring to FIG. 1, a terminal in an embodiment of this application may be a mobile phone 100. The following uses the mobile phone 100 as an example to specifically describe this embodiment. It should be understood that, the mobile phone 100 shown in the figure is only an example of the terminal, and the mobile phone 100 may include more or fewer components than those shown in the figure, or two or more components may be combined, or a different component deployment may be used.

As shown in FIG. 1, the mobile phone 100 may include a power supply 110, a processor 120, a memory 130, a radio frequency (Radio Frequency, RF) circuit 140, a display module 150, a wireless fidelity (Wireless Fidelity, Wi-Fi) module 160, and another similar and/or proper component. The RF circuit 140 and the Wi-Fi module 160 may be collectively referred to as a communications interface, and the communications interface may further include a Bluetooth (Blue Tooth, BT) module or the like. According to the embodiments disclosed in this application, the mobile phone 100 may communicate with another terminal by using the communications interface. For example, the communications interface may communicate with another terminal 2, a server a, or the like. The communications module may communicate with the another terminal, the server a, or the like directly or through a network.

The processor 120 is a control center of the mobile phone 100, and is connected to various parts (for example, the memory 130, the RF circuit 140, the Wi-Fi module 160, and the display module 150) of the mobile phone 100 by using various interfaces and lines. By running or executing an application program stored in the memory 130 and invoking data stored in the memory 130, the processor 120 performs various functions and data processing of the mobile phone 100. In some embodiments, the processor 120 may include one or more processing units. In some of the embodiments of this application, the processor 120 may further include a fingerprint authentication chip, configured to perform authentication on a collected fingerprint. The power supply 110 is configured to supply power to the various parts, and the power supply 110 may be logically connected to the processor 120 by using a power management system, thereby implementing functions such as charging, discharging, and power consumption management.

The RF circuit 140 may be configured to receive and send a radio signal in an information receiving and sending process or a call process. Particularly, the RF circuit 140 may receive downlink data from a base station and then send the downlink data to the processor 120 for processing, and also send related uplink data to the base station. Generally, the RF circuit 140 includes but is not limited to an antenna, at least one amplifier, a transceiver, a coupler, a low noise amplifier, and a duplexer. In addition, the RF circuit 140 may also communicate with another device wirelessly. Any communication standard or protocol may be used for the wireless communication, including but not limited to a global system for mobile communications, a general packet radio service, code division multiple access, wideband code division multiple access, long term evolution, an email, a short message service, and the like.

The display module 150 may specifically include a display panel 151 and a touch panel 152.

The touch panel 152 may collect a touch event of a user of the mobile phone 100 on or near the touch panel (such as an operation of the user on or near the touch panel 152 by using any suitable object such as a finger or a stylus), and send collected touch information to another device (for example, the processor 120). The touch event of the user near the touch panel 152 may be referred to as a floating touch; and the floating touch may mean that a user only needs to be near a device to perform a desired function without being in direct contact with a touchpad to select, move, or drag a target (for example, an icon).

In addition, the touch panel 152 may be implemented by using touch panels of a plurality of types such as resistive, capacitive, infrared, and surface acoustic wave. The display panel 151 may be configured to display information entered by or provided to a user and various menus on the mobile phone 100. The display panel 151 may be configured by using a liquid crystal display, an organic light-emitting diode, or the like. The touch panel 152 may cover the display panel 151. After detecting a touch event on or near the touch panel 152, the touch panel 152 transfers the touch event to the processor 120, to determine a type of the touch event. Then, the processor 120 may provide a corresponding visual output on the display panel 151 based on the type of the touch event.

Although, in FIG. 1, the touch panel 152 and the display panel 151 are used as two separate parts to implement input and output functions of the mobile phone 100, in some embodiments, the touch panel 152 and the display panel 151 may be integrated to implement the input and output functions of the mobile phone 100. It may be understood that, the touch panel 152 is formed by stacking a plurality of layers of materials, and only the touch panel and the display panel are described and other layers are not described in this embodiment of this application. In addition, the touch panel 152 may be configured in a front of the mobile phone 100 in a full-panel form, and the display panel 151 may also be configured in the front of the mobile phone 100 in a full-panel form. In this way, a frame-less structure can be implemented in the front of the mobile phone.

The Wi-Fi module 160 is configured to provide the mobile phone 100 with network access conforming to a Wi-Fi related standard protocol. The mobile phone 100 may access a Wi-Fi access point by using the Wi-Fi module 160, to help the user receive and send an email, browse a web page, access streaming media, and the like. The Wi-Fi module 160 provides wireless broadband Internet access for the user. In some other embodiments, the Wi-Fi module 160 may be alternatively used as a Wi-Fi wireless access point, to provide Wi-Fi network access for another device.

The memory 130 is configured to store an application program and data. The processor 120 performs various functions and data processing of the mobile phone 100 by running the application program and data stored in the memory 130. The memory 130 may be independent and is connected to the processor 120 by using a bus; and the memory 130 may be alternatively integrated with the processor 120.

As shown in FIG. 1, the memory 130 may include a programming module, such as a kernel 131, middleware 132, an application programming interface (Application Programming Interface, API) 133, and an application 134. Each programming module may be implemented by software, firmware, hardware, or a combination of two or more thereof. For detailed descriptions thereof, refer to related descriptions in FIG. 2.

The kernel 131 may control or manage a system resource (for example, the processor 120 and the memory 130) used to perform an operation or a function implemented by another programming module (for example, the middleware 132, the API 133, and the application 134). In addition, the kernel 131 may provide an interface that can be used to access and control or manage various parts of the mobile phone 100 by using the middleware 132, the API 133, or the application 134.

The middleware 132 may be configured to run between the API 133 or the application 134 and the kernel 131 so that the API 133 or the application 134 communicates and transfers data with the kernel 131. For example, the middleware 132 may be configured as a medium for communication between the API 133 or the application 134 and the kernel 131. In addition, for example, for working requests received from the one or more applications 134 and/or the middleware 132, a method of assigning a priority to at least one of the one or more applications 134 (a system resource (for example, the processor 120 and the memory 130) of the mobile phone 100 may be used based on the priority) may be used to execute load balancing of the working requests.

The API 133 is an interface that can be used by the application 134 to control a function provided by the kernel 131 or the middleware 132, and may include, for example, at least one interface or function for file control, window control, image processing, character control, and the like.

The application 134 may include an embedded application (that is, a system application). The embedded application is an application program provided as a part of implementation of a terminal (for example, a mobile phone), for example, a short messaging service (Short Messaging Service, SMS)/multimedia messaging service (Multimedia Messaging Service, MMS) application, an instant messaging (Instant Messaging, IM) application, a camera application, an alarm clock application, a contact application, a voice dialing application, an email (e-mail) application, a calendar application, a media player application, an album application, a clock application, and any other proper and/or similar application. In addition, the application 134 may further include a downloadable application. The downloadable application is an application program that may provide an internet protocol multimedia subsystem (Internet Protocol Multimedia Subsystem, IMS) connection thereof. The downloadable application program may be an application installed in the terminal in advance or a third-party application that may be downloaded by a user and installed in the terminal, for example, an IM application (for example, WeChat and QQ), Alipay, Weibo, or Baidu Map.

Figure 2:
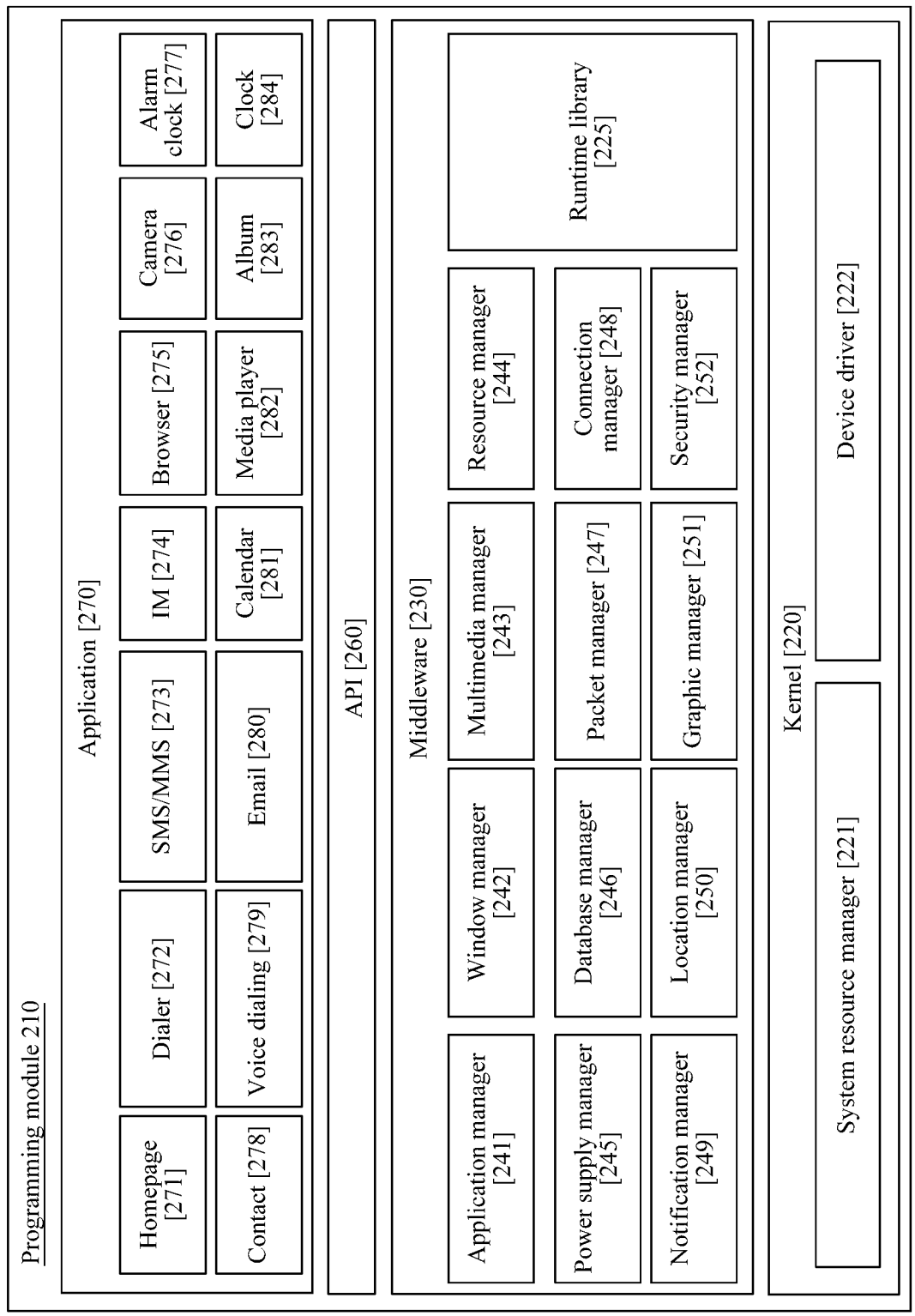
FIG. 2 is a schematic diagram of a programming model of a mobile phone according to an embodiment of this application.

FIG. 2 is a block diagram of a configuration of a programming module according to an embodiment of this application. Referring to FIG. 2, a programming module 210 may be included (or stored) in the mobile phone 100 (for example, the memory 130) shown in FIG. 1. At least a part of the programming module 210 may be implemented as software, firmware, hardware, or a combination of two or more thereof. The programming module 210 may be implemented as hardware, and may include an operating system (Operating System, OS) controlling a related resource of the terminal (for example, the mobile phone 100) and/or various applications (for example, an application 270) executed in the OS. For example, the OS may be Android (Android), iOS, Windows, Symbian, Tizen, Bada, or the like.

Referring to FIG. 2, the programming module 210 may include a kernel 220 (that is, the kernel 131 shown in FIG. 1), middleware 230 (that is, the middleware 132 shown in FIG. 1), an API 260 (that is, the API 133 shown in FIG. 1), and/or the application 270 (that is, the application 134 shown in FIG. 1).

The kernel 220 may include a system resource manager 221 and/or a device driver 222. The system resource manager 221 may include a process manager (not shown in FIG. 2), a memory manager (not shown in FIG. 2), and a file system manager (not shown in FIG. 2). The system resource manager 221 may control, allocate, and recover a system resource or the like. The device driver 222 may include, for example, a display driver (not shown in FIG. 2), a camera driver (not shown in FIG. 2), a Bluetooth driver (not shown in FIG. 2), a shared memory driver (not shown in FIG. 2), a USB driver (not shown in FIG. 2), a key zone driver (not shown in FIG. 2), a Wi-Fi driver (not shown in FIG. 2), and/or an audio driver (not shown in FIG. 2). In addition, according to an embodiment disclosed in this application, the device driver 222 may include an inter process communication (Inter Process Communication, IPC) driver (not shown in FIG. 2).

The middleware 230 may include a plurality of modules implemented in advance, to provide a function shared with the application 270. In addition, the middleware 230 may provide a function to the application 270 by using the API 260, so that the application 270 can efficiently use limited system resources in the terminal. For example, as shown in FIG. 2, the middleware 230 may include at least one of the following: a runtime library 225, an application manager 241, a window manager 242, a multimedia manager 243, a resource manager 244, a power supply manager 245, a database manager 246, a packet manager 247, a connection manager 248, a notification manager 249, a location manager 250, a graphic manager 251, a security manager 252, and any other proper and/or similar manager.

The runtime library 225 may include a library module used by a compiler, to add a new function during execution of the application 270 by using a programming language. According to an embodiment disclosed in this application, the runtime library 225 may execute a function related to input and output, memory management, an arithmetic function, and the like.

The application manager 241 may manage, for example, a lifecycle of at least one application 270. The window manager 242 may manage a graphical user interface (Graphical User Interface, GUI) resource used on a screen. The multimedia manager 243 may detect a format used to reproduce various media files, and may encode or decode the media files by using a codec for which a related format is suitable. The resource manager 244 may manage a resource of the at least one application 270 such as source code, a memory, and storage space.

The power supply manager 245 may operate together with a basic input/output system (Basic Input/Output System, BIOS), may manage a battery or a power supply, and may provide power supply information and the life for operation. The database manager 246 may manage a database in the following manner: being capable of generating, searching, and/or changing a database to be used by the at least one application 270. The packet manager 247 may manage installation and/or update of an application distributed in a form of a packet file.

The connection manager 248 may manage a wireless connection of a Wi-Fi module, a BT module, and the like. The notification manager 249 may display or report an event such as an arrival message, a date, and a proximity alarm to a user without disturbing the user. The location manager 250 may manage location information of the terminal. The graphic manager 251 may manage a graphic effect to be provided to the user and/or a UI related to the graphic effect. The security manager 252 may provide various security functions used for system security, user authentication, and the like. According to an embodiment disclosed in this application, when the terminal (for example, the mobile phone 100) has a call function, the middleware 230 may further include a call manager (not shown in FIG. 2), configured to manage a voice call function and/or a video call function of the terminal.

The middleware 230 may generate and use a new middleware module by using various function combinations of the foregoing internal component modules. The middleware 230 may provide a module specialized based on an OS type, to provide a differentiated function. The middleware 230 may further dynamically delete some of the existing components or may add a new component. Therefore, the middleware 230 may omit some of the components described in the embodiments disclosed in this application, may further include another component, or may replace some of the components with components performing similar functions but having different names.

The API 260 is a set of API programming functions, and may have different configurations based on the OS. For example, in Android or iOS, an API set may be provided to each platform. For example, in Tizen, two or more API sets may be provided to each platform.

The application 270 may include, for example, an embedded application and a downloadable application. The application 270 may include, for example, a homepage application 271, a dialing application 272, an SMS/MMS application 273, an IM application 274, a browser application 275, a camera application 276, an alarm clock application 277, a contact application 278, a voice dialing application 279, an email application 280, a calendar application 281, a media player application 282, an album application 283, a clock application 284, and any other proper and/or similar application.

At least a part of the programming module 210 may be implemented by an instruction stored in a non-transitory computer-readable storage medium. When one or more processors (the processor 120 shown in FIG. 1) execute the instruction, the one or more processors may perform a function corresponding to the instruction. The non-transitory computer-readable storage medium may be the memory 130 shown in FIG. 1. At least a part of the programming module 210 may be implemented by the one or more processors. At least a part of the programming module 210 may include a module, a program, a routine, an instruction set, and/or a process used to perform one or more functions.

A name of a component of the programming module (for example, the programming module 210) according to an embodiment disclosed in this application may change based on the OS type. The programming module according to the embodiment disclosed in this application may include one or more of the foregoing components. Alternatively, some of the foregoing components may be omitted in the programming module. Optionally, the programming module may further include an additional component. Operations performed by the programming module or another component according to the embodiment disclosed in this application may be processed by using a sequential method, a parallel method, a repetition method, or a heuristic method. In addition, some operations may be omitted, or another operation may be added to an operation.

In addition, the mobile phone 100 may further have a fingerprint recognition function. For example, a fingerprint sensor may be configured on a back of the mobile phone 100 (for example, below a rear-facing camera), or a fingerprint sensor may be configured in a front of the mobile phone 100 (for example, below a touch panel). For another example, a fingerprint collection device may be configured in a touch panel to perform a fingerprint recognition function. That is, the fingerprint collection device may be integrated with the touch panel to perform the fingerprint recognition function of the mobile phone 100. A main part of the fingerprint collection device in this embodiment of this application is a fingerprint sensor, and the fingerprint sensor may use any type of sensing technology, including but not limited to an optical, a capacitive, a piezoelectric, or an ultrasonic wave sensing technology. The mobile phone 100 may further include at least one sensor such as an optical sensor, a motion sensor, and another sensor. Specifically, the optical sensor may include an ambient light sensor and a proximity sensor. The ambient light sensor can adjust luminance of a display of a touchscreen based on brightness of ambient light. The proximity sensor may switch off a power supply of the display when the mobile phone 100 is moved to an ear. As one type of motion sensor, an acceleration sensor may detect magnitude of accelerations in various directions (generally on three axes), may detect magnitude and a direction of a gravity when static, and may be applied to application of posture recognition of a mobile phone (such as switching between portrait and landscape, a related game, and magnetometer posture calibration), a function related to vibration recognition (such as a pedometer and a knock), and the like. Other sensors such as a gyroscope, a barometer, a hygrometer, a thermometer, and an infrared sensor, which may also be configured in the mobile phone 100, are not further described herein.

Although not shown in FIG. 1, the mobile phone 100 may further include a positioning apparatus, an audio circuit, a speaker, a microphone/a peripheral interface and a camera (a front-facing camera and/or a rear-facing camera), a flash, a miniature projection apparatus, a near field communication (Near Field Communication, NFC) apparatus, and the like. Details are not described herein again.

The positioning apparatus is configured to provide a geographical location to the mobile phone 100. The microphone may provide an audio interface between a user and the mobile phone 100. The audio circuit may transfer, to the speaker, an electrical signal obtained by converting a received audio data, and the speaker converts the electrical signal into a sound signal for output. In another aspect, the microphone converts a collected sound signal into an electrical signal. The audio circuit receives the electrical signal and converts the electrical signal into audio data, and outputs the audio data to the RF circuit 140 to send the audio data to, for example, another mobile phone, or outputs the audio data to the memory 130 for further processing. The peripheral interface is configured to provide various interfaces to external input/output devices (such as a keyboard, a mouse, an external display, an external memory, and a subscriber identity module). For example, a universal serial bus (Universal Serial Bus, USB) interface is used to connect to the mouse, a metal contact on a card slot of the subscriber identity module card is used to connect to a subscriber identity module (Subscriber Identification Module, SIM) card provided by a telecommunication operator. The peripheral interface may be configured to couple the foregoing external input/output devices to the processor 120 and the memory 130.

Generally, an electronic business card may include a user account, for example, a phone number (for example, a mobile phone number) or an email address. The terminal may communicate with a terminal corresponding to the user account based on the user account in the electronic business card. In this embodiment of this application, the application 270 may further include software (or referred to as a client a) performing communication by using the electronic business card. In this embodiment of this application, the electronic business card is an electronic business card of a user corresponding to the client a of the terminal, and the user account is an account of the user corresponding to the client a of the terminal. For example, an electronic business card 1 is an electronic business card of a user corresponding to a client a of a terminal 1, and a user account 1 is an account of the user corresponding to the client a of the terminal 1.

It should be noted that in this embodiment of this application, the client a has the following feature: after learning of a user account of a client a of a terminal, the user may directly communicate with the terminal by using any other terminal without being authorized or authenticated by the client a of the terminal.

In this embodiment of this application, the client a may be a system application or a downloadable application (that is, a third-party application). For example, the client a may be a short messaging service application (Application, APP), a call application, an email box (for example, any mailbox such as a Fox mail mailbox, an Outlook mailbox, or a 163 mailbox) application, Alipay, or a bank application.

Assuming that the client a is a short messaging service message application or a call application, and the user account of the client a of the mobile phone 100 is a phone number a, after learning of the phone number a, the user may directly send a short messaging service message to or call the mobile phone 100 by using any other mobile phone without being authorized or authenticated by the short messaging service message application or the call application of the mobile phone 100.

Assuming that the client a is an email box (for example, an Outlook mailbox), and the user account of the client a of the mobile phone 100 is Bob@outlook.com, after learning of Bob@outlook.com, the user may directly send a mail to Bob@outlook.com by using any email box without being authorized or authenticated by the Outlook mailbox of the mobile phone 100.

Assuming that the client a is Alipay, and the user account of the client a of the mobile phone 100 is an Alipay account (for example, a phone number or a mailbox address), after obtaining the Alipay account, the user may directly transfer money to the Alipay account and append a message by using another Alipay account without being authorized or authenticated by the Alipay client of the mobile phone 100.

However, the following problem emerges: Another user may directly communicate with the terminal by using any other terminal without being authorized or authenticated by the client a of the terminal, and the electronic business card of the terminal includes the user account. Therefore, when the electronic business card of the terminal is stolen, the terminal may receive a trash SMS message, a trash mail, and a harassment call.

Based on this, in this embodiment of this application, a serving end (that is, a server a) of the client a may allocate, to each user account, an identifier that may uniquely identify the user account. Both an electronic business card already stored in the client a and an electronic business card pushed by another terminal and received by the client a includes the identifier, the terminal can display only the identifier based on the electronic business card, and cannot display the user account indicated by the identifier. In other words, the user account is invisible to a user of the terminal. To be specific, data visible to the user on the client a includes only the identifier, and the user account is invisible to the user on the client a. Alternatively, the electronic business card includes only the identifier and does not include the user account.

For example, when the client a may be a short messaging service message application or a call application, the electronic business card includes only an identifier used to identify a phone number (for example, a mobile phone number), and does not include the phone number. When the client a may be an email application, the electronic business card includes only an identifier used to identify a mailbox address, and does not include the mailbox address. In this way, even if the electronic business card of the client a of the terminal is stolen, if authorization or authentication of the client a of the terminal does not succeed, direct communication with the terminal cannot be performed based on the electronic business card (the identifier in the electronic business card) by using the stolen electronic business card.

For example, in this embodiment of this application, the identifier of the user account may include: information that is obtained by the server a by using the user account as input and a preset algorithm (for example, a hash algorithm) or preset identifier allocation logic and that may uniquely identify the user account. The identifier of the user account may include any one of an "English character", a "character string", or a "combination of an English character and a character string". The character string may include at least one of a digit, an English character, and other special characters (for example, a pound sign "#", an underline "_", an asterisk "*", a hiragana, and a katakana).

The client a may be installed in the terminal. After the user account is logged in to in the client a, the terminal communicates with another terminal by using the client a. For example, after the user account is logged in to in the client, the terminal may share contact information of the client a with another terminal by sharing the electronic business card by using the client a; receive an electronic business card shared by the another terminal; and communicate with a contact corresponding to the electronic business card. A communication method provided in an embodiment of this application may be applied to a process of sharing and using an electronic business card by a terminal.

The communication method provided in this embodiment of this application may be performed by a communications apparatus. The communications apparatus may be a terminal (the mobile phone 100 shown in FIG. 1) configured to manage and use an electronic business card, or a central processing unit (Central Processing Unit, CPU) of the device, or a control module configured to manage and use an electronic business card in the device, or a client configured to manage and use an electronic business card in the terminal. In this embodiment of this application, the communication method provided in this application is described by using an example in which the terminal performs the communication method.

The following describes, by using a specific embodiment, details of a communication method provided in an embodiment of this application.

It is assumed that a client a is installed in each of a terminal 1, a terminal 2, and a terminal X. A server a is a serving end of the client a, and the server a may further have a function of managing an electronic business card. It may be understood that during hardware implementation, the server a may be a serving end (the serving end of the client a) integrated with the function of managing an electronic business card; or the server a may include two separate devices: the "serving end of the client a" and an "electronic business card managing device". This is not limited in this embodiment of this application. The terminal X and the terminal 1 may be a same terminal. The terminal X and the terminal 1 may be alternatively different terminals.

For example, the server a is a serving end integrated with the function of managing an electronic business card. For example, when the client a is a short messaging service message application or a call application, the server a is a base station integrated with the function of managing an electronic business card; when the client a is an email application, the server a is a mail server integrated with the function of managing an electronic business card.

Table 1 shows a table of a correspondence among a terminal, a user account, and an electronic business card in an embodiment of this application.

TABLE 1

Table of a correspondence among a terminal, a client, and an electronic business card

| Terminal | User account of the client a | Electronic business card |
|---|---|---|
| Terminal 1 | User account 1 | Electronic business card 1 (identifier 1) |
| Terminal 2 | User account 2 | Electronic business card 2 (identifier 2) |

The electronic business card 1 is an electronic business card of a user corresponding to the client a of the terminal 1, the electronic business card 1 includes the identifier 1, the identifier 1 is used to identify the user account 1, and the user account 1 corresponds to the terminal 1 (that is, the user account 1 is an account of the user corresponding to the client a of the terminal 1). The electronic business card 2 is an electronic business card of a user corresponding to the client a of the terminal 2, the electronic business card 2 includes the identifier 2, the identifier 2 is used to identify the user account 2, and the user account 2 corresponds to the terminal 2 (that is, the user account 2 is an account of the user corresponding to the client a of the terminal 2).

In a first application scenario of this embodiment of this application, the electronic business card 1 includes only the identifier 1, and does not include the user account 1; the electronic business card 2 includes only the identifier 2, and does not include the user account 2. The user account 1 and the user account 2 are stored in the server a.

In a second application scenario of this embodiment of this application, the electronic business card 1 includes the identifier 1 and the user account 1; and the electronic business card 2 includes the identifier 2 and the user account 2. However, the user account 1 and the user account 2 are not displayed in the client a, that is, the user account 1 and the user account 2 are invisible to a user. In the second application scenario, although the electronic business card includes the user account, when the terminal has not been authorized by the terminal of the user corresponding to the user account, the terminal has no permission of communicating, by using the user account, with the terminal of the user corresponding to the user account.

Figure 3:
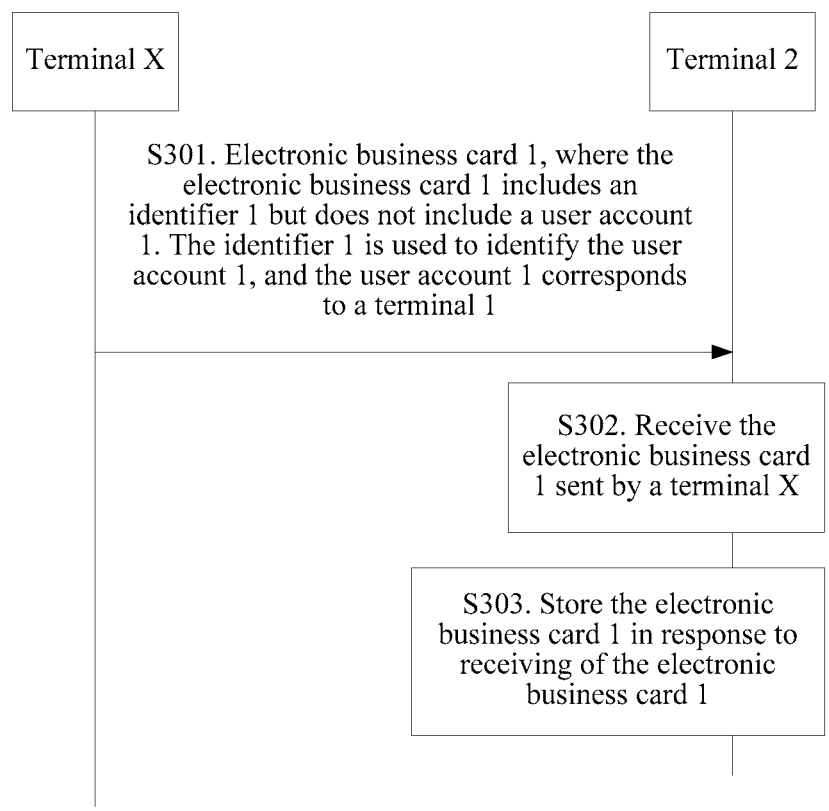
FIG. 3 is a schematic flowchart 1 of a communication method according to an embodiment of this application.

An embodiment of this application provides a communication method. Specifically, as shown in FIG. 3, the communication method includes S301 to S303:

S301: A terminal X sends an electronic business card 1 to a terminal 2, where the electronic business card 1 includes an identifier 1. The identifier 1 is used to identify a user account 1, and the user account 1 corresponds to a terminal 1.

That is, the terminal X may push the electronic business card of the terminal 1 to the terminal 2.

S302: The terminal 2 receives the electronic business card 1 sent by the terminal X.

S303: The terminal 2 stores the electronic business card 1 in response to receiving of the electronic business card 1.

In this embodiment of this application, the electronic business card pushed by the terminal to another terminal includes only the identifier used to identify the user account, and does not include the user account. In this way, even if another terminal steals the electronic business card, the another terminal cannot obtain the corresponding user account and therefore cannot communicate with the terminal.

Optionally, in this embodiment of this application, the terminal X may send the electronic business card 1 to the terminal 2 in any one of the following manners:

Manner (1): The terminal X sends the electronic business card 1 to the terminal 2 by using a client b different from a client a.

For example, in this embodiment of this application, the client a may include any one of a short messaging service message application, a call application, and an email box application, and the client b may include any one of a short messaging service message application, an instant messaging application (for example, WeChat and QQ), and an email box application.

Figure 4:
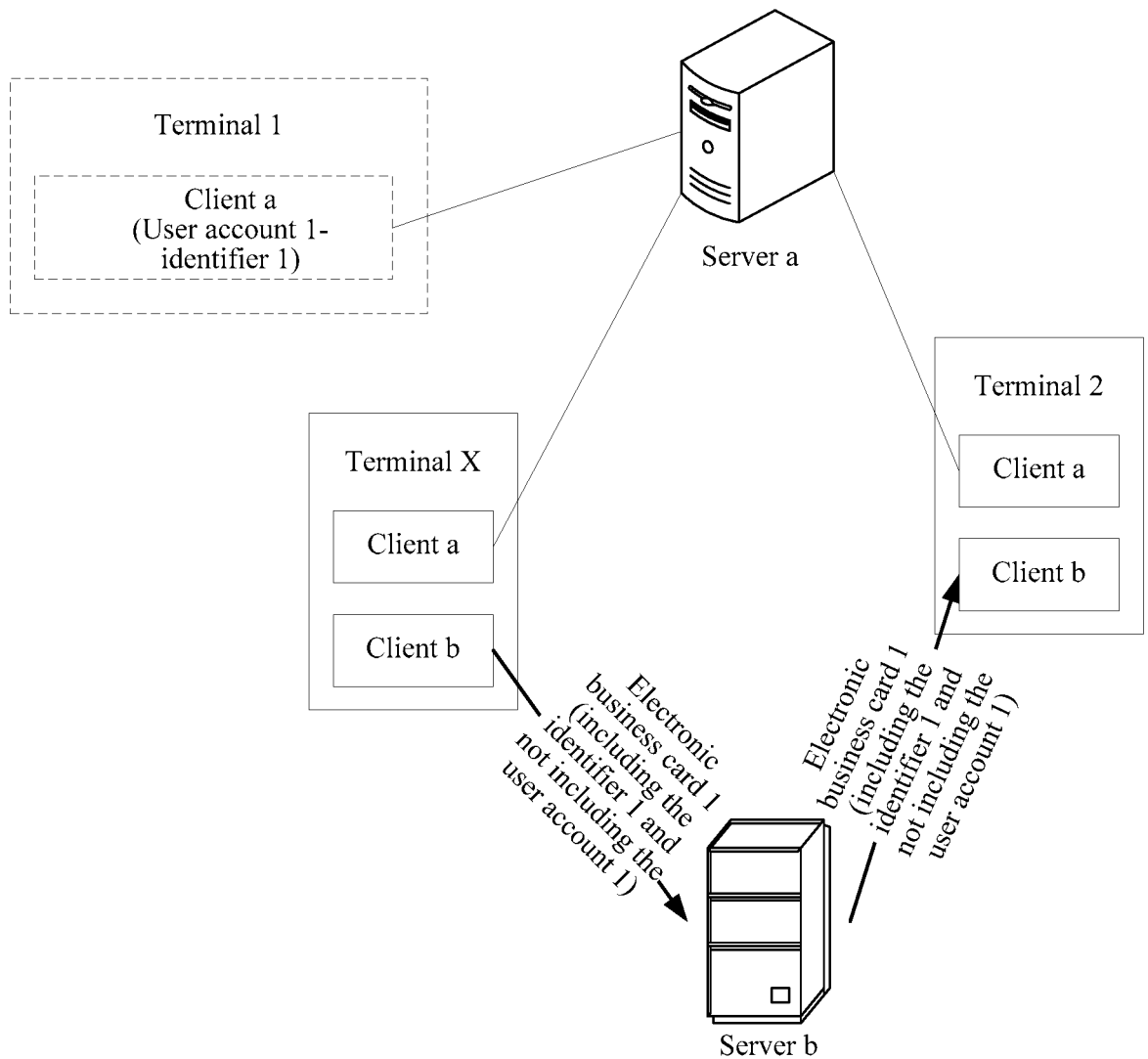
FIG. 4 is a schematic architectural diagram 1 of a network system to which a communication method is applied according to an embodiment of this application.

As shown in FIG. 4, in the manner (1), the client b are installed in each of the terminal X and the terminal 2, and the terminal X and the terminal 1 may communicate with each other by using the client b. The terminal X and the terminal 1 may be a same terminal or may be different terminals.

In this embodiment of this application, "the client a is different from the client b" means that a format of a user account of the client a is different from that of a user account of the client b. For example, when the client a is a short messaging service message application or a call application, a serving end of the client a is a base station, and the user account of the client a is a phone number (for example, a fixed-line phone number or a mobile phone number). The client b may be an instant messaging application or an email box, a format of a user account of the instant messaging application (for example, WeChat) is different from that of the phone number, and a format of a user account (that is, a mailbox address) of the email box is different from that of the phone number. When the client a is an email box, the user account of the client b is a mailbox address. The client b may be an instant messaging application or a short messaging service message application, a format of a user account of the instant messaging application (for example, WeChat) is different from that of the user account (that is, a mailbox address) of the email box, and a format of a user account (that is, the phone number) of the short messaging service message application is different from that of the mailbox address.

Figure 5:
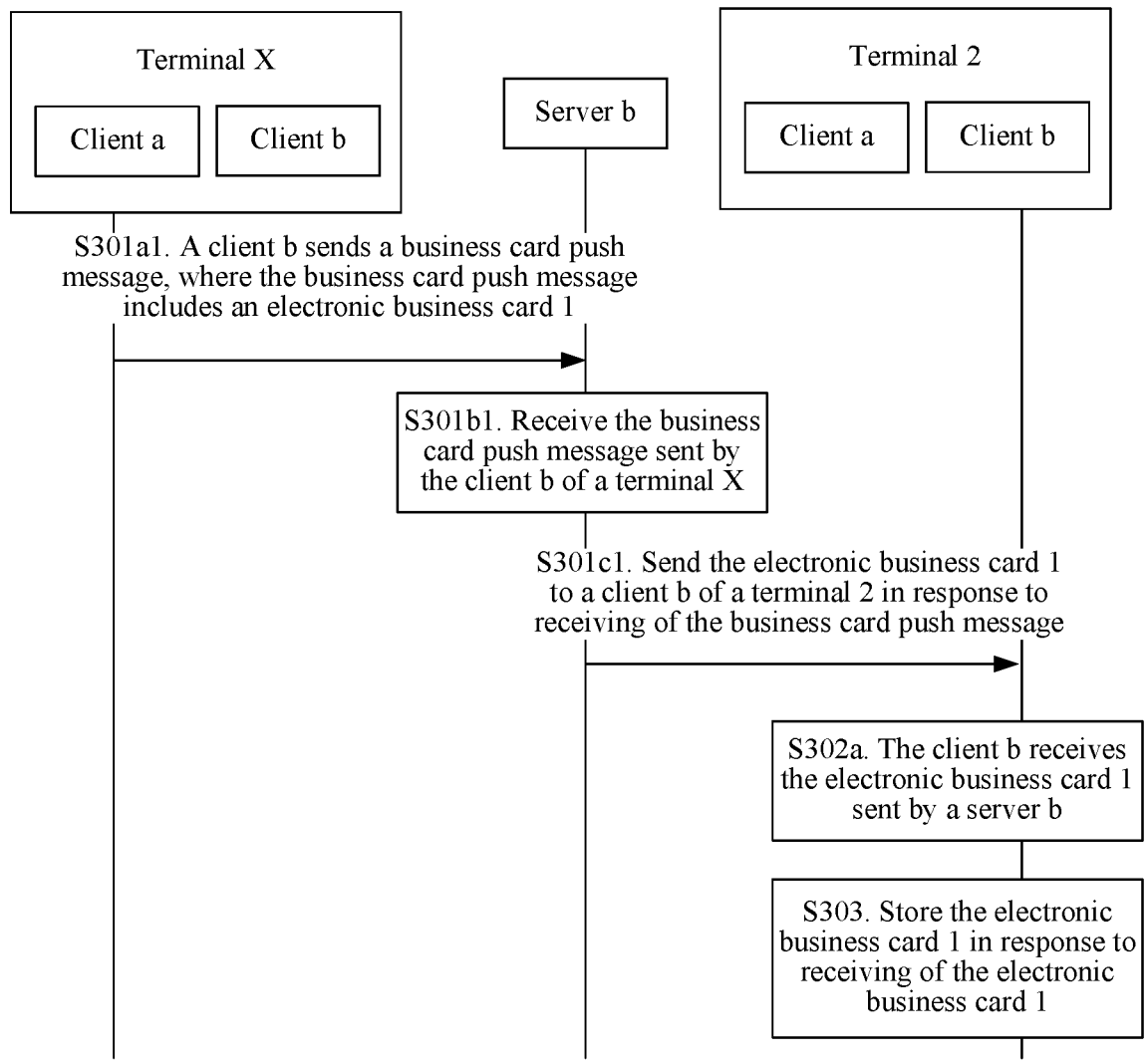
FIG. 5 is a schematic flowchart 2 of a communication method according to an embodiment of this application.

Specifically, in the manner (1), as shown in FIG. 5, S301 shown in FIG. 3 may include S301*a*1 to S301*c*1, and S302 may include S302*a*:

S301*a*1: The terminal X sends a business card push message to a server b (that is, a serving end of the client b) by using a client b, where the business card push message includes the electronic business card 1, and the business card push message is used to request to push the electronic business card 1 to the terminal 2.

S301*b*1: The server b receives the business card push message sent by a client b of the terminal X.

S301*c*1: The server b sends the electronic business card 1 to the client b of the terminal 2 in response to receiving of the business card push message.

S302*a*: The terminal 2 receives, by using the client b, the electronic business card 1 sent by the server b.

In the manner (1) in this embodiment of this application, the server b (that is, the serving end of the client b) is configured to only forward the electronic business card 1.

Optionally, in the manner (1), the terminal X (for example, the mobile phone 100) may send the electronic business card 1 to the terminal 2 (for example, a mobile phone 200) by using the client b in any one of the following scenario (1) and scenario (2):

Scenario (1): The terminal X invokes, on a contact interface of the client a, the client b to push the electronic business card 1 to the terminal 2.

For example, as shown in FIG. 4, the client a is a short messaging service message application or a call application, the server a is a base station, the client b is a WeChat application, and the server b is a WeChat server. A process in which the terminal X (for example, the mobile phone 100) pushes the electronic business card of the terminal 1 to the terminal 2 (for example, the mobile phone 200) is described by using this example.

Figure 6:
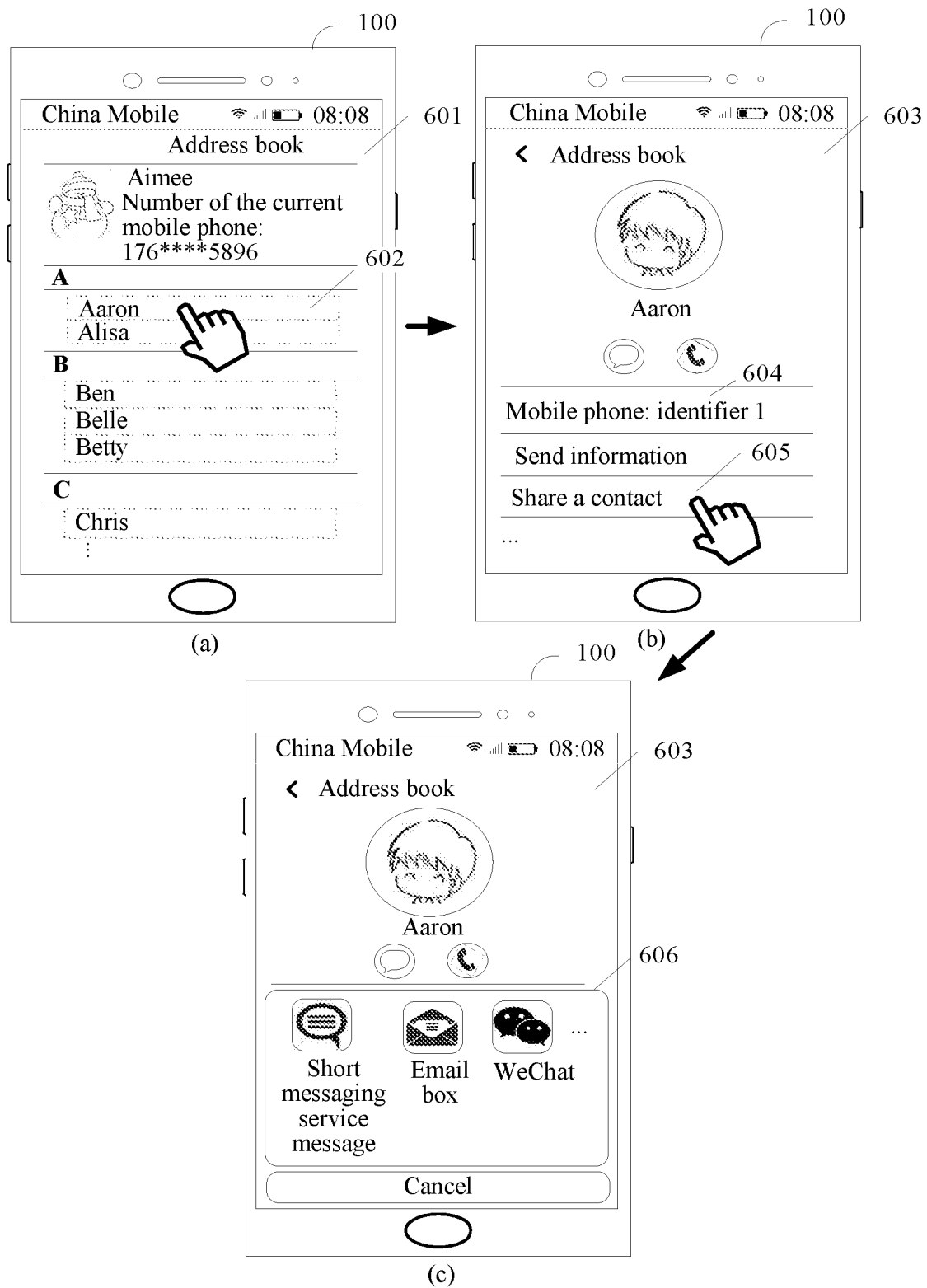
FIG. 6 is a schematic diagram 1 of an example of an interface of a terminal according to an embodiment of this application.

As shown in (a) of FIG. 6, the mobile phone 100 displays an address book interface 601 of the mobile phone 100, and the address book interface 601 includes a plurality of contact information options stored in the mobile phone 100, for example, a contact information option 602 of Aaron (Aaron), a contact information option of Alisa (Alisa), and a contact information option of Ben (Ben). The mobile phone 100 receives a tap operation performed by a user on the contact information option 602, and may display a contact interface 603 shown in (b) of FIG. 6 in response to the tap operation. The contact interface 603 is a contact interface corresponding to the contact information option 602 of Aaron.

Different from a conventional contact interface, the contact interface in this embodiment of this application includes only an identifier of a user account, and does not include the user account. For example, the contact interface 603 shown in (b) of FIG. 6 includes only an "identifier 1" 604, and does not include a phone number (that is, the user account 1) of Aaron. As shown in (b) of FIG. 6, the contact interface 603 further includes a "sharing a contact" option 605 and a "sending information" option. The "sending information" option is used to control the mobile phone 100 to display an interface used to edit a short messaging service message, to send the short messaging service message to another terminal.

The mobile phone 100 receives a tap operation performed by the user on the "sharing a contact" option 605 shown in (b) of FIG. 6, and in response to the tap operation, may display an interface shown in (c) of FIG. 6, that is, display a client selection window (or an application selection window) 606 on the contact interface 603. The client selection window includes icons of a plurality of clients (or applications) that may be configured to send the electronic business card to another terminal. For example, the client selection window 606 includes a short messaging service message icon, an email box icon, and a WeChat icon.

Figure 7:
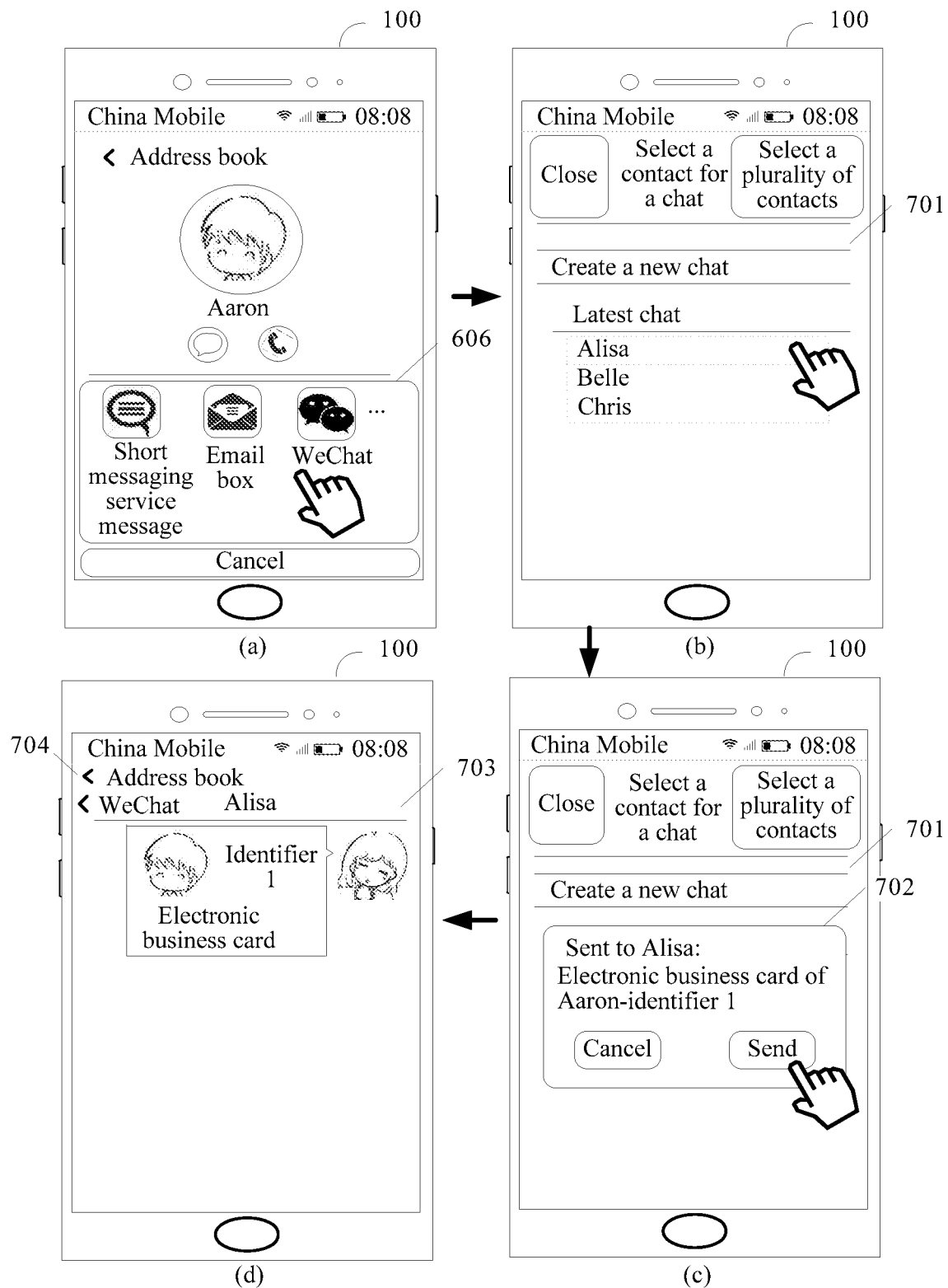
FIG. 7 is a schematic diagram 2 of an example of an interface of a terminal according to an embodiment of this application.

With reference to (c) of FIG. 6, as shown in (a) of FIG. 7, after the user taps the WeChat icon in the client selection window 606, the mobile phone 100 may display a contact selection interface 701 shown in (b) of FIG. 7 in response to the tap operation performed by the user on the WeChat icon, and the user may select, on the contact selection interface 701, a user receiving the electronic business card. When the user selects an Alisa option on the contact selection interface 701, as shown in (c) of FIG. 7, the mobile phone 100 may display an electronic business card sending window 702 on the contact selection interface 701, where the electronic business card sending window 702 includes the identifier 1, a "Cancel" button, and a "Send" button. The "Cancel" button is used to control the mobile phone 100 to cancel sending the electronic business card 1 including the identifier 1, and the "Send" button is used to control the mobile phone 100 to send the electronic business card 1 including the identifier 1 to Alisa. When the user taps the "Send" button in the electronic business card sending window 702, the mobile phone 100 may send the electronic business card 1 to a terminal (that is, the terminal 2) of Alisa by using WeChat (that is, the client b), and display a WeChat communication interface 703 shown in (d) of FIG. 7. The WeChat communication interface 703 shown in (d) of FIG. 7 further includes a "Return to an address book" option 704. In response to a tap operation performed by the user on the "Return to an address book" option 704, the mobile phone 100 may display a display interface shown in (a) of FIG. 6 or (b) of FIG. 6.

Figure 8:
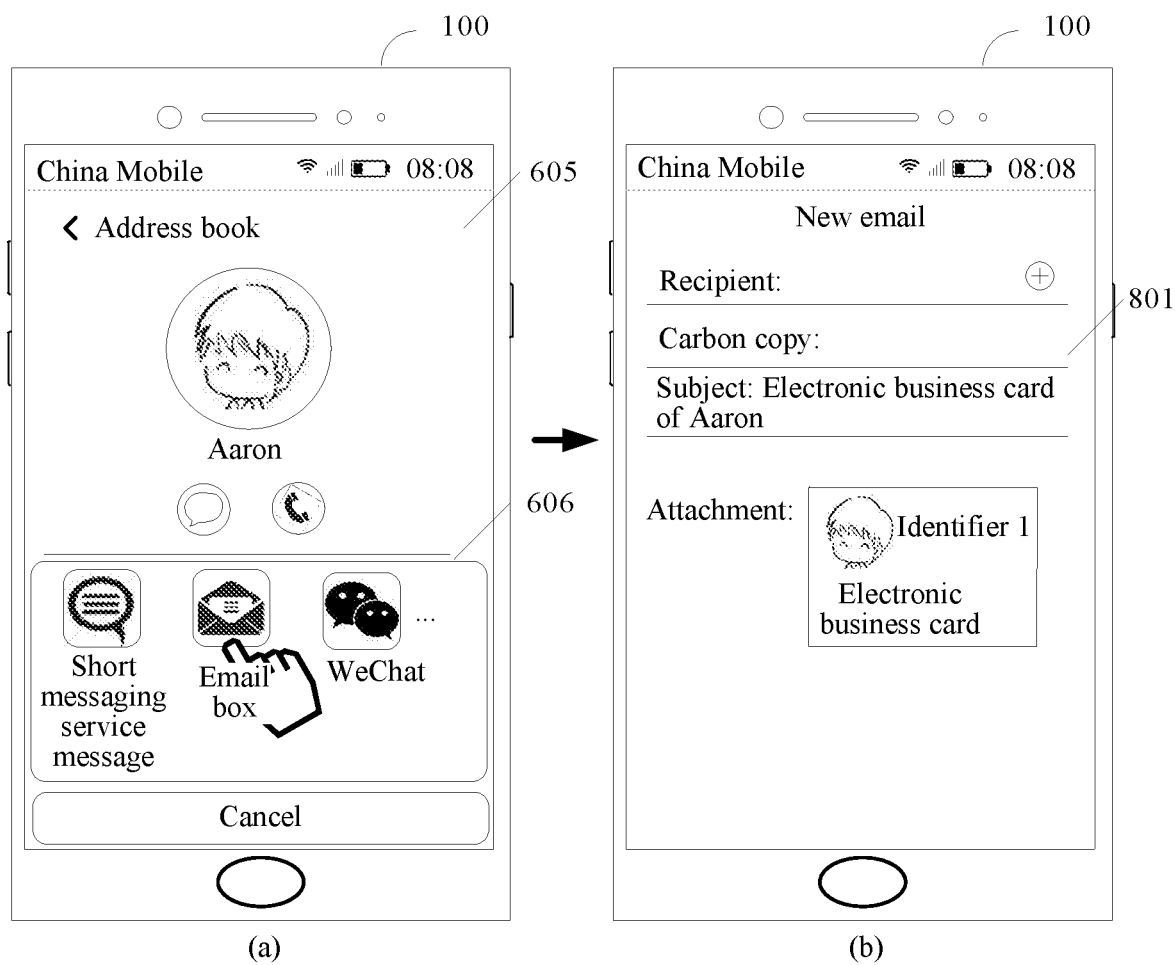
FIG. 8 is a schematic diagram 3 of an example of an interface of a terminal according to an embodiment of this application.

Certainly, with reference to (d) of FIG. 6, as shown in (a) of FIG. 8, the user may alternatively select an email box icon in the client selection window 606, to control the mobile phone 100 to send the electronic business card 1 by using an email. The mobile phone 100 may display a mail sending interface 801 shown in (b) of FIG. 8 in response to the tap operation performed by the user on the email box icon shown in (a) of FIG. 8. The to-be-sent electronic business card 1 in an attachment of a new mail can be learned from the mail sending interface 801. The user may edit a mailbox address of a recipient on the mail sending interface 801, to send the electronic business card 1 to the terminal 2 by using the email box (that is, the client b).

Scenario (2): The terminal X invokes, on a communication interface of the client b, contact information of the client a to push the electronic business card 1 to the terminal 2 by using the client b.

Figure 9A:
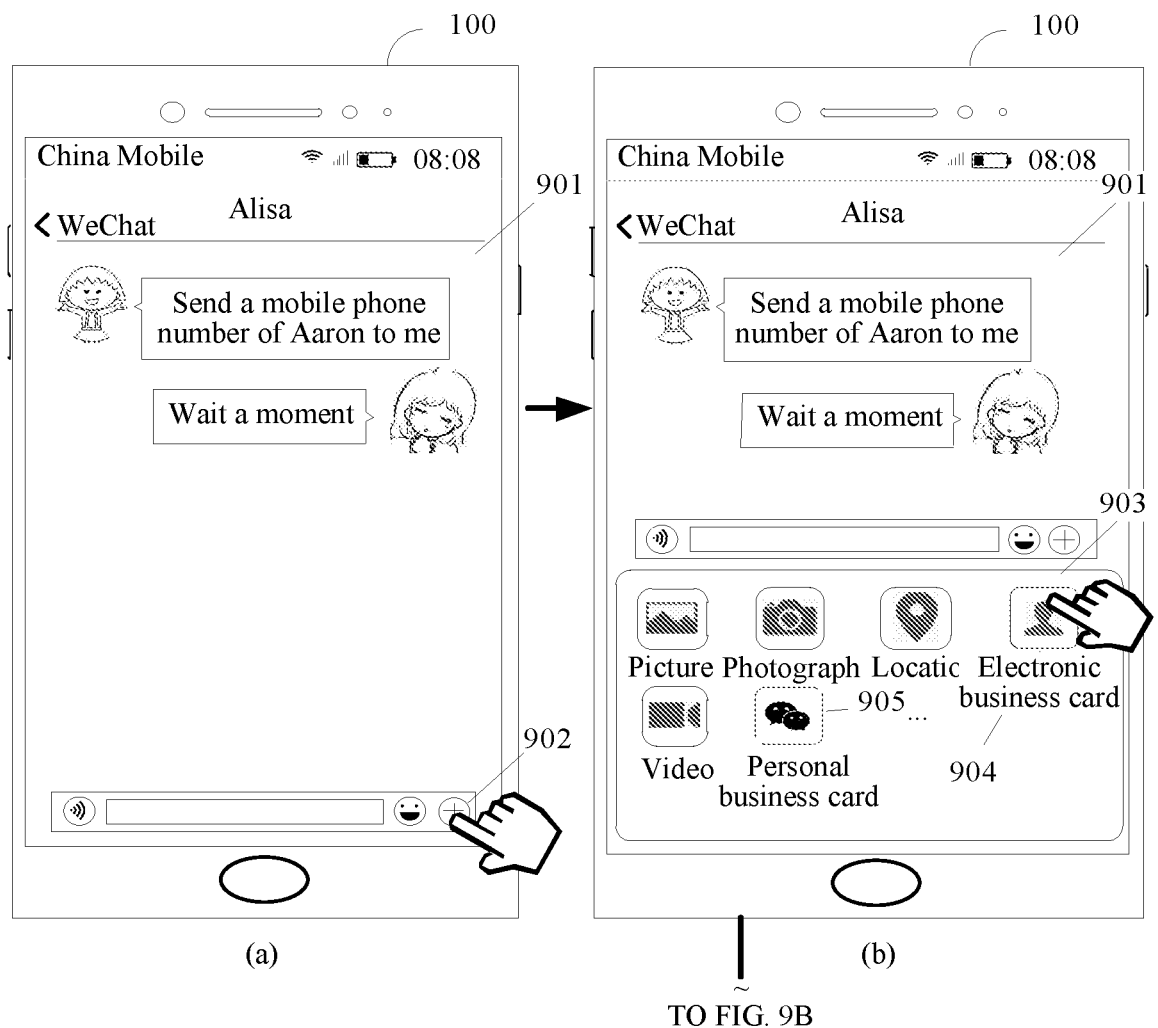
FIG. 9A and FIG. 9B are a schematic diagram 4 of an example of an interface of a terminal according to an embodiment of this application.
Figure 9B:
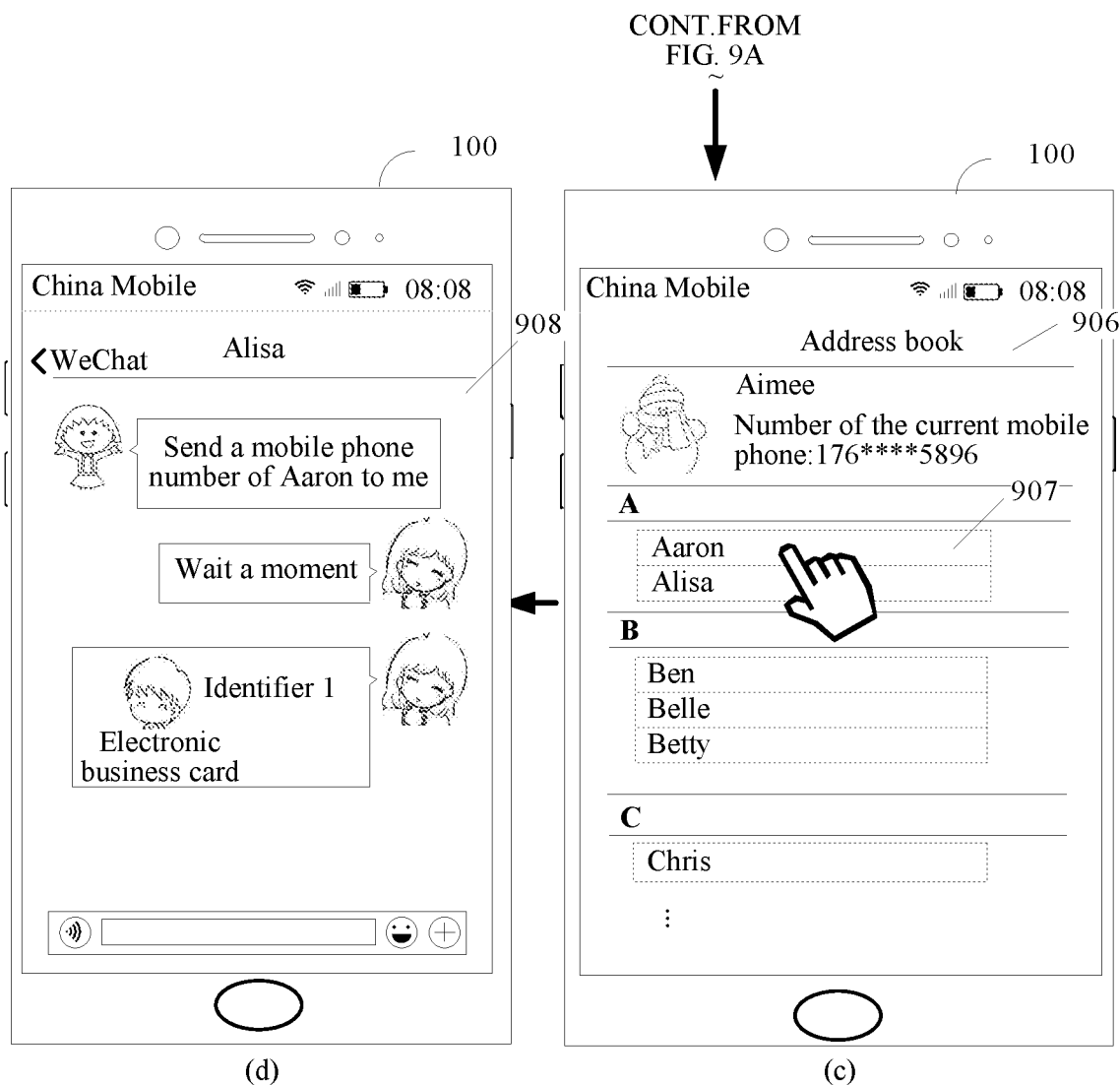

As shown in (a) of FIG. 9A, the mobile phone 100 displays a WeChat communication interface 901 of the mobile phone 100, where the WeChat communication interface 901 includes a chat record of an owner of the mobile phone and Alisa. Alisa requires the owner of the mobile phone to send a phone number of Aaron to Alisa. In this case, the owner of the mobile phone may tap an "Add" button 902 on the WeChat communication interface 901. In response to the tap operation performed by the user on the "Add" button 902, the mobile phone 100 may display the interface shown in (b) of FIG. 9A, and the WeChat communication interface 901 displays a function selection window 903, where the function selection window 903 includes a "Picture" option, a "Photograph" option, an "Electronic business card" option 904, a "Personal business card" option 905, and the like. The "Electronic business card" option 904 is used to invoke an address book of the mobile phone 100, and the "Personal business card" option 905 is used to invoke an address book of WeChat. As shown in (b) of FIG. 9A, after the user taps the "Electronic business card" option 904, in response to the tap operation performed by the user on the "Electronic business card" option 904, the mobile phone 100 displays an address book interface 906 shown in (c) of FIG. 9B. After the user taps a contact option 907 of Aaron on the address book interface 906, the mobile phone 100 may send the electronic business card (that is, the electronic business card 1) of Aaron to Alisa by using WeChat, and display a WeChat communication interface 908 shown in (d) of FIG. 9B.

Figure 10:
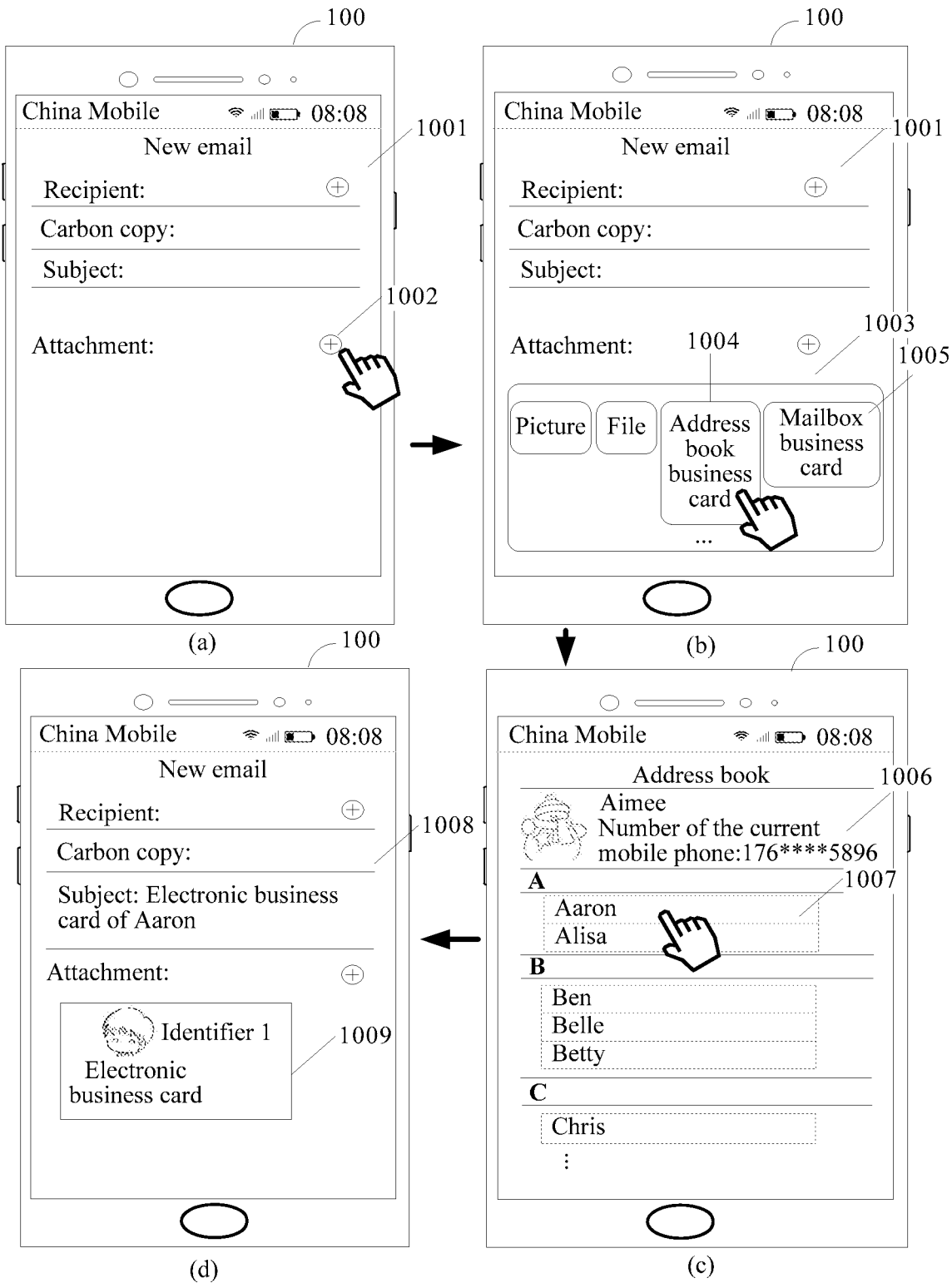
FIG. 10 is a schematic diagram 5 of an example of an interface of a terminal according to an embodiment of this application.

As shown in (a) of FIG. 10, the mobile phone 100 displays a new mail interface 1001 of the mobile phone 100, where the new mail interface 1001 includes an attachment adding button 1002. When the user taps the attachment adding button 1002, in response to the tap operation performed by the user on the attachment adding button 1002, the mobile phone 100 may display an interface shown in (b) of FIG. 10. The new mail interface 1001 displays an attachment selection window 1003, and the attachment selection window 1003 includes a "Picture" option, a "File" option, an "Address book business card" option 1004, a "Mailbox business card" option 1005, and the like. The "Picture" option is used to add a picture stored in the mobile phone 100 to an attachment of a new mail, the "File" option is used to add a file stored in the mobile phone 100 to the attachment of the new mail, the "Address book business card" option 1004 is used to add an electronic business card of a contact in the address book of the mobile phone 100 to the attachment of the new mail, and the "Mailbox business card" option 1005 is used to add an electronic business card of a contact in the email box of the mobile phone 100 to the attachment of the new mail.

As shown in (b) of FIG. 10, after the user taps the "Address book business card" option 1004, in response to the tap operation performed by the user on the "Address book business card" option 1004, the mobile phone 100 displays an address book interface 1006 shown in (c) of FIG. 10. After the user taps a contact option 1007 of Aaron on the address book interface 1006, the mobile phone 100 may add the electronic business card (that is, the electronic business card 1) of Aaron to the attachment of the new mail for sending, and display a new mail interface 1008 shown in (d) of FIG. 10. The new mail interface 1008 includes the electronic business card 1009 of Aaron. An identifier 1 in the electronic business card 1009 is used to identify a phone number of Aaron.

Manner (2): The terminal X sends the electronic business card 1 to the terminal 2 by using the client a.

Figure 11:
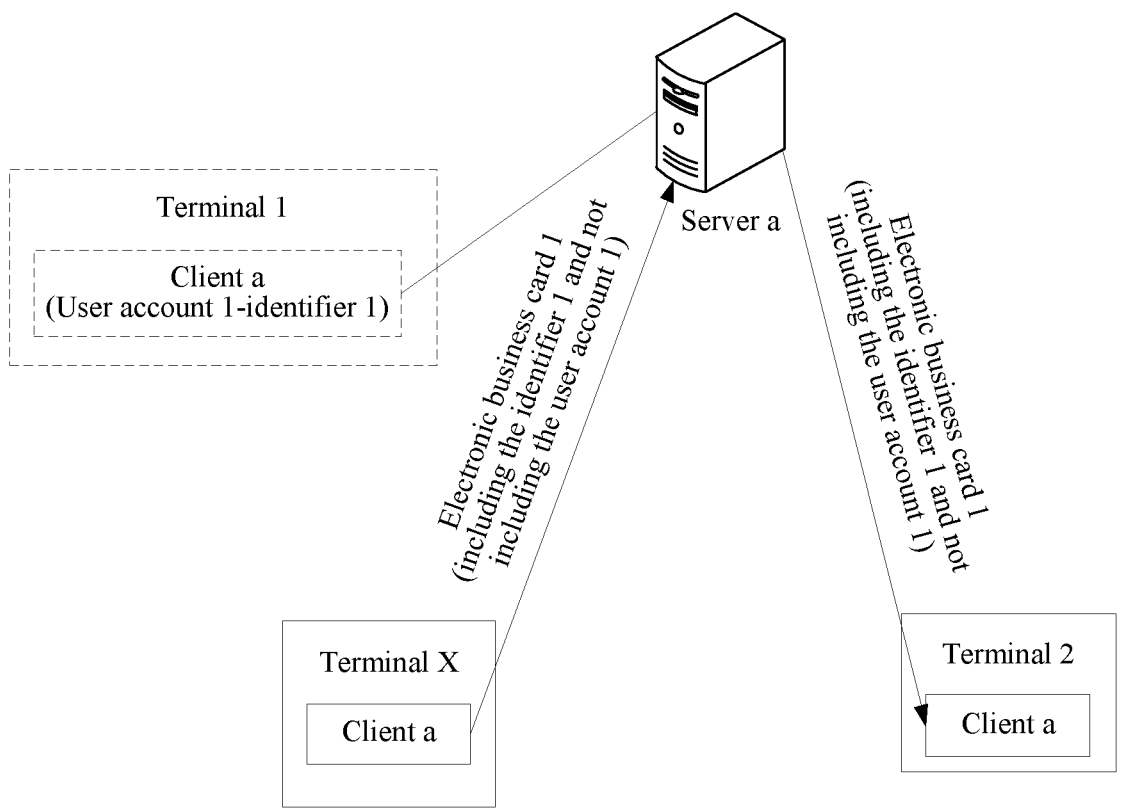
FIG. 11 is a schematic architectural diagram 2 of a network system to which a communication method is applied according to an embodiment of this application.

FIG. 11 is a schematic diagram of a network architecture to which the manner (2) is applied according to an embodiment of this application. As shown in FIG. 11, the terminal X may send the electronic business card 1 to the server a (the serving end of the client a) by using the client a, and the server a forwards the electronic business card 1 to the client a of the terminal 2.

The electronic business card 1 includes the identifier 1, and the identifier 1 is used to identify the user account 1 of the client a. To be specific, the terminal X may send, to the terminal 2 by using the client a, the electronic business card 1 including the "identifier used to identify the user account 1 of the client a". For example, the client a is a short messaging service message application, and the terminal X may send, to the terminal 2 by using a short messaging service message, the electronic business card 1 including the identifier of the phone number. For example, the client a is an email box, and the terminal X may send, to the terminal 2 by using an email, the electronic business card 1 including an identifier of a mailbox address.

It may be understood that when the terminal X sends the electronic business card 1 to the terminal 2 by using the client a, the serving end (the server a) of the client a forwards the electronic business card 1 to the terminal 2. In a process in which the server a forwards the electronic business card 1, the server a may further determine whether the terminal X is the terminal 1 to manage authorization information (including first authorization information) of the terminal 1.

"Whether the terminal X is the terminal 1" is specifically: whether the electronic business card 1 including the identifier 1 is sent by the terminal on which the user account 1 (that is, the user account identified by the identifier 1) is logged in to.

In this embodiment of this application, the server a may store first authorization information for each user account. The first authorization information of a user account includes an identifier of an authorized account of the user account, and a terminal of a user corresponding to the authorized account of the user account has permission of communicating with the terminal of the user corresponding to the user account.

For example, Table 2 shows an example of an authorization information table according to an embodiment of this application.

TABLE 2

Authorization information table

| User account (or an identifier) | First authorization information |
| --- | --- |
| User account 1 (or an identifier 1) | Identifier A (or a user account A) |
|  | Identifier B (or a user account B) |
| User account 2 (or an identifier 2) | Identifier C (or a user account C) |
|  | Identifier D (or a user account D) |
| . . . | . . . |
| User account n (or an identifier n) | Identifier N (or a user account N) |

As shown in Table 2, the server a stores the first authorization information of the user account 1, the user account 2, and the user account n. The authorization information of the user account 1 is used as an example, and the first authorization information of the user account 1 includes the identifier A and the identifier B.

It may be understood that, that the first authorization information of the user account 1 includes the identifier A indicates that a terminal corresponding to the user account A (that is, the user account identified by the identifier A) has permission of communicating with the terminal 1 corresponding to the user account 1. That the first authorization information of the user account 1 includes the identifier B indicates that a terminal corresponding to the user account B (that is, the user account identified by the identifier B) has permission of communicating with the terminal 1 corresponding to the user account 1.

Optionally, the first authorization information of a user account may include an identifier of an authorized account of the user account; or may not include an identifier of an authorized account of the user account and include an authorized account of the user account. The embodiments of this application set no limit thereto. As shown in Table 2, the first authorization information of the user account 1 may alternatively not include the identifier A, and include the user account A.

It should be noted that in this embodiment of this application, a form in which the server a stores the first authorization information of each user account includes but is not limited to the form of the table of the authorization information shown in Table 2. Other forms in which the server a stores the first authorization information of each user account are not described herein in detail in this embodiment of this application.

Figure 12:
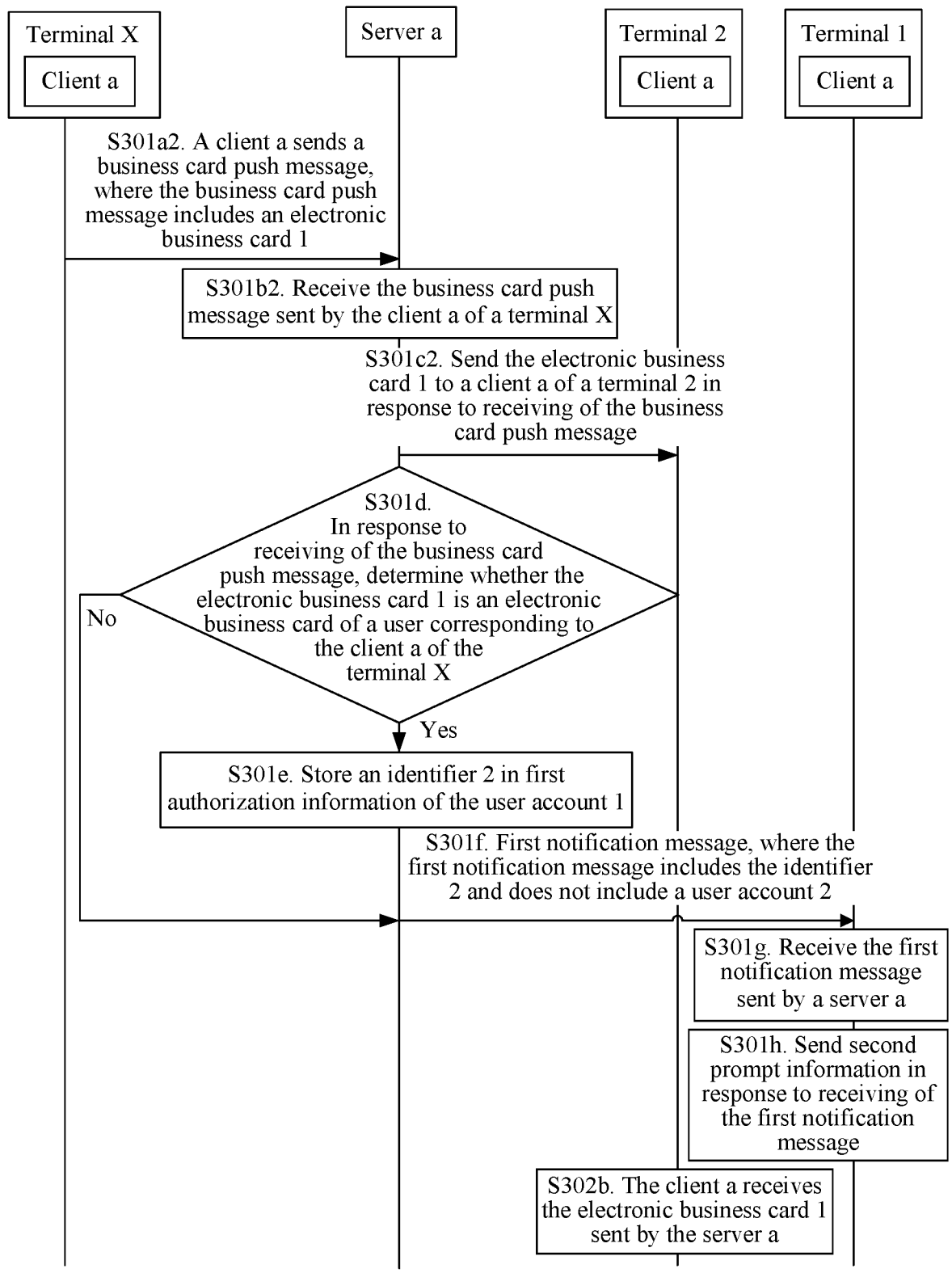
FIG. 12 is a schematic flowchart 3 of a communication method according to an embodiment of this application.

It may be understood that if the terminal X is the terminal 1, it indicates that the electronic business card 1 including the identifier 1 is sent by the terminal on which the user account 1 (that is, the user account identified by the identifier 1) logged in to. The terminal 1 actively pushes the electronic business card 1 to the terminal 2, and it indicates that the terminal 1 allows determining the user account 2 (that is, an account of a user corresponding to the terminal 2) as an authorized account of the user account 1. To be specific, in this embodiment of this application, the server a may determine whether the terminal X is the terminal 1, to determine whether the terminal 1 allows determining the terminal 2 as an authorized account of the user account 1. Specifically, in the manner (2), as shown in FIG. 12, S301 shown in FIG. 3 includes S301a2 to S301c2 and S301d to S301h, and S302 may include S302b:

S301a2: The terminal X sends a business card push message to a server a by using a client a, where the business card push message includes the electronic business card 1, and the business card push message is used to request to push the electronic business card 1 to the terminal 2.

S301b2: The server a receives the business card push message sent by the client a of the terminal X.

S301c2: The server a sends the electronic business card 1 to a client a of the terminal 2 in response to receiving of the business card push message.

S301d: In response to receiving of the business card push message, the server a determines whether the electronic business card 1 is an electronic business card of a user corresponding to the client a of the terminal X.

As shown in Table 1, because the electronic business card 1 includes the identifier 1, and the identifier 1 is used to identify the user account 1 logged in to in the client a of the terminal 1, the server a determines whether the electronic business card 1 is the electronic business card of the user corresponding to the client a of the terminal X (that is, whether the terminal X is the terminal corresponding to the user account 1 identified by the identifier 1 in the electronic business card 1). This is equivalent to that the server a determines whether the terminal X is the terminal 1. When the electronic business card 1 is the electronic business card of the user corresponding to the client a of the terminal X, it indicates that the terminal X is the terminal corresponding to the user account 1 identified by the identifier 1 in the electronic business card 1, that is, the terminal X and the terminal 1 are a same terminal. To be specific, the electronic business card 1 is pushed to the terminal 2 by the terminal corresponding to the user account 1 identified by the identifier 1 in the electronic business card 1. In this case, the server a may determine by default that the terminal 1 (that is, the terminal X) allows determining the account (that is, the user account 2) of the user corresponding to the terminal 2 as an authorized account of the user account 1. In this case, the communication method may proceed to S301e.

S301e: The server a stores an identifier 2 in first authorization information of the user account 1.

Because the business card push message is used to request to push the electronic business card 1 to the terminal 2, the business card push message further includes the identifier 2 used to identify the user account (that is, the user account 2) of the terminal 2. When determining that the terminal X is the terminal 1, the server a may store the identifier 2 in the first authorization information of the user account 1.

It may be understood that after the server a stores the identifier 2 in the first authorization information of the user account 1, the user account 2 identified by the identifier 2 becomes an authorized account of the user account 1, and the terminal 2 corresponding to the user account 2 may have permission of communicating with the terminal 1 corresponding to the user account 1.

For example, assuming that the server a stores an authorization relationship table shown in Table 2, the server a may store the identifier 2 in the first authorization information of the user account 1 shown in Table 2, to obtain an authorization relationship table shown in Table 3.

TABLE 3

Authorization information table

| User account (or an identifier) | First authorization information |
|---|---|
| User account 1 (or an identifier 1) | Identifier A (or a user account A) |
| | Identifier B (or a user account B) |
| | Identifier 2 (or a user account 2) |
| User account 2 (or an identifier 2) | Identifier C (or a user account C) |
| | Identifier D (or a user account D) |
| . . . | . . . |
| User account n (or an identifier n) | Identifier N (or a user account N) |

Optionally, as shown in Table 3, information stored by the server a in the first authorization information of the user account 1 may be the identifier 2, or may be the user account 2. Alternatively, the server a may store both the identifier 2 and the user account 2 in the first authorization information of the user account 1. This is not limited in this embodiment of this application.

Optionally, the first authorization information of each user account may also be stored in a cloud server. The server a may send a query request to the cloud server to request the cloud server to query whether the user account 2 is an authorized account of the user account 1; and receive a query result sent by the cloud server. A specific method used by the cloud server to query whether the user account 2 is an authorized account of the user account 1 is similar to that used by the server a to query whether the user account 2 is an authorized account of the user account 1. Details are not described herein in this embodiment of this application.

Optionally, after S301d, when the electronic business card 1 is not the electronic business card of the user corresponding to the client a of the terminal X, it indicates that the terminal X is not the terminal corresponding to the user account 1 identified by the identifier 1 in the electronic business card 1, that is, the terminal X and the terminal 1 are not a same terminal. In this case, the communication method may proceed to S301f to S301h:

S301f: The server a sends a first notification message to the terminal 1, where the first notification message includes the identifier 2 and does not include a user account 2.

The first notification message is used to indicate to the terminal 1 that the identifier 1 (that is, the identifier of the account 1 of the user corresponding to the terminal 1) is pushed to the terminal 2 corresponding to the user account 2 identified by the identifier 2.

Optionally, the first notification message may further include an identifier X used to identify a user account X (the user account X corresponds to the terminal X), and the first notification message is further used to indicate to the terminal 1 that the identifier 2 is pushed to the terminal 2 by the user account X identified by the identifier X.

S301g: The terminal 1 receives the first notification message sent by the server a.

S301h: The terminal 1 sends second prompt information in response to receiving of the first notification message, where the second prompt information is used to indicate that a second identifier is pushed to a terminal of a user corresponding to a user account identified by a fourth identifier.

For example, the terminal 1 may send the second prompt information in the following manners: displaying, by the terminal 1, an interface including the second prompt information; sending, by the terminal 1, a voice alert, where content of the voice alert is the second prompt information; sending, by the terminal 1, an alert message to a terminal (or a user account) associated with the terminal 1, where the alert message includes the second prompt information; and sending, by the terminal 1, a flash alert and displaying the second prompt information in a notification bar. Specific manners of sending the second prompt information by the terminal 1 include but are not limited to the foregoing listed manners. Details of other manners of sending the second prompt information by the terminal 1 are not described herein in this embodiment of this application.

Optionally, after S301d, when the terminal X is not the terminal 1, the server a may further send an authorization request to the terminal 1, to confirm with the terminal 1 whether to determine the user account 2 as an authorized account of the user account 1. Specifically, for a specific method used by "the server a to send the authorization request to the terminal 1, to confirm with the terminal 1 whether to determine the user account 2 as an authorized account of the user account 1", refer to detailed descriptions in S1701 to S1709 in this embodiment of this application. Details are not described herein in this embodiment of this application.

S302b: The terminal 2 receives, by using the client a, the electronic business card 1 sent by the server a.

Optionally, in the manner (2), the terminal X (for example, the mobile phone 100) may send the electronic business card 3 to the terminal 2 (for example, the mobile phone 200) by using the client a in any one of the following scenario (3) and scenario (4):

Scenario (3): The terminal X invokes, on a contact interface of the client a, the client a to push the electronic business card 1 to the terminal 2.

Figure 13:
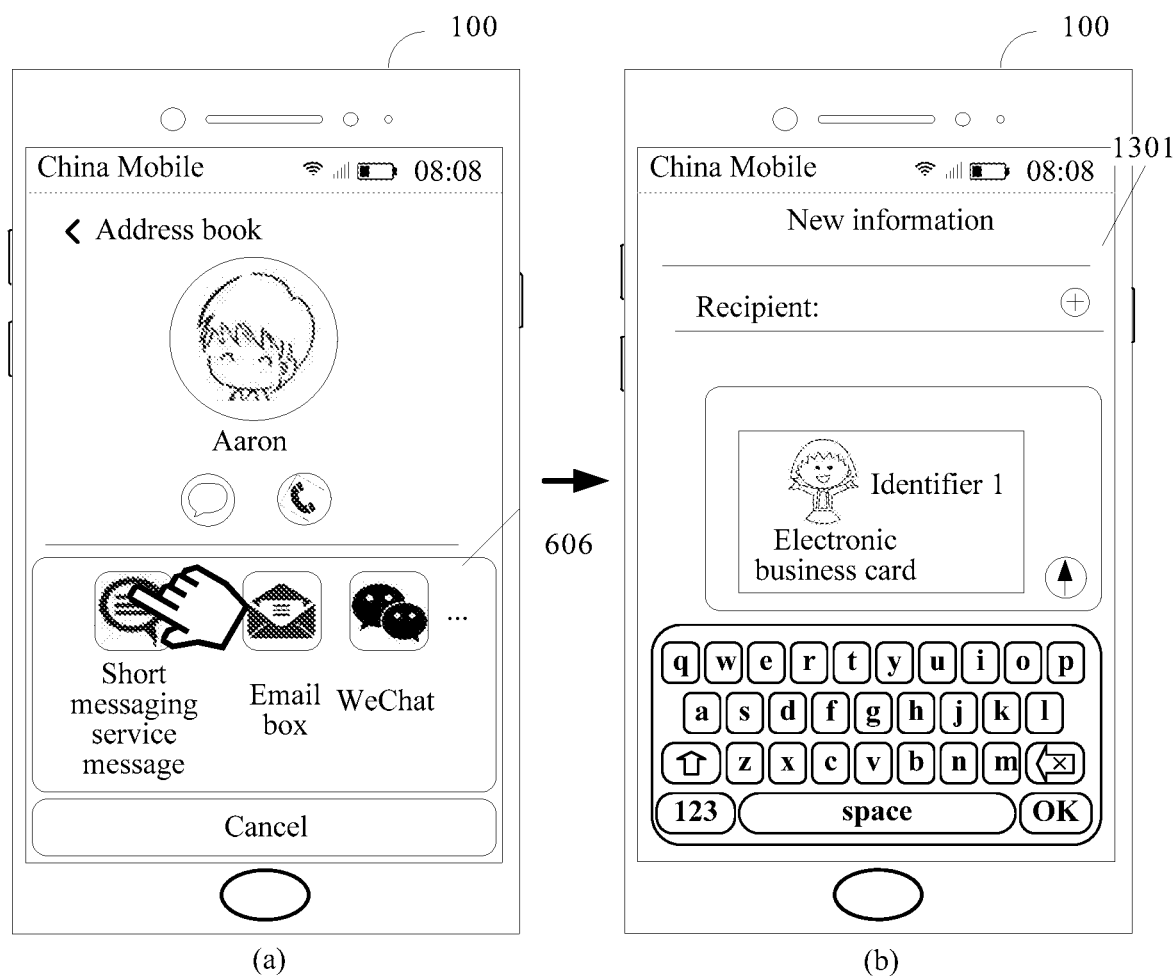
FIG. 13 is a schematic diagram 6 of an example of an interface of a terminal according to an embodiment of this application.

For example, when the user selects a short messaging service message icon in the client selection window 606 shown in (a) of FIG. 13, to control the mobile phone 100 to send, by using an email, the electronic business card 1 including the identifier 1 (the identifier of the phone number of Aaron), in response to a tap operation performed by the user on the short messaging service message icon, the mobile phone 100 may display a short messaging service message editing interface 1301 shown in (b) of FIG. 13. The electronic business card 1 has been added to message content of the short messaging service message editing interface 1301. The user may edit information about a recipient on the short messaging service message editing interface 1301, to send the electronic business card 1 to the terminal 2 by using a short messaging service message (that is, the client a).

Certainly, the mobile phone 100 may further push the electronic business card 1 including a mailbox address identifier (that is, the identifier 1) to the terminal 2 by using an email box (that is, the client a). In this embodiment of this application, an example in which the mobile phone 100 pushes the electronic business card 1 including the mailbox address identifier to the terminal 2 by using the email box is not described in detail.

Scenario (4): The terminal X invokes, on a communication interface of the client a, contact information of the client a to push the electronic business card 1 to the terminal 2 by using the client a.

Figure 14A:
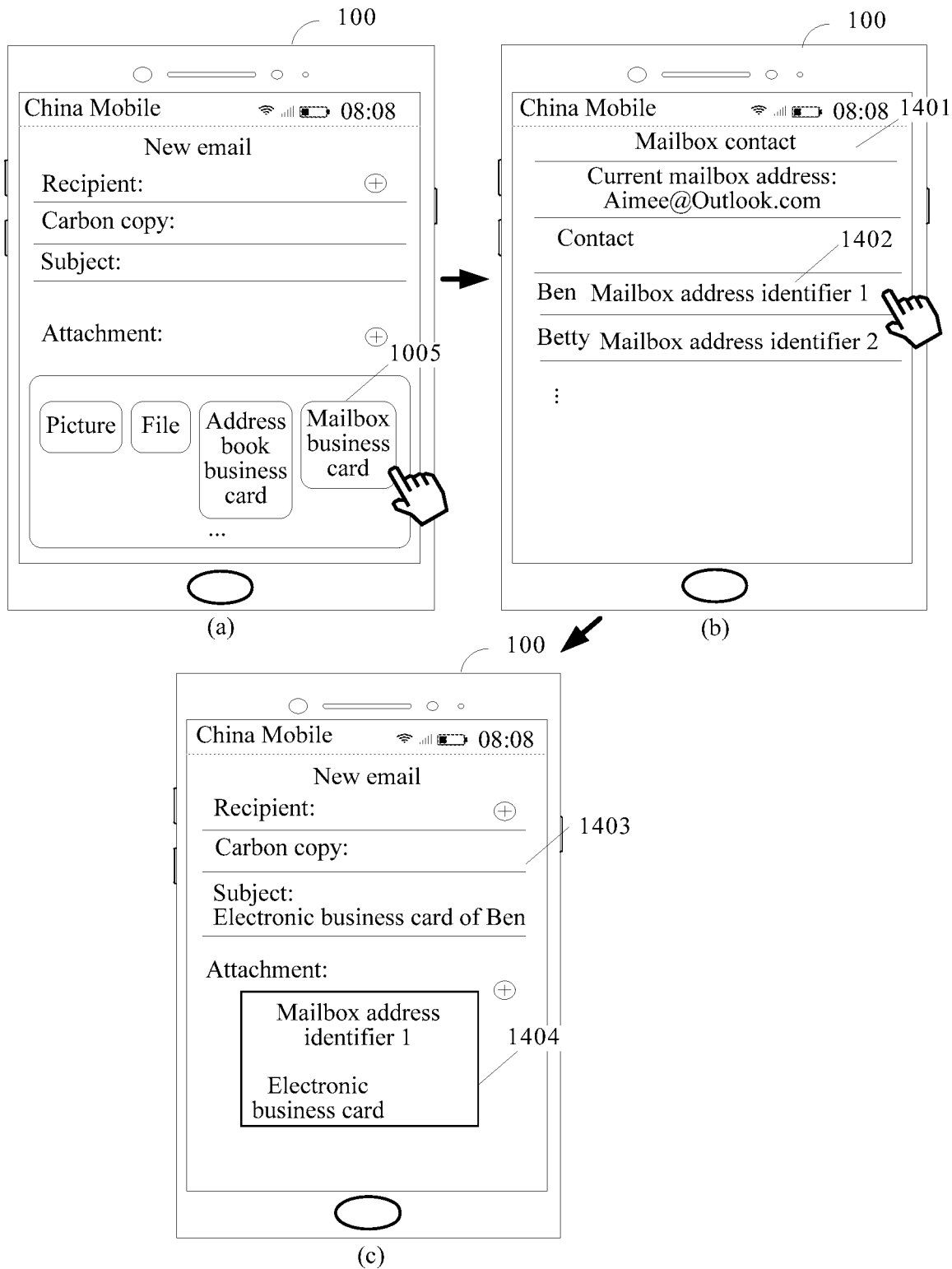
FIG. 14A is a schematic diagram 7 of an example of an interface of a terminal according to an embodiment of this application.

With reference to (b) of FIG. 10, after the user taps a "Mailbox business card" option 1005 shown in (a) of FIG. 14A, in response to the tap operation performed by the user on the "Mailbox business card" option 1005, the mobile phone 100 displays a mailbox contact interface 1401 shown in (b) of FIG. 14A.

It should be noted that in this embodiment of this application, the mailbox contact interface 1401 includes only a mailbox address identifier of a contact, and does not include a mailbox address of the contact. For example, the mailbox contact interface 1401 includes only a mailbox address identifier 1 of Ben and a mailbox address identifier 2 of Betty, and does not include a mailbox address of Ben and a mailbox address of Betty.

After the user taps a contact option 1402 of Ben on the mailbox contact interface 1401, the mobile phone 100 may add an electronic business card (that is, the electronic business card 1) of Ben to an attachment of a new mail for sending, and display a new mail interface 1403 shown in (c) of FIG. 14A, where the new mail interface 1403 includes an electronic business card 1404 of Ben. A mailbox address identifier 1 (that is, the identifier 1) in the electronic business card 1404 is used to identify the mailbox address of Ben.

In the manner (2), as shown in FIG. 12, compared with the manner (1) in which the server b is configured to only forward the electronic business card 1, when the terminal X is the terminal 1, the server a may further determine by default that the terminal 1 allows determining the user account 2 as an authorized account of the user account 1, and store the identifier 2 in the first authorization information of the user account 1. That is, the server a not only can forward the electronic business card 1, but also can manage authorization information (for example, the first authorization information) of the user account.

In this embodiment of this application, the terminal X not only can push an electronic business card of an account of a user corresponding to another terminal to the terminal 2, but also can push the electronic business card of the account of the user corresponding to the terminal X to the terminal 2 (that is, when the terminal X is the terminal 1).

Figure 14B:
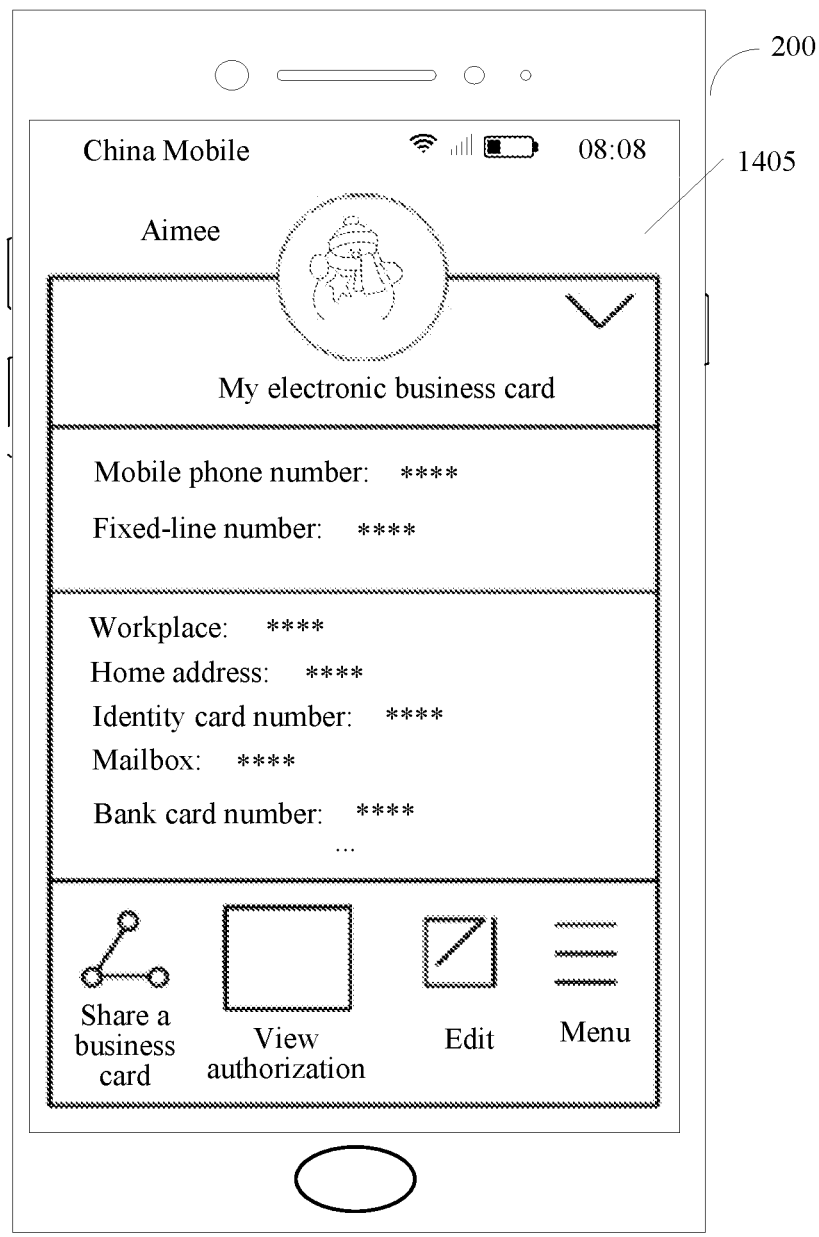
FIG. 14B is a schematic diagram 8 of an example of an interface of a terminal according to an embodiment of this application.

As shown in FIG. 14B, the mobile phone 100 displays an owner information interface 1405. The owner information interface 1405 includes a phone number (that is, the user account) corresponding to the mobile phone 100 (that is, the terminal X) and information such as a fixed-line number, a workplace, a home address, an identity card number, a mailbox, and a bank card number of the owner Amiee of the mobile phone 100. As shown in FIG. 14B, the owner information interface 1405 further includes a "Share a business card" button, a "View authorization" button, an "Edit" button, and the like. The "Share a business card" button is used to share the electronic business card of Amiee with another terminal, the "View authorization" button is used to view authorization information of the phone number of Amiee for another user account, and the "Edit" button is used to edit information such as the phone number, the fixed-line number, the workplace, the home address, the identity card number, the mailbox, and the bank card number of Amiee.

In this embodiment of this application, because the owner information interface 1405 includes a plurality of pieces of information such as the phone number, the fixed-line number, the workplace, the home address, the identity card number, the mailbox, and the bank card number of Amiee; when pushing the electronic business card of Amiee to another terminal, the mobile phone 100 may selectively add some information (or identifiers of some information) on the owner information interface 1405 to the electronic business card.

Figure 14C:
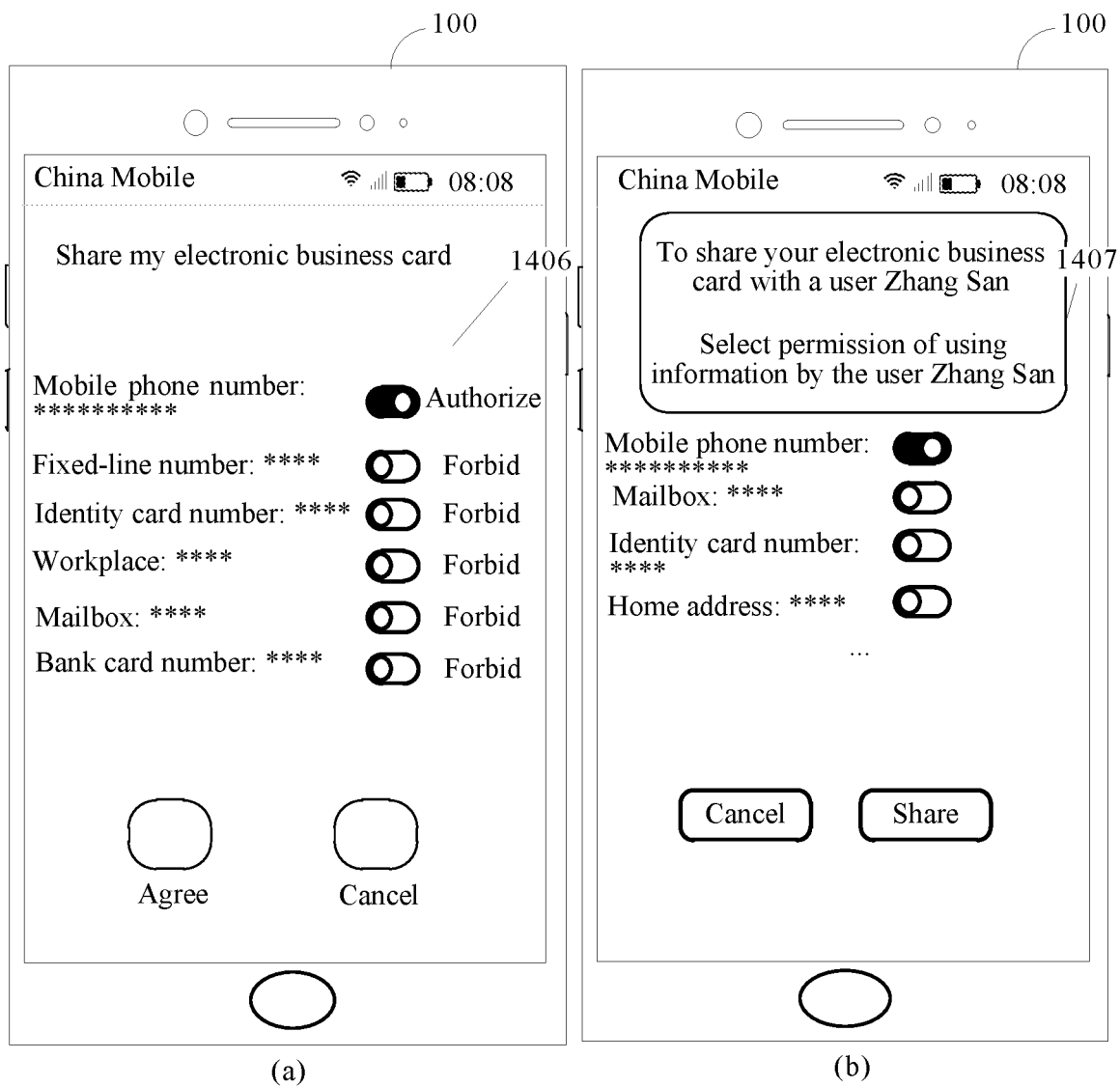
FIG. 14C is a schematic diagram 9 of an example of an interface of a terminal according to an embodiment of this application.

Specifically, in any one of the scenario (1) to the scenario (4), when the mobile phone 100 determines to share an electronic business card of a contact or an owner, for example, in response to a tap operation performed by the user on the "Share" button shown in FIG. 14B, the mobile phone 100 may display an authorization selection window 1406 shown in (a) of FIG. 14C. The authorization selection window 1406 includes a plurality of authorization items such as a "Mobile phone number" authorization item, a "Fixed-line number" authorization item, an "Identity card number" authorization item, a "Workplace" authorization item, a "Mailbox" authorization item, and a "Bank card number" authorization item. The user may enable or disable each authorization item on the authorization selection window 1406, to control whether the electronic business card carries information corresponding to the authorization item.

For example, as shown in (a) of FIG. 14C, because the "Mobile phone number" authorization item is enabled, and the "Fixed-line number" authorization item, the "Identity card number" authorization item, the "Mailbox" authorization item, the "Workplace" authorization item, and the "Bank card number" authorization item are disabled, in response to a tap operation performed by the user on an "Agree" button shown in (a) of FIG. 14C, the mobile phone 100 may send the electronic business card including the phone number of Amiee and not including the fixed-line number, the identity card number, the mailbox, the workplace, and the bank card number. The information such as the phone number included in the electronic business card may be an identifier of the information such as the mobile phone number.

Optionally, in response to the tap operation performed by the user on the "Agree" button shown in (a) of FIG. 14C, the mobile phone 100 may first not send the electronic business card, and display a business card determining interface 1407 shown in (b) of FIG. 14C. The business card determining interface 1407 is used to determine permission that the user chooses to authorize another user (for example, Zhang San). In response to the tap operation performed by the user on the "Share" button on the business card determining interface 1407, the mobile phone sends the electronic business card. A "Cancel" button on the business card determining interface 1407 is used to cancel sending of the electronic business card, and return to the authorization selection window 1406 shown in (a) of FIG. 14C.

It may be understood that, as shown in (a) of FIG. 14C or (b) of FIG. 14C, the user authorizes Zhang san to use only the mobile phone number of the user. Therefore, when using other information (for example, the fixed-line number or the mailbox) of the user, Zhang san needs to request authorization from the mobile phone 100.

Figure 14D:
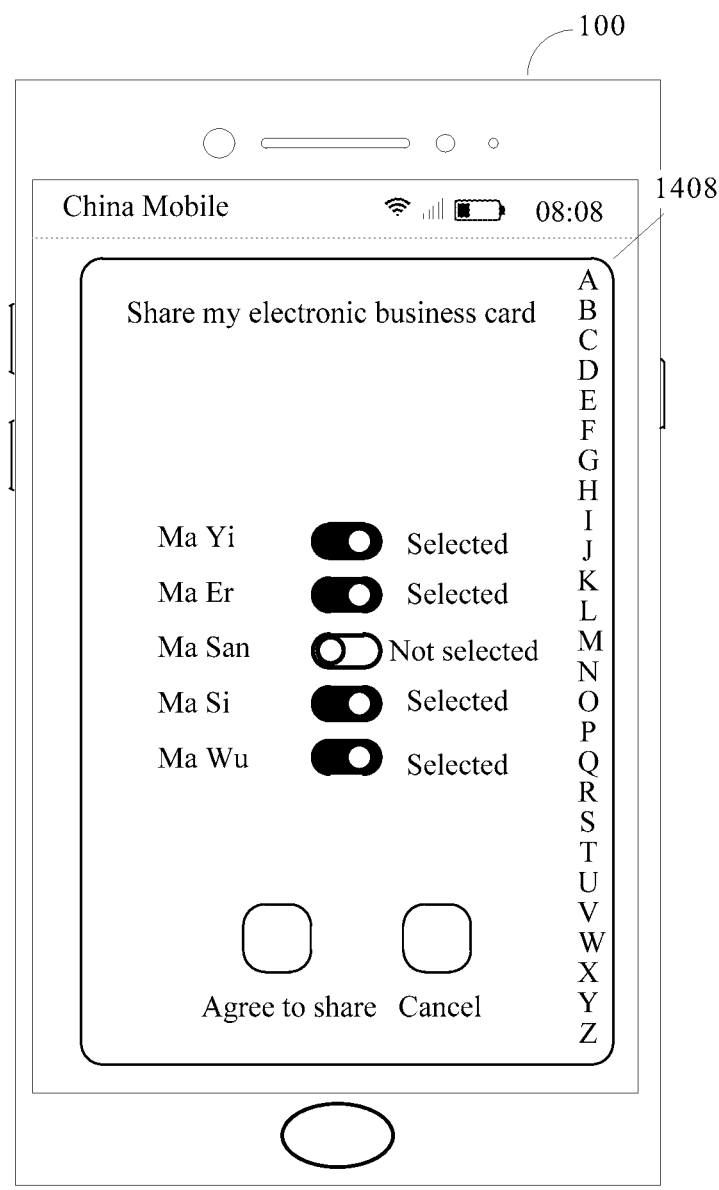
FIG. 14D is a schematic diagram 10 of an example of an interface of a terminal according to an embodiment of this application.

Further, the terminal X may further simultaneously push the electronic business card to a plurality of other terminals. For example, in response to the tap operation performed by the user on the "Agree" button shown in (a) of FIG. 14C, the mobile phone 100 may first not send the electronic business card, and display a contact selection interface 1408 shown in FIG. 14D. The contact selection interface 1408 includes a plurality of contact options, for example, a contact option of Ma Yi and a contact option of Ma Er. The user may enable or disable each contact option on the contact selection interface 1408, to selectively push the electronic business card to a contact corresponding to a contact option selected by the user.

In this embodiment of this application, the terminal X may selectively push the electronic business card to a plurality of contacts simultaneously, and may further selectively add to-be-pushed information to the electronic business card.

It should be noted that to prevent account information of a contact corresponding to an electronic business card from being leaked, when displaying information of the contact, the terminal may display the information of the contact in such a manner that the information of the contact is invisible to the user. For example, the information such as the "Mobile phone number", the "Fixed-line number", the "Workplace", and the "Bank card number" shown in (a) of FIG. 14B and FIG. 14C are all replaced with "*****". In other accompanying drawings in the embodiments of this application, "*****" is also used to replace contact information to prevent account information of a contact corresponding to an electronic business card from being leaked.

A manner of obtaining the electronic business card 1 (that is, the identifier 1) by the terminal 2 includes but is not limited to receiving the electronic business card 1 pushed by the terminal X. For example, the terminal 2 may further scan a two-dimensional code of the client a of the terminal 1 to obtain the electronic business card 1; or the terminal 2 may further receive the electronic business card 1 manually added by the user in the client a of the terminal 2. In this embodiment of this application, details of other manners of obtaining the electronic business card 1 by the terminal 2 are not described herein.

Figure 15A:
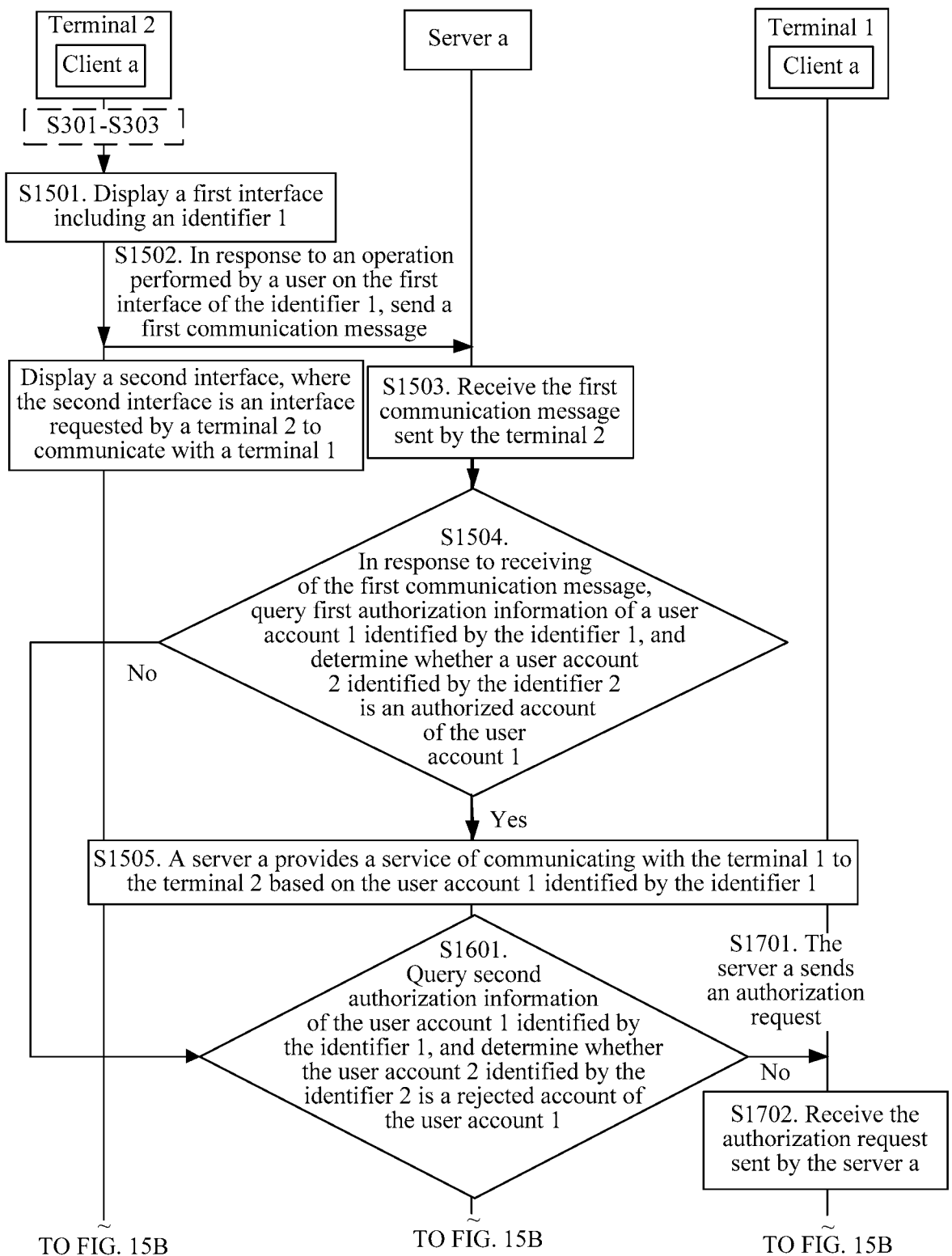
FIG. 15A and FIG. 15B are a schematic flowchart 4 of a communication method according to an embodiment of this application.

It may be understood that after obtaining the electronic business card 1, the terminal 2 may request, based on the electronic business card 1, to communicate with the terminal 1. Specifically, as shown in FIG. 15A, after S301 to S303, the method in this embodiment of this application may include S1501 to S1504 and a subsequent procedure:

S1501: The terminal 2 displays a first interface including the identifier 1.

The first interface may be a contact interface of the terminal 2, or may be a communication interface of the client a of the terminal 2. The terminal 2 may display the identifier 1 but does not display the user account 1 based on the received electronic business card 1.

S1502: In response to an operation performed by a user on the first interface of the identifier 1, the terminal 2 sends a first communication message to the server a, and displays a second interface, where the second interface is an interface on which the terminal 2 requests to communicate with the terminal 1.

The first communication message includes the identifier 1, and the first communication message is used to request to communicate with the terminal 1 corresponding to the user account 1 identified by the identifier 1. For example, the first communication message includes any one of an instant messaging message, an email, and a voice call request.

In the first application scenario, because the electronic business card 1 does not include the user account 1, the first communication message does not include the user account 1. In the second application scenario, the electronic business card 1 includes the user account 1, and the first communication message may include the user account 1 or may not include the user account 1.

For example, the terminal 2 is the mobile phone 200, and the client a is a call application. The first interface including the identifier 1 may be a first interface 1602 shown in (a) of FIG. 16A. The first interface 1601 shown in (a) of FIG. 16A includes an "identifier 1" 1603 (that is, the phone number of Aaron) and a "Call" button 1602.

Figure 16A:
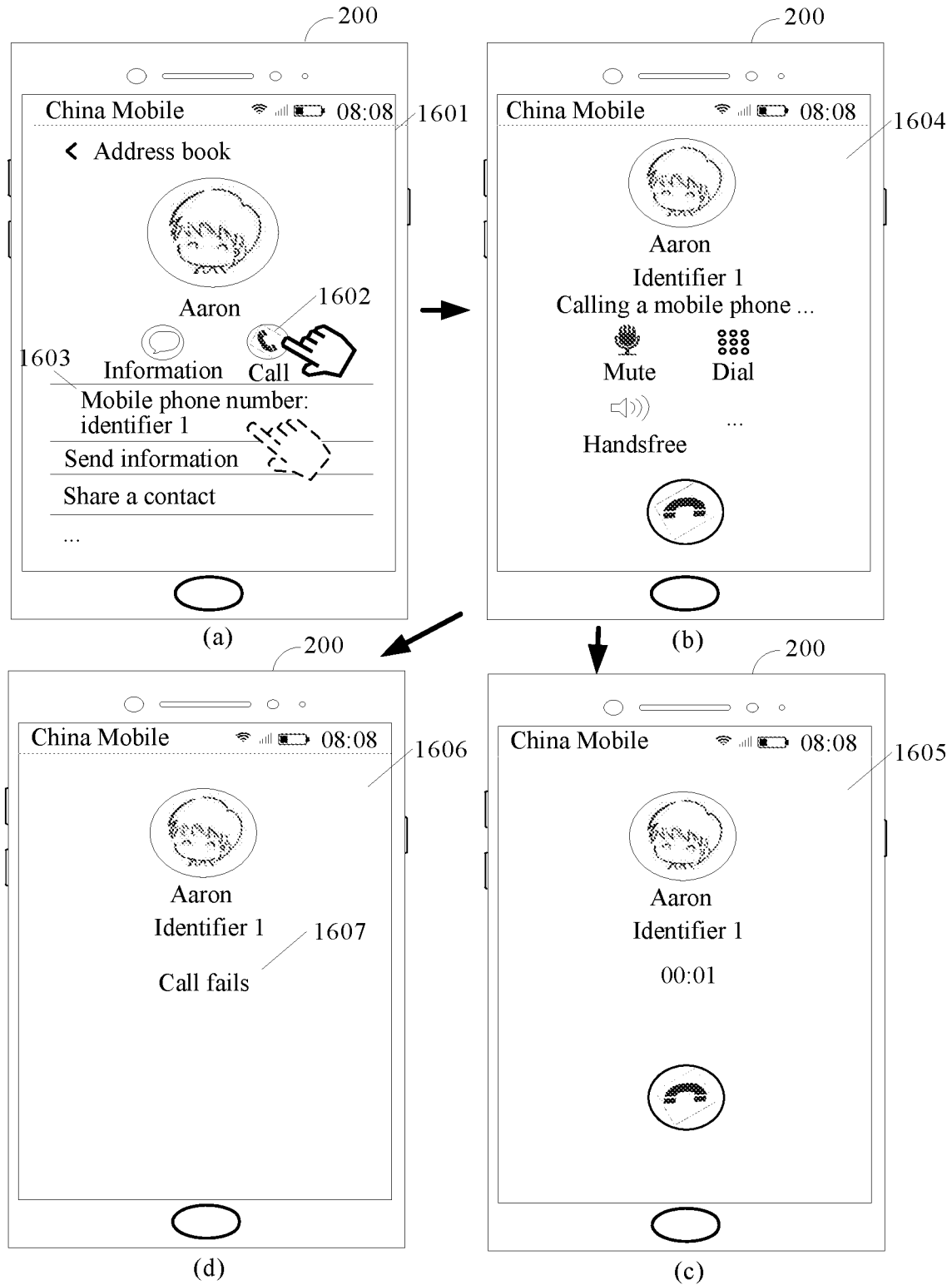
FIG. 16A is a schematic diagram 11 of an example of an interface of a terminal according to an embodiment of this application.

Referring to FIG. 16A, when the user taps the "identifier 1" 1603 or the "Call" button 1602 shown in (a) of FIG. 16A, in response to the tap operation (that is, the operation performed by the user on the first interface of the identifier 1), the mobile phone 200 may display a second interface 1604 shown in (b) of FIG. 16A, where the second interface 1604 is an interface on which the mobile phone 200 requests to communicate with the terminal of Aaron.

Figure 16B:
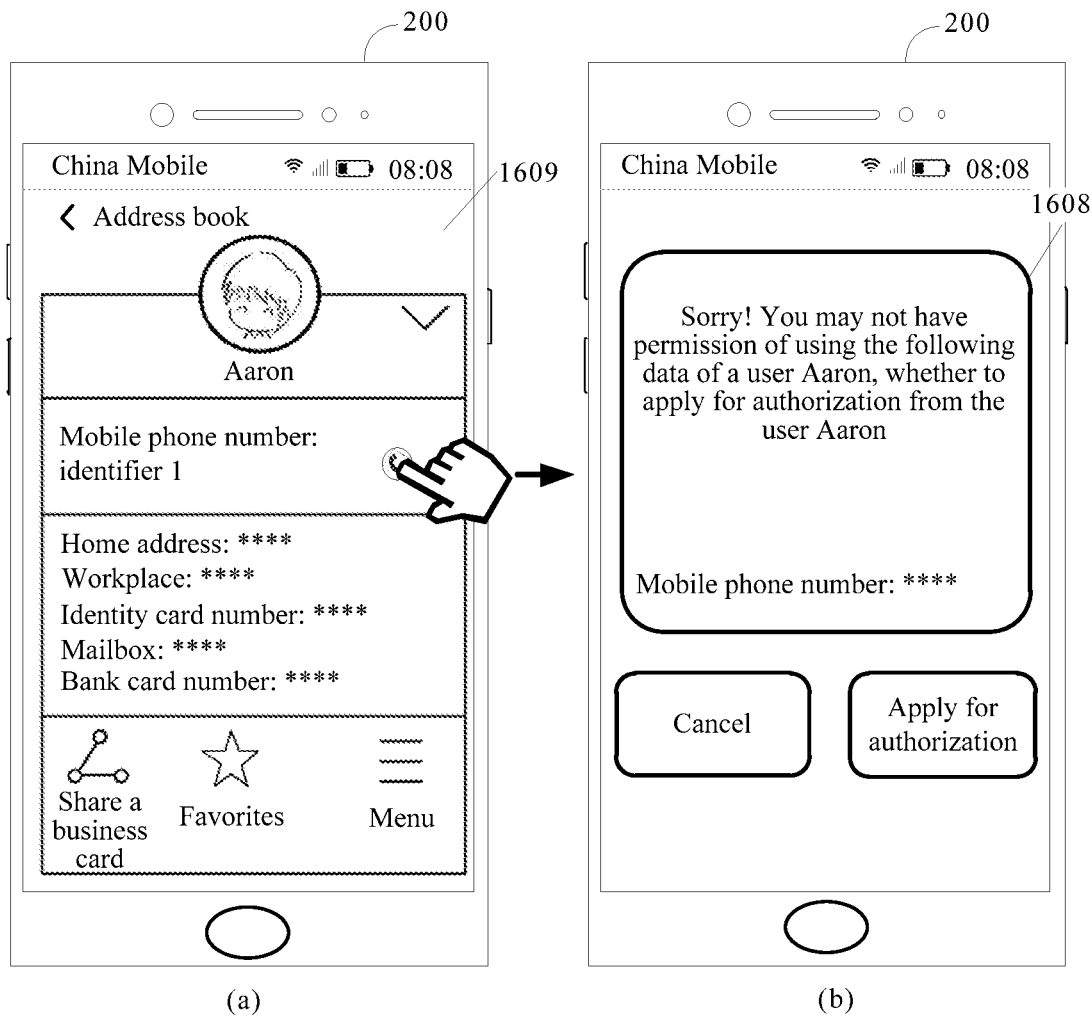
FIG. 16B is a schematic diagram 12 of an example of an interface of a terminal according to an embodiment of this application.

Optionally, when the user taps the "identifier 1" 1603 or the "Call" button 1602 shown in (a) of FIG. 16A, in response to the tap operation, the mobile phone 200 may not display the second interface 1604 shown in (b) of FIG. 16A, and first display a display interface 1608 shown in (b) of FIG. 16B. The display interface 1608 includes prompt information used to prompt whether to apply for authorization from Aaron, for example, "You may not have the following data using permission of the user Aaron, whether to apply for authorization from the user Aaron!" The display interface 1608 further includes a "Cancel" button and an "Apply for authorization" button. The "Apply for authorization" button is used to request the server a to apply for authorization from Aaron when the user account 2 (that is, the mobile phone number of the mobile phone 200) is not an authorized account of the user account 1 (that is, the mobile phone number of Aaron), that is, send the authorization request to a mobile phone 300. In response to the tap operation performed by the user on the "Apply for authorization" button, the mobile phone 200 may display the second interface 1604 shown in (b) of FIG. 16A.

In a case, the "Cancel" button on the display interface 1608 is used to cancel calling Aaron, and in response to the tap operation performed by the user on the "Cancel" button, the mobile phone 200 may display the first interface 1601 shown in (a) of FIG. 16A.

In another case, the "Cancel" button on the display interface 1608 is used to request the server a not to apply for authorization from Aaron (that is, does not need to send the authorization request to the mobile phone 300) when the user account 2 is not an authorized account of the user account 1, and to directly return a communication failure message. In response to the tap operation performed by the user on the "Cancel" button, the mobile phone 200 may display the second interface 1604 shown in (b) of FIG. 16A.

Optionally, the first interface may further be a first interface 1609 shown in (a) of FIG. 16B. In response to the tap operation performed by the user on the "Call" button, the mobile phone 200 may display a display interface 1608 shown in (b) of FIG. 16B. As shown in (a) of FIG. 16B, in addition to the identifier 1 of the mobile phone number of Aaron, the first interface 1609 may further include the workplace, the home address, the identity card number, the mailbox, the bank card number, and the like of Aaron.

Figure 17:
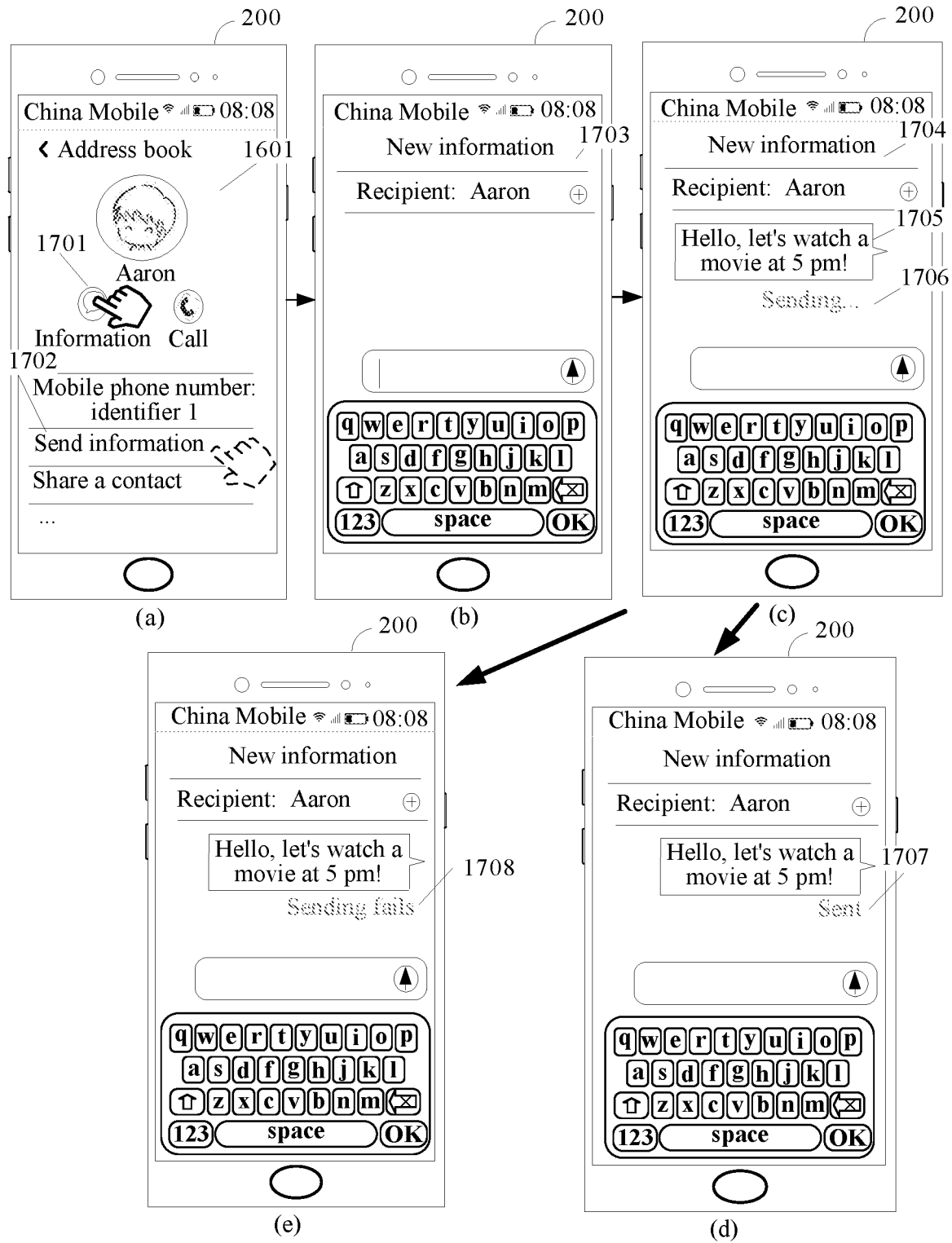
FIG. 17 is a schematic diagram 13 of an example of an interface of a terminal according to an embodiment of this application.

As shown in (a) of FIG. 17, the mobile phone 200 displays a contact interface of Aaron. The contact interface 1601 includes the identifier 1, an "Information" button 1701, and a "Send information" option 1702. When the user taps the "Information" button 1701 or the "Send information" option 1702 shown in (a) of FIG. 17, in response to the tap operation, the mobile phone 200 may display a first interface 1703 shown in (b) of FIG. 17. The first interface 1703 is an interface on which the mobile phone 200 edits a short messaging service message sent by the terminal of Aaron. After the user edits the short messaging service message and taps the send button on the first interface 1703, in response to the tap operation (that is, the operation performed by the user on the first interface of the identifier 1), the mobile phone 200 may send a short messaging service message and display a second interface 1704 shown in (c) of FIG. 17. The second interface 1704 includes the sent short messaging service message 1705. After the mobile phone 200 sends the short messaging service message 1705, the short messaging service message 1705 may not be sent to the terminal of Aaron. Therefore, the second interface 1704 may further include indication information "Sending" 1706, to indicate that the short messaging service message 1705 is being sent to the terminal of Aaron.

S1503: The server a receives the first communication message sent by the terminal 2.

It may be understood that because the first communication message is received from the terminal 2, the first communication message further includes the identifier 2, the identifier 2 is used to identify the user account 2, and the second user account corresponds to the terminal 2.

S1504: In response to receiving of the first communication message, the server a queries the first authorization information of the user account 1 identified by the identifier 1, and determines whether the user account 2 identified by the identifier 2 is an authorized account of the user account 1.

The first authorization information of the user account 1 includes a plurality of authorization identifiers, each authorization identifier is used to identify an authorized account of the user account 1, and a terminal of a user corresponding to the authorized account has permission of communicating with the terminal 1.

The server a may query the first authorization information of the user account 1 identified by the identifier 1, and determine whether the first authorization information of the user account 1 includes the identifier 2 or the user account 2. When the first authorization information of the user account 1 includes the identifier 2 or the user account 2, it indicates that the user account 2 is an authorized account of the user account 1, and S1505 is performed.

S1505: The server a provides a service of communicating with the terminal 1 to the terminal 2 based on the user account 1 identified by the identifier 1.

In this embodiment of this application, regardless of whether the first communication message includes the user account 1, the server needs to determine whether the user account 2 is an authorized account of the user account 1; and only when the user account 2 is an authorized account of the user account 1, the server may provide the service of communicating with the terminal 1 to the terminal 2.

In an implementation of this embodiment of this application, the first communication message is a short messaging service message or an email. In this implementation, the providing, by the server a, a service of communicating with the terminal 1 to the terminal 2 based on the user account 1 includes: sending, by the server a, the first communication message to the terminal 1 based on the user account 1. With reference to FIG. 17, when the user account 2 is an authorized account of the user account 1, the server a may send a short messaging service message 1705 (that is, the first communication message) to the terminal (that is, the terminal 1) of Aaron.

Optionally, in this implementation, after sending the first communication message to the terminal 1, the server a may reply to the terminal 2 with a second notification message. The second notification message is used to indicate that the first communication message is already sent to the terminal 1. After receiving the second notification message, the terminal 2 (that is, the mobile phone 200) may display a communication interface shown in (d) of FIG. 17. The communication interface shown in (d) of FIG. 17 includes prompt information "Sent" 1707, where the prompt information "Sent" 1707 is used to prompt the user that the short messaging service message 1705 is already sent to the terminal of Aaron.

In another implementation of this embodiment of this application, the first communication message may be a voice communication request initiated by the terminal 2 to the terminal 1. Regardless of whether the electronic business card 1 includes the user account 1, the server a may obtain the user account 1 based on the identifier 1, and then directly provide the service of communicating with the terminal 1 to the terminal 2 based on the user account 1. Specifically, the providing, by the server a, the service of communicating with the terminal 1 to the terminal 2 based on the user account 1 includes: initiating, by the server a, a paging (paging) request to the terminal 1 based on the user account 1; after receiving a paging response sent by the terminal 1, establishing a Radio Resource Control (Radio Resource Control, RRC) connection to the terminal 1, and sending incoming call information of the terminal 2 to the terminal 1, to provide an incoming call alert of the terminal 2 on the terminal 1. With reference to (b) of FIG. 16A, after the terminal 1 answers a voice call, the terminal 2 (for example, the mobile phone 200) may display a call interface 1605 shown in (c) of FIG. 16A.

Optionally, in another implementation of this embodiment of this application, the first communication message may be a voice communication request initiated by the terminal 2 to the terminal 1. The electronic business card 1 does not include the user account 1, that is, the client 2 of the terminal 2 does not include the user account 1. The server a may send the user account 1 to the client a of the terminal 2, and the client a of the terminal 2 initiates a voice call request to the terminal 1 again based on the user account 1. It should be noted that in this implementation, even if the client a of the terminal 2 receives the user account 1, the user account 1 may be only invoked by the client a as internal data and is not presented to the user. In other words, the user account 1 is invisible to the user in the client a of the terminal 2. Further, to prevent the user account 1 of the client a of the terminal 2 from being stolen, the terminal 2 may delete the user account 1 after initiating a voice call request to the terminal 1 again based on the user account 1.

After S1504, when the first authorization information of the user account 1 does not include the identifier 2 or the user account 2, it indicates that the user account 2 is not an authorized account of the user account 1, and S1601 to S1604 are performed.

It may be understood that, that the user account 2 is not an authorized account of the user account 1 includes the following two cases: (1) the user account 2 is a rejected account of the user account 1; and (2) the user account 2 is neither an authorized account of the user account 1 nor a rejected account of the user account 1. A terminal of a user corresponding to the rejected account of the user account 1 has no permission of communicating with the terminal corresponding to the user account 1. When the user account 2 is not an authorized account of the user account 1, it may be determined whether the user account 2 is a rejected account of the user account 1. Specifically, after S1504, if the first authorization information of the user account 1 does not include the identifier 2 or the user account 2, the server a may proceed to S1601 and S1602 to S1604 or S1701 to S1709.

Figure 15B:
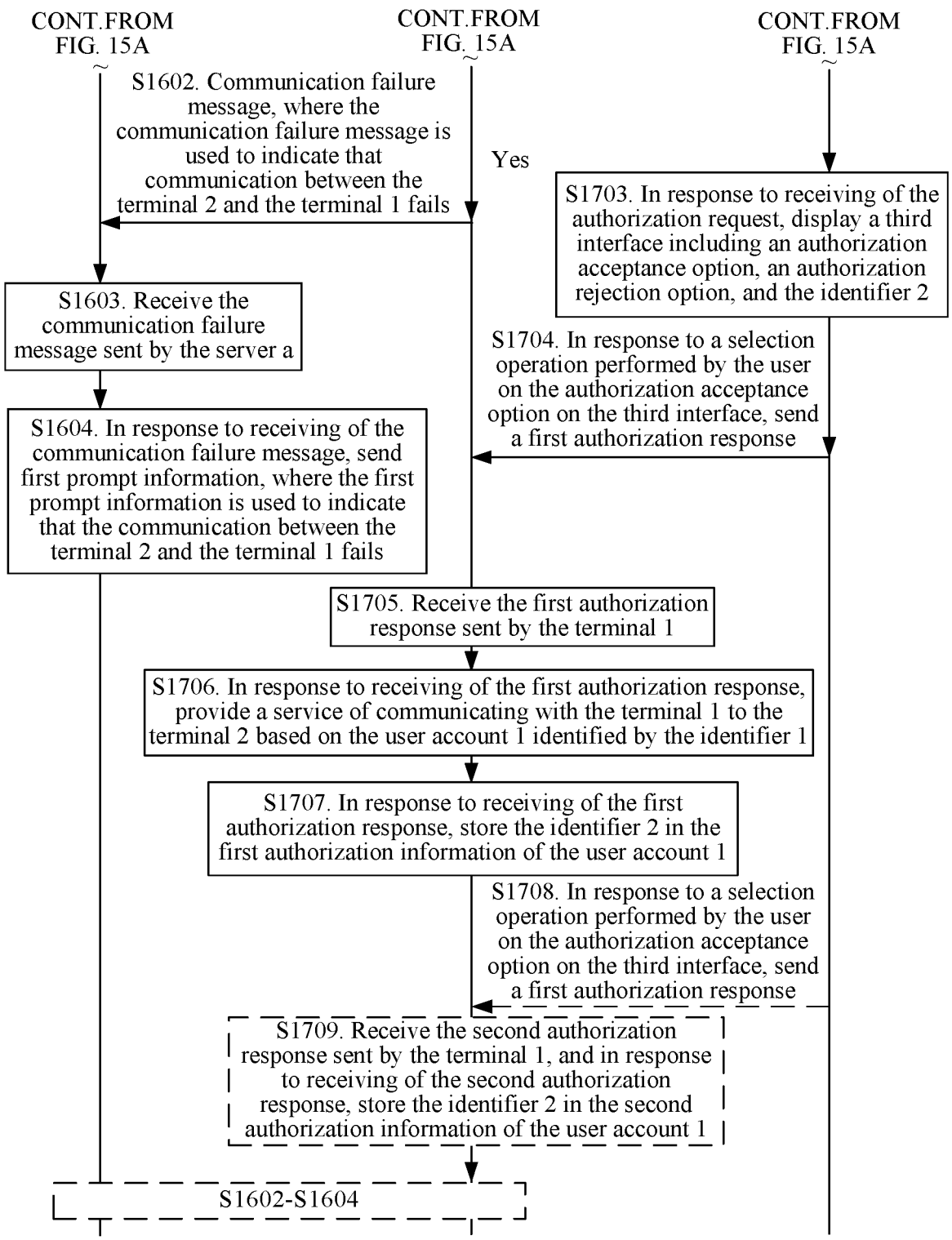

As shown in FIG. 15A and FIG. 15B, after S1504, the method in this embodiment of this application may further include S1601 and S1602 to S1604 or S1701 to S1709:

S1601: The server a queries second authorization information of the user account 1 identified by the identifier 1, and determines whether the user account 2 identified by the identifier 2 is a rejected account of the user account 1.

In this embodiment of this application, the server a may further store second authorization information for each user account. The second authorization information of a user account includes an identifier of a rejected account of the user account.

For example, Table 4 shows an example of an authorization information table according to an embodiment of this application. That is, the authorization information table shown in Table 2 may be replaced with the authorization information table shown in Table 4.

TABLE 4

| Authorization information table | | |
| --- | --- | --- |
| User account (or an identifier) | First authorization information | Second authorization information |
| User account 1 (or an identifier 1) | Identifier A (or a user account A) Identifier B (or a user account B) | Identifier E (or a user account E) |
| User account 2 (or an identifier 2) | Identifier C (or a user account C) Identifier D (or a user account D) | Identifier F (or a user account F) |
| . . . | . . . | . . . |
| User account n (or an identifier n) | Identifier N (or a user account N) | Identifier G (or a user account G) |

As shown in Table 4, the server a stores the second authorization information of the user account 1, the user account 2, and the user account n. The second authorization information of the user account 1 is used as an example, and the second authorization information of the user account 1 includes the identifier E.

It may be understood that, that the second authorization information of the user account 1 includes the identifier E indicates that a terminal corresponding to the user account E (that is, the user account identified by the identifier E) has no permission of communicating with the terminal 1 corresponding to the user account 1. That the second authorization information of the user account 2 includes the identifier F indicates that a terminal corresponding to the user account F (that is, the user account identified by the identifier F) has no permission of communicating with the terminal 2 corresponding to the user account 2.

Optionally, the second authorization information of a user account may include an identifier of a rejected account of the user account; or may not include an identifier of a rejected account of the user account and include a rejected account of the user account. The embodiments of this application set no limit thereto. As shown in Table 4, the second authorization information of the user account 1 may alternatively not include the identifier E, and include the user account E.

It should be noted that in this embodiment of this application, a form in which the server a stores the second authorization information of each user account includes but is not limited to the form of the table of the authorization information shown in Table 4. Other forms in which the server a stores the second authorization information of each user account are not described herein in detail in this embodiment of this application.

The first authorization information and the second authorization information of a same user account are different from each other. Specifically, identifiers or user accounts included in the first authorization information and the second authorization information of the same user account are different. For example, the identifier A included in the first authorization information of the user account 1 is different from the identifier E included in the second authorization information of the user account 1.

The server a may determine whether the second authorization information of the user account 1 includes the identifier 2, to determine whether the user account 2 is a rejected account of the terminal 1. Specifically, when the second authorization information of the user account 1 includes the identifier 2, it indicates that the user account 2 is a rejected account of the user account 1, and the communication method proceeds to S1602 to S1604:

S1602: The server a sends a communication failure message to the terminal 2, where the communication failure message is used to indicate that communication between the terminal 2 and the terminal 1 fails.

S1603: The terminal 2 receives the communication failure message sent by the server a.

It should be noted that for a specific method used by the server a to send the communication failure message to the terminal 2, refer to a specific method used by the server to send the communication failure message to the terminal in conventional technologies. In this embodiment of this application, details are not described herein.

S1604: In response to receiving of the communication failure message, the terminal 2 sends first prompt information, where the first prompt information is used to indicate that the communication between the terminal 2 and the terminal 1 fails.

For example, with reference to (c) of FIG. 16A, when receiving the communication failure message, the mobile phone 200 may display a call failure interface 1606 shown in (d) of FIG. 16A. The call failure interface 1606 includes first prompt information 1607. For example, the first prompt information 1607 may be "Call fails". Certainly, the first prompt information may further include a call failure reason. For example, the first prompt information may be "This number is not an authorized account of the called number, and consequently the call fails"!

With reference to (c) of FIG. 17, when receiving the communication failure message, the mobile phone 200 may display a sending failure interface shown in (e) of FIG. 17. The sending failure interface includes first prompt information 1708. For example, the first prompt information 1708 may be "Sending fails". Certainly, the first prompt information may further include a sending failure reason. For example, the first prompt information may be "This number is not an authorized account of the called number, and consequently the sending fails"!

It should be noted that for another manner of sending the first prompt information by the terminal 2, refer to descriptions of the manner of sending the second prompt information by the terminal 1 in this embodiment of this application. In this embodiment of this application, details are not described herein.

After S1601, when the second authorization information of the user account 1 does not include the identifier 2, it indicates that the user account 2 is not a rejected account of the user account 1, and the server a may send an authorization request to the terminal 1, to confirm with the terminal 1 whether to determine the user account 2 as an authorized account of the user account 1. Specifically, the method in this embodiment of this application may further include S1701 to S1709:

S1701: The server a sends an authorization request to the terminal 1, where the authorization request includes the identifier 2, and the authorization request is used to confirm with the terminal 1 whether to determine the user account 2 identified by the identifier 2 as an authorized account of the user account 1.

S1702: The terminal 1 receives the authorization request sent by the server a.

S1703: In response to receiving of the authorization request, the terminal 1 displays a third interface including an authorization acceptance option, an authorization rejection option, and the identifier 2.

Regardless of a status of the terminal 1 (for example, a blank screen status, a status of displaying a lock screen interface, a status of displaying an interface of an application, or a status of displaying a desktop of the terminal), when receiving the authorization request, in response to receiving of the authorization request, the terminal 1 displays the third interface including the authorization acceptance option, the authorization rejection option, and the identifier 2.

Figure 18A:
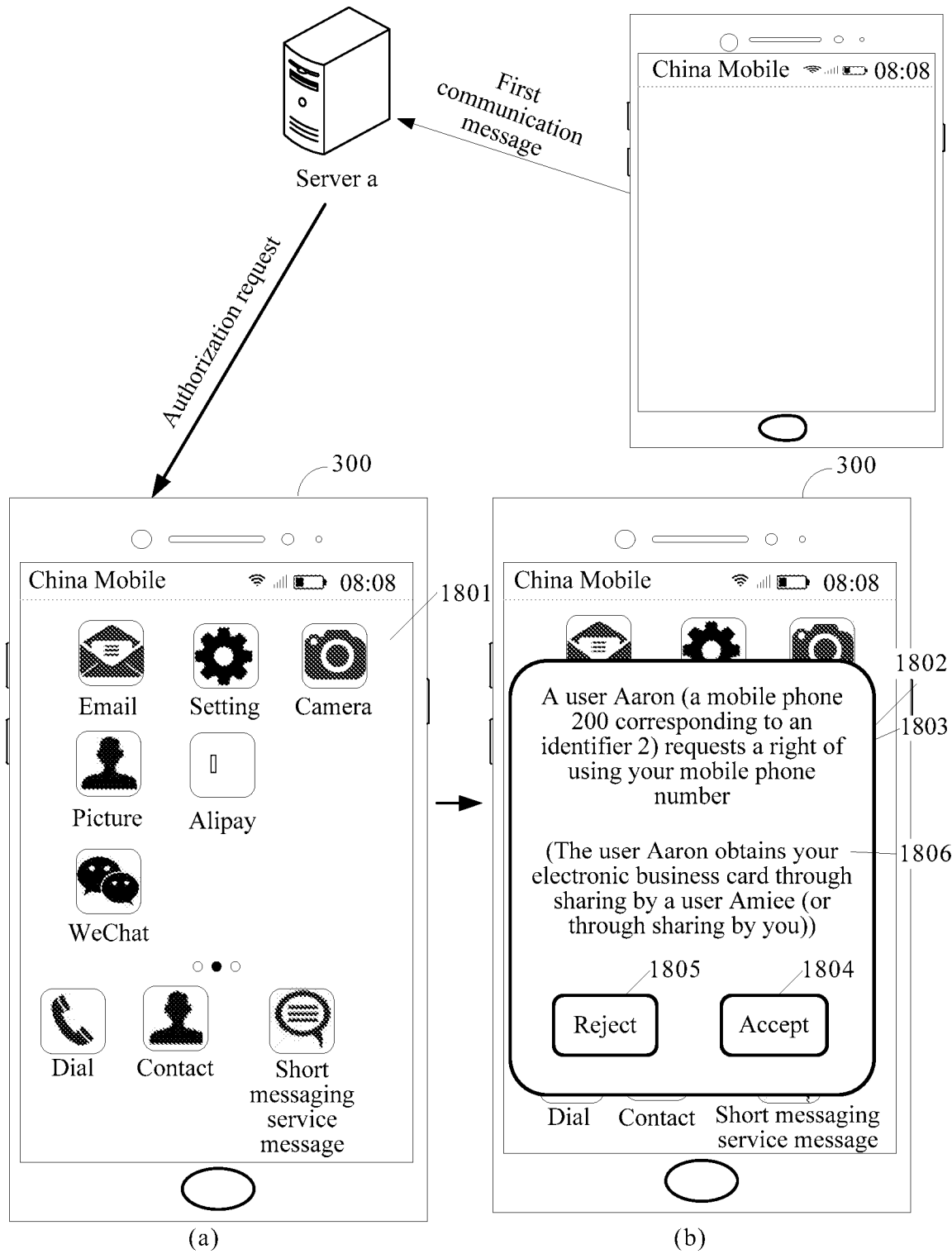
FIG. 18A is a schematic diagram 14 of an example of an interface of a terminal according to an embodiment of this application.

As shown in FIG. 18A, refer to the foregoing example in which "the mobile phone 200 (that is, the terminal 2) sends the first communication message to the server a to request to communicate with the mobile phone 300 (that is, the terminal 1)". For example, the mobile phone 300 currently displays a mobile phone desktop 1801 shown in (a) of FIG. 18A. The mobile phone 300 receives the authorization request sent by the server a, and in response to receiving of the authorization request, may display a third interface 1802 shown in (b) of FIG. 18A. The third interface 1802 includes prompt information 1803 used to prompt that "the mobile phone 200 corresponding to the identifier 2 requests a right of using the mobile phone number", an authorization acceptance option 1804 (for example, an "Accept" button), and an authorization rejection option 1805 (for example, a "Reject" button).

Optionally, the third interface 1802 shown in (b) of FIG. 18A may further include prompt information 1806 used to prompt a source from which the mobile phone 200 corresponding to the identifier 2 obtains an electronic business card of the mobile phone 300.

After S1703, if the user taps the authorization acceptance option 1804, it indicates that the user of the terminal 1 (for example, the mobile phone 300) accepts determining the user account 2 identified by the identifier 2 as an authorized account of the user account 1, and S1704 to S1707 may be performed. If the user taps the authorization rejection option 1805, it indicates that the user of the terminal 1 (for example, the mobile phone 300) rejects determining the user account 2 identified by the identifier 2 as an authorized account of the user account 1, and S1708 and S1709 may be performed.

S1704: In response to a selection operation performed by the user on the authorization acceptance option on the third interface, the terminal 1 sends a first authorization response to the server a.

The first authorization response indicates that the terminal 1 allows determining the user account 2 identified by the identifier 2 as an authorized account of the user account 1. The first authorization response may be signaling whose preset flag bit is a first value. For example, the first value may be 1.

S1705: The server a receives the first authorization response sent by the terminal 1.

S1706: In response to receiving of the first authorization response, the server a provides the service of communicating with the terminal 1 to the terminal 2 based on the user account 1 identified by the identifier 1.

After receiving the first authorization response, the server a may determine that the terminal 1 allows determining the user account 2 identified by the identifier 2 as an authorized account of the user account 1, and may provide the service of communicating with the terminal 1 to the terminal 2 based on the user account 1 identified by the identifier 1.

Further, when determining that the terminal 1 allows determining the user account 2 identified by the identifier 2 as an authorized account of the user account 1, the server a may store the identifier 2 in the first authorization information of the user account 1.

S1707: In response to receiving of the first authorization response, the server a stores the identifier 2 in the first authorization information of the user account 1.

After the server a stores the identifier 2 in the first authorization information of the user account 1, the user account 2 identified by the identifier 2 becomes an authorized account of the user account 1, and the terminal 2 corresponding to the user account 2 may have permission of communicating with the terminal 1 corresponding to the user account 1.

S1708: In response to a selection operation performed by the user on the authorization rejection option on the third interface, the terminal 1 sends a second authorization response to the server a.

The second authorization response indicates that the terminal 1 rejects determining the user account identified by the identifier 2 as an authorized account of the user account 1. The second authorization response may be signaling whose preset flag bit is a second value. For example, the second value may be 0. In this embodiment of this application, the first value and the second value are different from each other, and the first value and the second value include but are not limited to 1 and 0.

S1709: The server a receives the second authorization response sent by the terminal 1, and in response to receiving of the second authorization response, stores the identifier 2 in the second authorization information of the user account 1.

After receiving the second authorization response, the server a may determine that the terminal 1 rejects determining the user account 2 identified by the identifier 2 as an authorized account of the user account 1. In this case, the server a may store the identifier 2 in the second authorization information of the user account 1, so that the user account 2 becomes a rejected account of the user account 1.

It may be understood that in response to receiving of the second authorization response, the server a may further send a communication failure message to the terminal 2, to indicate that communication with the terminal 1 requested by the terminal 2 fails. Specifically, after S1709, the method in this embodiment of this application may further include S1602 to S1604.

It should be noted that with reference to (b) of FIG. 16B, it is assumed that the user taps the "Apply for authorization" button on the display interface 1608, and the mobile phone 200 displays the second interface 1604 shown in (b) of FIG. 16A. Based on the scenario, in a case, as described in the foregoing embodiment, after S1504, if the user account 2 is not an authorized account of the user account 1, the method in this embodiment of this application further includes S1601 and S1602 to S1604 or S1701 to S1709. In another case, after S1504, if the user account 2 is not an authorized account of the user account 1, regardless of whether the user account 2 is a rejected account of the user account 1, the server a may send the authorization request to the terminal 1 (that is, S1701 to S1709 are performed). In other words, based on the scenario, after S1504, if the user account 2 is not an authorized account of the user account 1, the server a does not need to perform S1601, and S1701 to S1709 may be directly performed.

Optionally, with reference to (b) of FIG. 16B, it is assumed that the user taps the "Cancel" button on the display interface 1608, and the "Cancel" button is used to request the server a not to apply for authorization from Aaron when the user account 2 is not an authorized account of the user account 1. In this case, after S1504, if the user account 2 is not an authorized account of the user account 1, the server a may directly perform S1602 to S1604.

In the communication method provided in this embodiment of this application, the electronic business card 1 pushed by the terminal X to the terminal 2 includes only the identifier 1, and does not include the user account 1. This can reduce a possibility that account information of a contact corresponding to an electronic business card is leaked. In addition, even if the terminal 2 obtains the electronic business card 1, after the terminal 2 sends, to the server a based on the identifier 1, the first communication message used to request to communicate with the terminal 1, if the account 2 of the user corresponding to the terminal 2 is not an authorized terminal of the user account 1, the terminal 2 cannot communicate with the terminal 1. In this way, even if the electronic business card is leaked, a terminal stealing the electronic business card possibly cannot communicate with the terminal corresponding to the electronic business card. Therefore, the terminal corresponding to the electronic business card is less possible to receive harassment information or a harassment call.

Optionally, when displaying a contact information filling interface of a third-party application, in response to an operation performed by the user on an "Import an electronic business card" option on the contact information filling interface, the terminal may display a contact selection list; and in response to a selection operation performed by the user on a contact option in the contact selection list, the terminal fills, on the contact information filling interface, information of a contact selected by the user.

Figure 18B:
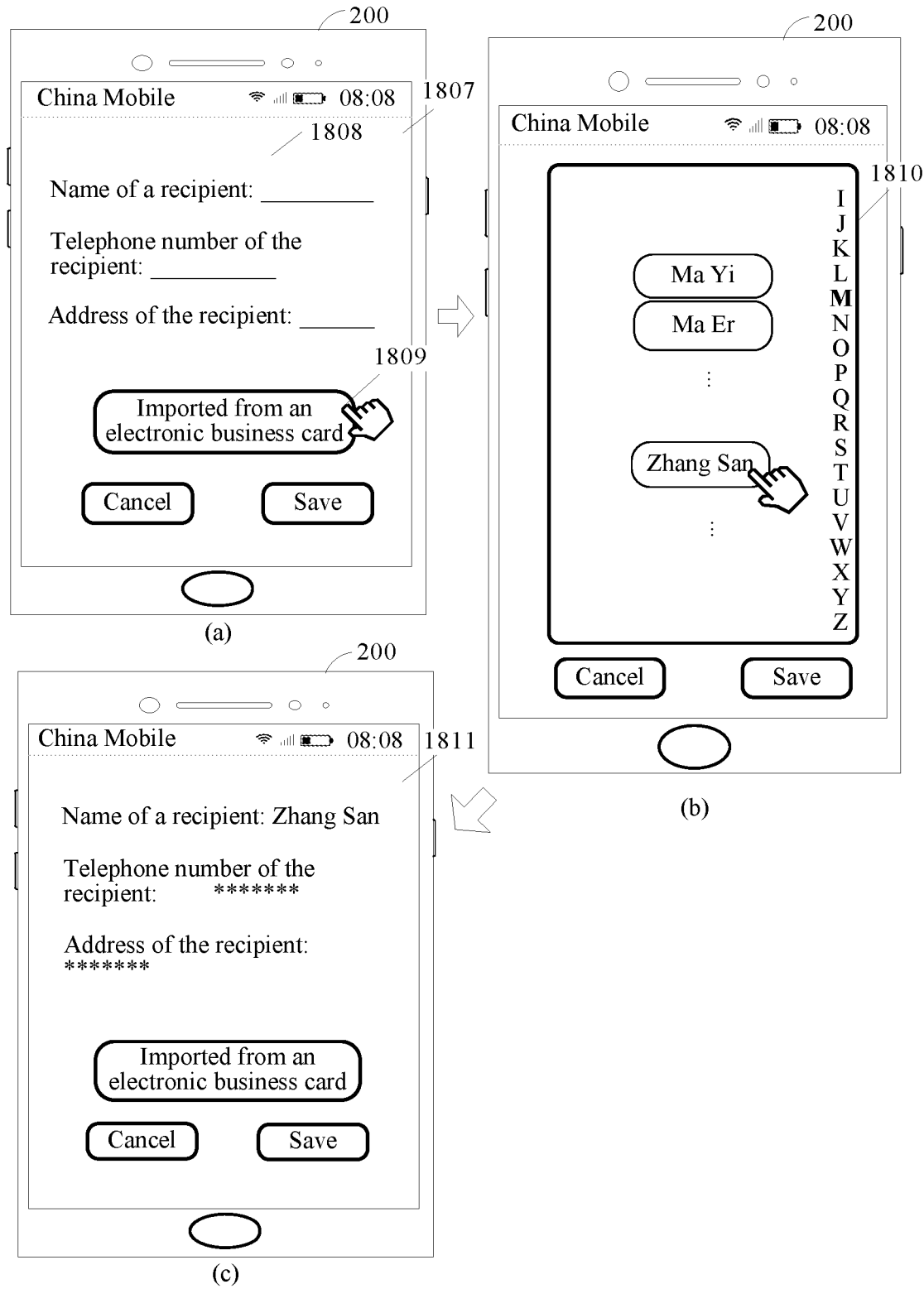
FIG. 18B is a schematic diagram 15 of an example of an interface of a terminal according to an embodiment of this application.

For example, the mobile phone 200 displays a contact information filling interface 1807 shown in (a) of FIG. 18B, and the contact information filling interface 1807 includes an information filling window 1808 and an "Import an electronic business card" option 1809. In response to a tap operation performed by the user on the "Import an electronic business card" option 1809 shown in (a) of FIG. 18B, the mobile phone 200 displays a contact selection list 1810 shown in (b) of FIG. 18B, and the contact selection list 1810 includes a plurality of contact options such as a contact option of Ma Yi, a contact option of Ma Er, and a contact option of Zhang San. In response to a selection operation performed by the user on the contact option of Zhang San shown in (b) of FIG. 18B, the mobile phone 200 may fill contact information of Ma Yi in the information filling window 1808, and display a display interface 1811 shown in (c) of FIG. 18B.

To prevent account information of a contact corresponding to an electronic business card from being leaked, when filling information of the contact on the contact information filling interface, the terminal may display the information of the contact in such a manner that the information of the contact is invisible to the user. For example, a "recipient contact number" and a "recipient address" on the display interface 1811 shown in (c) of FIG. 18B are both replaced with "*******".

Figure 19:
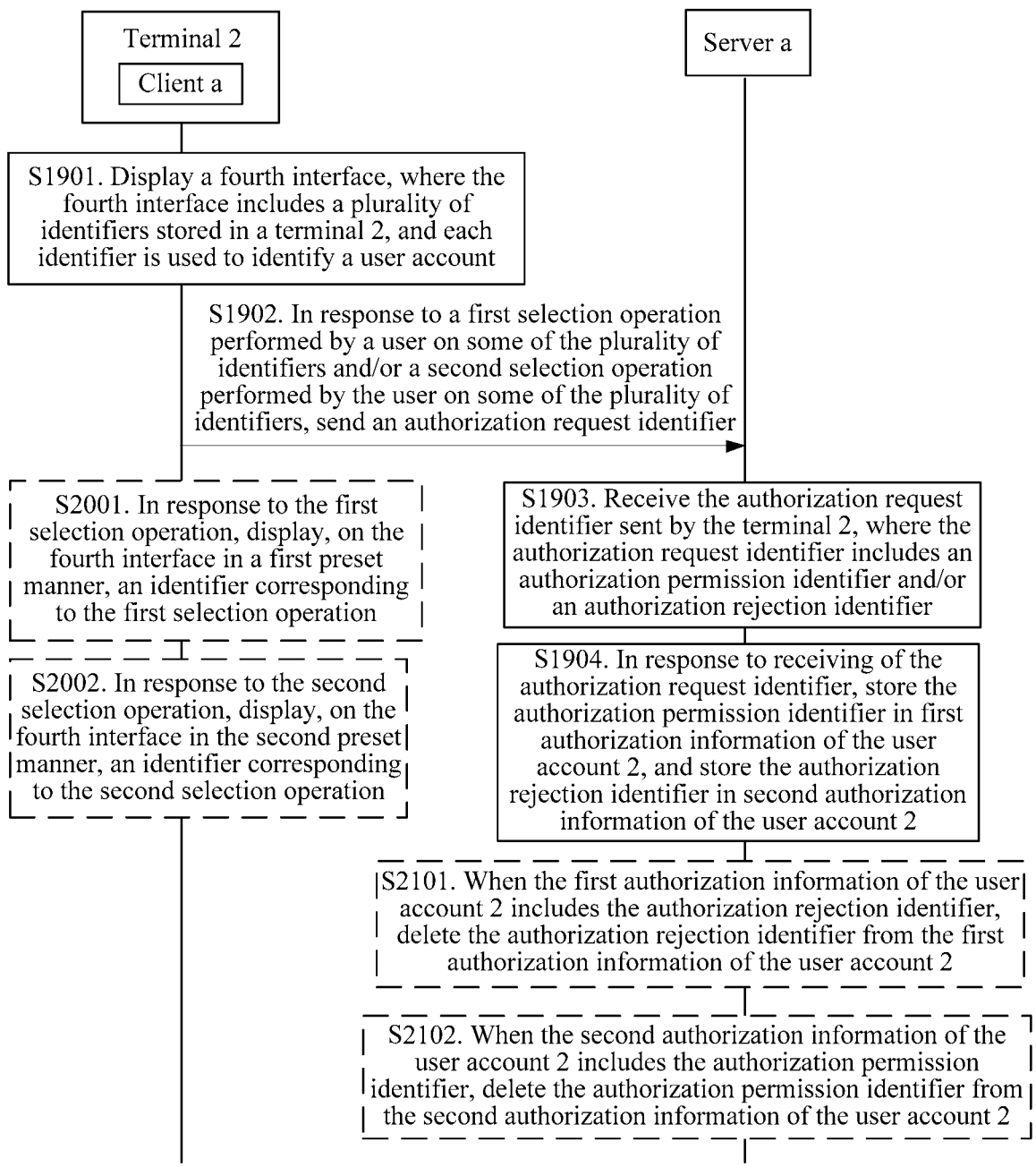
FIG. 19 is a schematic flowchart 5 of a communication method according to an embodiment of this application.

Further, in this embodiment of this application, the terminal may further manage, in batches, authorized accounts and rejected accounts of the user account logged in to in the client a of the terminal. The terminal 2 is used as an example, and the terminal 2 may manage authorized accounts and rejected accounts of the user account 2 in batches in the client a. Specifically, as shown in FIG. 19, the method in this embodiment of this application may further include S1901 to S1904:

S1901: The terminal 2 displays a fourth interface, where the fourth interface includes one or more identifiers stored in the terminal 2, and each identifier is used to identify a user account.

S1902: In response to a first selection operation performed by the user on some of the one or more identifiers and/or a second selection operation performed by the user on some of the one or more identifiers, the terminal 2 sends an authorization message to the server a.

The authorization message includes an authorization permission identifier and/or an authorization rejection identifier, the authorization permission identifier includes an identifier that is of the plurality of identifiers and that corresponds to the first selection operation, the authorization rejection identifier includes an identifier that is of the plurality of identifiers and that corresponds to the second selection operation, and the authorization permission identifier is different from the authorization rejection identifier.

Optionally, a scenario in which the terminal 2 (for example, the mobile phone 200) is triggered to display the fourth interface may include any one of the following scenario (a) to scenario (f):

Scenario (a): The third interface displayed by the terminal 2 includes an "Authorization management" option; and in response to an operation performed by the user on the "authorization management" option, the terminal 2 displays the fourth interface.

Figure 20:
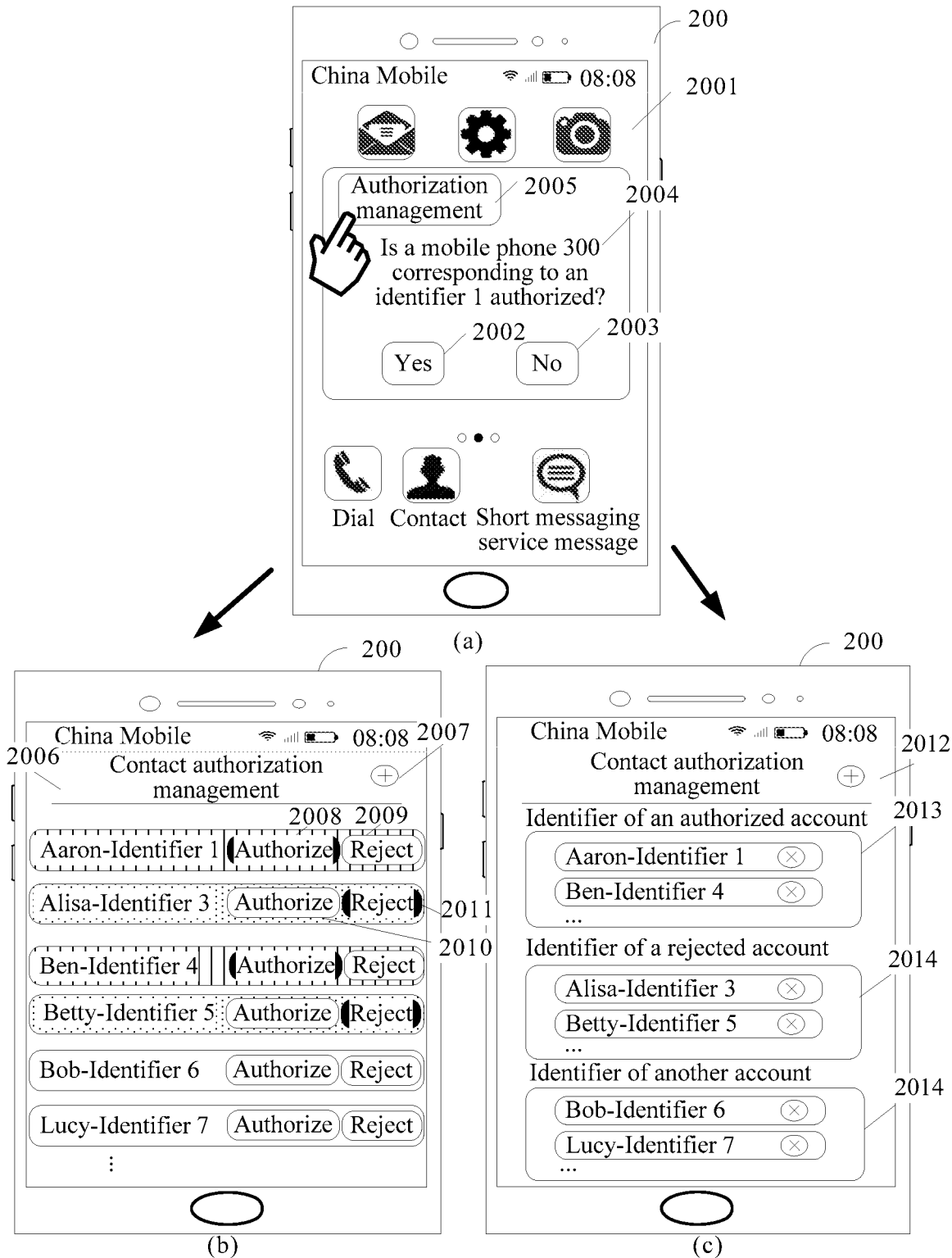
FIG. 20 is a schematic diagram 16 of an example of an interface of a terminal according to an embodiment of this application.

For example, as shown in (a) of FIG. 20, a third interface 2001 in this embodiment of this application may further include: a "Yes" button 2002, a "No" button 2003, prompt information 2004, and an "Authorization management" option 2005. The "authorization management" option 2005 is used to guide the user to perform authorization management on an identifier stored in the terminal. When the user taps the "Authorization management" option 2005 shown in (a) of FIG. 20, in response to the tap operation performed by the user on the "Authorization management" option 2005, the mobile phone 200 displays a fourth interface 2006 shown in (b) of FIG. 20 or a fourth interface 2011 shown in (c) of FIG. 20. Identifiers on the fourth interface may include: an identifier used to identify an authorized account of the user account 2, an identifier used to identify a rejected account of the user account 2, and another identifier. A user account identified by the another identifier is neither an authorized account of the user account 2 nor a rejected account of the user account 2.

For example, the fourth interface 2006 shown in (b) of FIG. 20 or the fourth interface 2012 shown in (c) of FIG. 20 includes: a plurality of identifiers stored in the mobile phone 200 such as an identifier 1 (used to identify the phone number of Aaron), an identifier 3 (used to identify the phone number of Alisa), an identifier 4 (used to identify a phone number of Ben), an identifier 5 (used to identify a phone number of Betty), an identifier 6 (used to identify a phone number of Bob), and an identifier 7 (used to identify a phone number of Lucy).

In addition, the mobile phone 200 may further display, in a first preset manner, an identifier used to identify an authorized account of the user account 2, and display, in a second preset manner, an identifier used to identify a rejected account of the user account 2.

For example, the mobile phone 200 may display, in a filling vertical line manner (that is, the first preset manner) shown in (b) of FIG. 20, the identifier 1 and the identifier 4 each used to identify an authorized account of the user account 2; and display, in a filling black point manner (that is, the second preset manner) shown in (b) of FIG. 20, the identifier 3 and the identifier 5 each used to identify a rejected account of the user account 2. For example, the mobile phone 200 may further display, in a manner of displaying the identifier 1 and the identifier 4 in "an authorized account identifier" area 2013 shown in (c) of FIG. 20 (that is, the first preset manner), the identifier 1 and the identifier 4 each used to identify an authorized account of the user account 2; and display, in a manner of displaying the identifier 3 and the identifier 5 in "a rejected account identifier" area 2014 shown in (c) of FIG. 20 (that is, the second preset manner), the identifier 3 and the identifier 5 each used to identify a rejected account of the user account 2.

It should be noted that in addition to the identifier displayed in the first preset manner and the identifier displayed in the second preset manner on the fourth interface, a user account identified by another identifier is neither an authorized account of the user account 2 nor a rejected account of the user account 2. For example, user accounts identified by the identifier 6 (used to identify the phone number of Bob) and the identifier 7 (used to identify the phone number of Lucy) are neither authorized accounts of the user account 2 nor rejected accounts of the user account 2.

It should be noted that in this embodiment of this application, the first preset manner and the second preset manner include but are not limited to manners in the foregoing examples, and in this embodiment of this application, details of another display manner are not described herein.

Optionally, after receiving the first selection operation and/or the second selection operation, the terminal may further display, in different display manners, the identifier corresponding to the first selection operation and the identifier corresponding to the second selection operation. Specifically, as shown in FIG. 19, after S1901, the method in this embodiment of this application may further include S2001 and S2002:

S2001: In response to the first selection operation, the terminal 2 displays, on the fourth interface in a first preset manner, an identifier corresponding to the first selection operation.

S2002: In response to the second selection operation, the terminal 2 displays, on the fourth interface in a second preset manner, an identifier corresponding to the second selection operation.

Optionally, as shown in (b) of FIG. 20, the fourth interface 2006 further includes an "Add a contact" button 2007. An option corresponding to each identifier further includes an "Authorize" button and a "Reject" button. For example, an option corresponding to the identifier 1 further includes an "Authorize" button 2008 and a "Reject" button 2009; and an option corresponding to the identifier 3 further includes an "Authorize" button 2010 and a "Reject" button 2011. In this embodiment of this application, the "Authorize" button 2008 and the "Reject" button 2009 are used as an example herein, to describe functions of the "Authorize" button and the "Reject" button. The "authorize" button 2008 is used to set the user account identified by the identifier 1 as an authorized account of the user account 1, and the "Reject" button 2009 is used to set the user account identified by the identifier 1 as a rejected account of the user account 1.

Figure 21A:
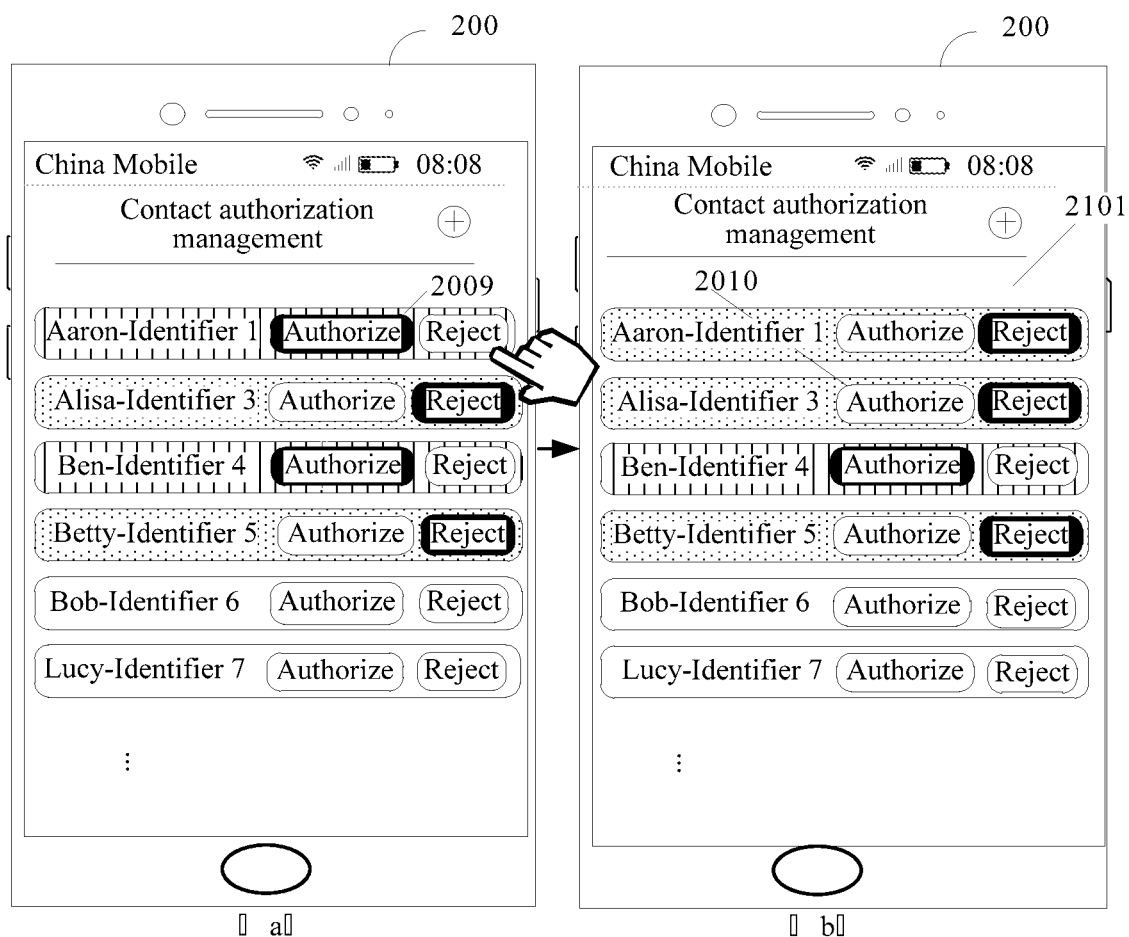
FIG. 21A is a schematic diagram 17 of an example of an interface of a terminal according to an embodiment of this application.

Optionally, because the user account identified by the identifier 1 is already set as an authorized number of the user account 2, the "Authorize" button 2008 is in a status of not responding. To be specific, the mobile phone 200 does not respond to any operation performed by the user on the "Authorize" button 2008. The "Reject" button 2009 is in a status of responding. To be specific, the mobile phone 200 may respond to a tap operation (that is, the second selection operation in S1902) performed by the user on the "Reject" button 2009, to set the user account identified by the identifier 1 as a rejected account of the user account 2. For example, after the user taps the "Reject" button 2009 shown in (a) of FIG. 21A, the mobile phone 200 may respond to the tap operation (that is, the second selection operation in S1902) performed by the user on the "Reject" button 2009, and display the identifier 1 in a filling block point manner (that is, the second preset manner) on a fourth interface 2101 shown in (b) of FIG. 21A.

Similarly, because the user account identified by the identifier 3 is already set as a rejected number of the user account 2, the "Authorize" button 2010 is in a status of responding, and may respond to a tap operation (that is, the first selection operation in S1902) performed by the user on the "Authorize" button 2010, to set the user account identified by the identifier 3 as an authorized account of the user account 2. The "Reject" button 2011 is in a status of not responding. To be specific, the mobile phone 200 does not respond to any operation performed by the user on the "Reject" button 2011. For example, after the user taps the "Authorize" button 2010 shown in (b) of FIG. 21A, the mobile phone 200 may respond to the tap operation (that is, the first selection operation in S1901) performed by the user on the "Authorize" button 2010, and display the identifier 3 in a filling vertical line manner (that is, the first preset manner) on the fourth interface 2101 (not shown).

User accounts identified by the identifier 6 and the identifier 7 are neither authorized accounts of the user account 2 nor rejected accounts of the user account 2. Therefore, as shown in FIG. 20 or 21, the "Authorization" buttons and the "Reject" buttons in options corresponding to the identifier 6 and the identifier 7 are all in a status of responding.

Further, when the electronic business card 2 including the identifier 2 is pushed between other terminals, the terminal 2 may receive the first notification message sent by the server a. Therefore, the terminal 2 may further store an authorization relationship and a sharing relationship of the user account 2. For example, it is assumed that the terminal 2 stores eight identifiers: an identifier A to an identifier H (corresponding to a user A to a user H). User accounts identified by the identifier A, an identifier C, an identifier D, and an identifier E are authorized accounts of the user account 2, user accounts identified by an identifier F and an identifier G are rejected accounts of the user account 2, and user accounts identified by an identifier E and the identifier H are neither authorized accounts of the user account 2 nor rejected accounts of the user account 2.

Figure 22:
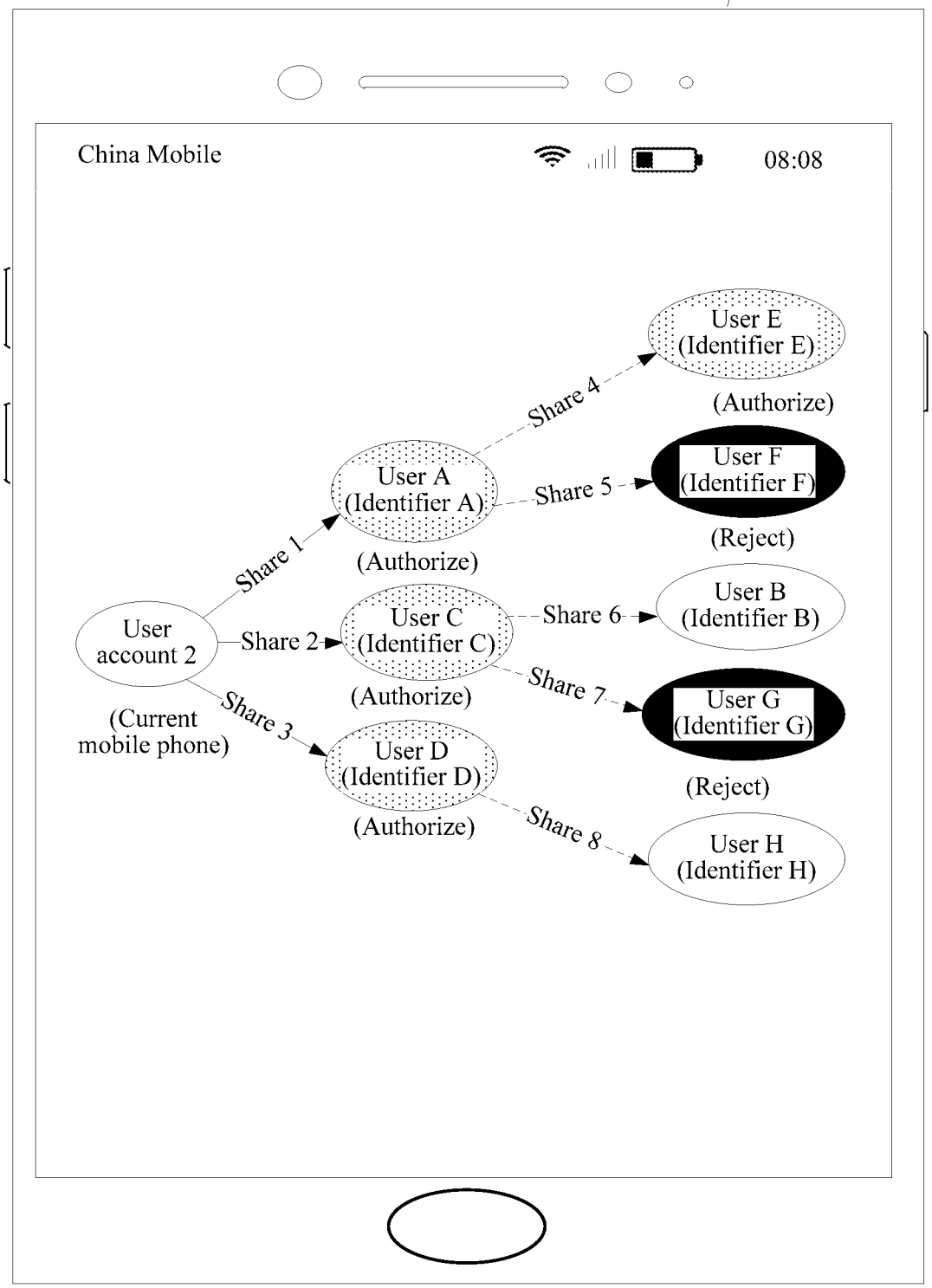
FIG. 22 is a schematic diagram 19 of an example of an interface of a terminal according to an embodiment of this application.

The client a of the terminal 2 may store an authorization relationship shown in FIG. 22. As shown in FIG. 22, straight lines corresponding to share 1 to share 3 are used to indicate that the client a in which the user account 2 is logged in to actively pushes the electronic business card 2 (including the identifier 2) to user accounts corresponding to the identifier A, the identifier C, and the identifier D; and dashed lines corresponding to share 4 to share 7 are used to indicate that the electronic business card 2 is pushed by another user account (a user account identified by another identifier) that is logged in to.

In addition, the identifier F and the identifier G are marked as black (that is, the second preset manner) to indicate that user accounts identified by the identifier F and the identifier G are rejected accounts of the user account 2. The identifier A and the identifier C to the identifier E are filled with black points (that is, the first preset manner) to indicate that user accounts identified by the identifier A to the identifier E are authorized accounts of the user account 2. The identifier B and the identifier H are not filled to indicate that user accounts identified by the identifier B and the identifier H are neither authorized accounts of the user account 2 nor rejected accounts of the user account 2.

Figure 21B:
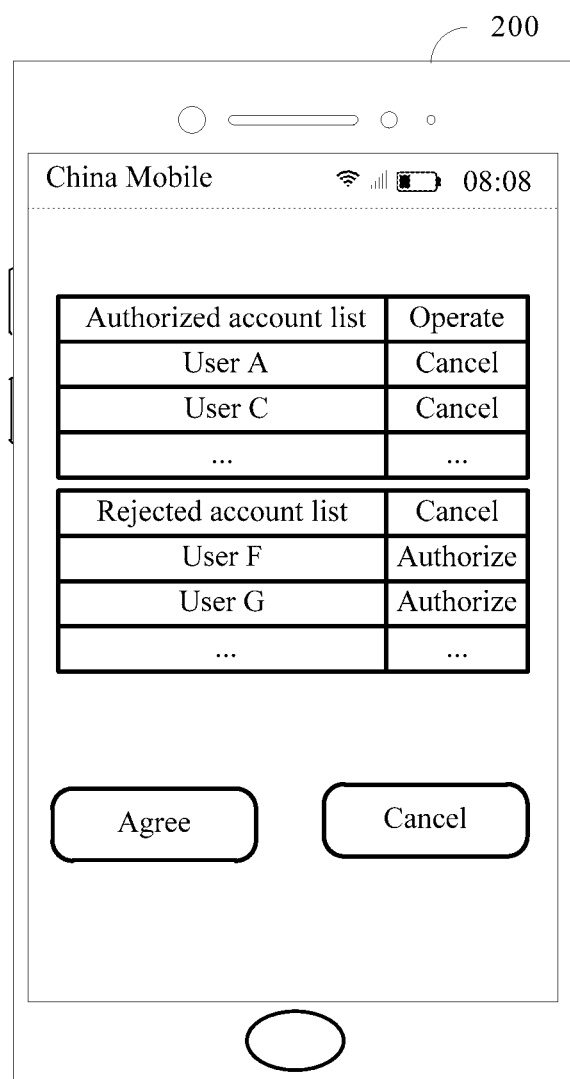
FIG. 21B is a schematic diagram 18 of an example of an interface of a terminal according to an embodiment of this application.

It should be noted that as shown in FIG. 23, the fourth interface displayed by the terminal 2 may include a tree-like relationship diagram shown in FIG. 22. Alternatively, the terminal 2 may further display, on the fourth interface in another display manner, an authorization relationship corresponding to the tree-like relationship diagram shown in FIG. 22. For example, the terminal 2 may display, on the fourth interface in a table form, the authorization relationship corresponding to the tree-like relationship diagram shown in FIG. 22. As shown in FIG. 21B, the mobile phone 200 may display, in a table form, the authorization relationship corresponding to the tree-like relationship diagram shown in FIG. 22.

Figures 1, 23A:
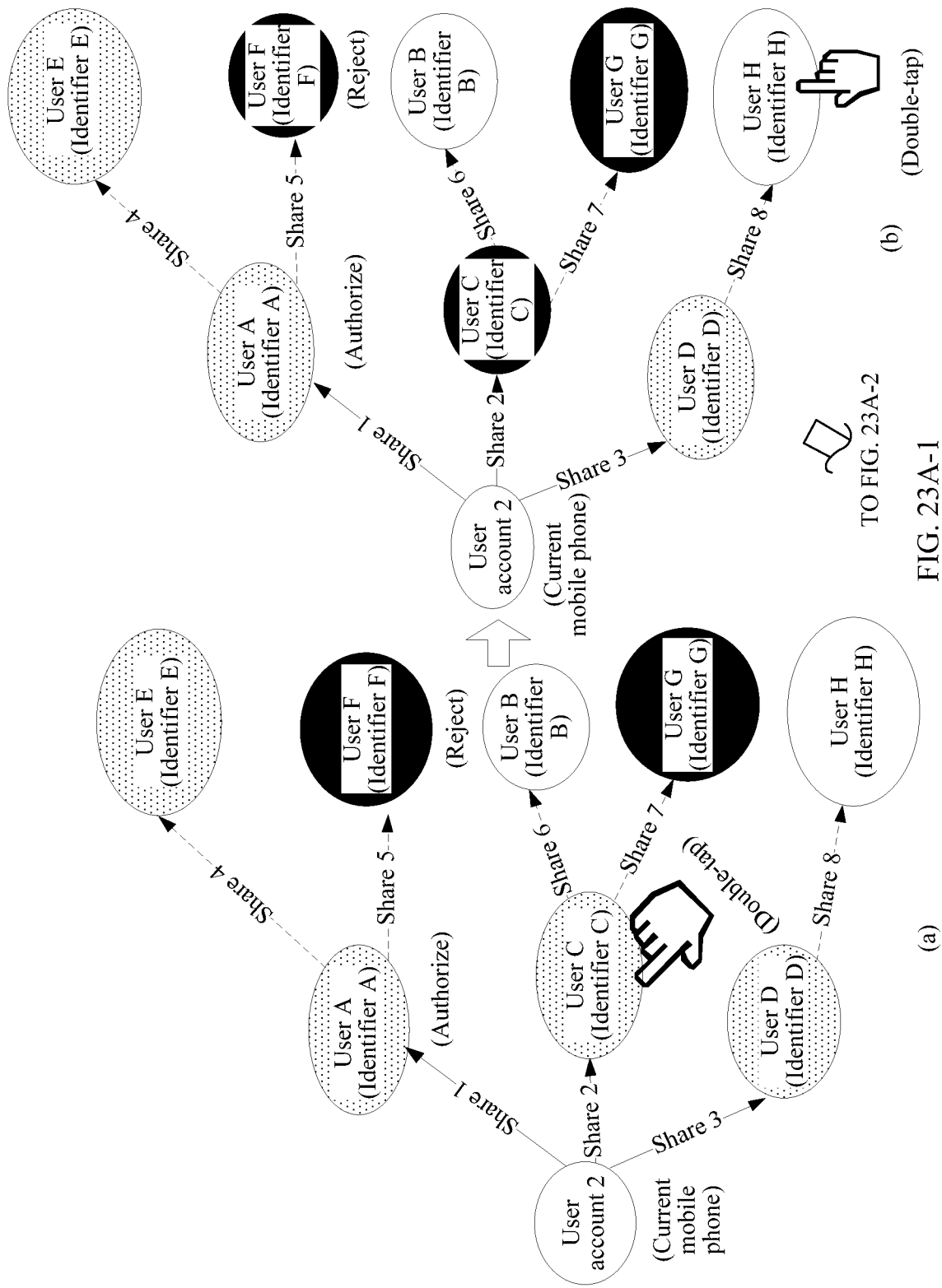
Figures 2, 23A:
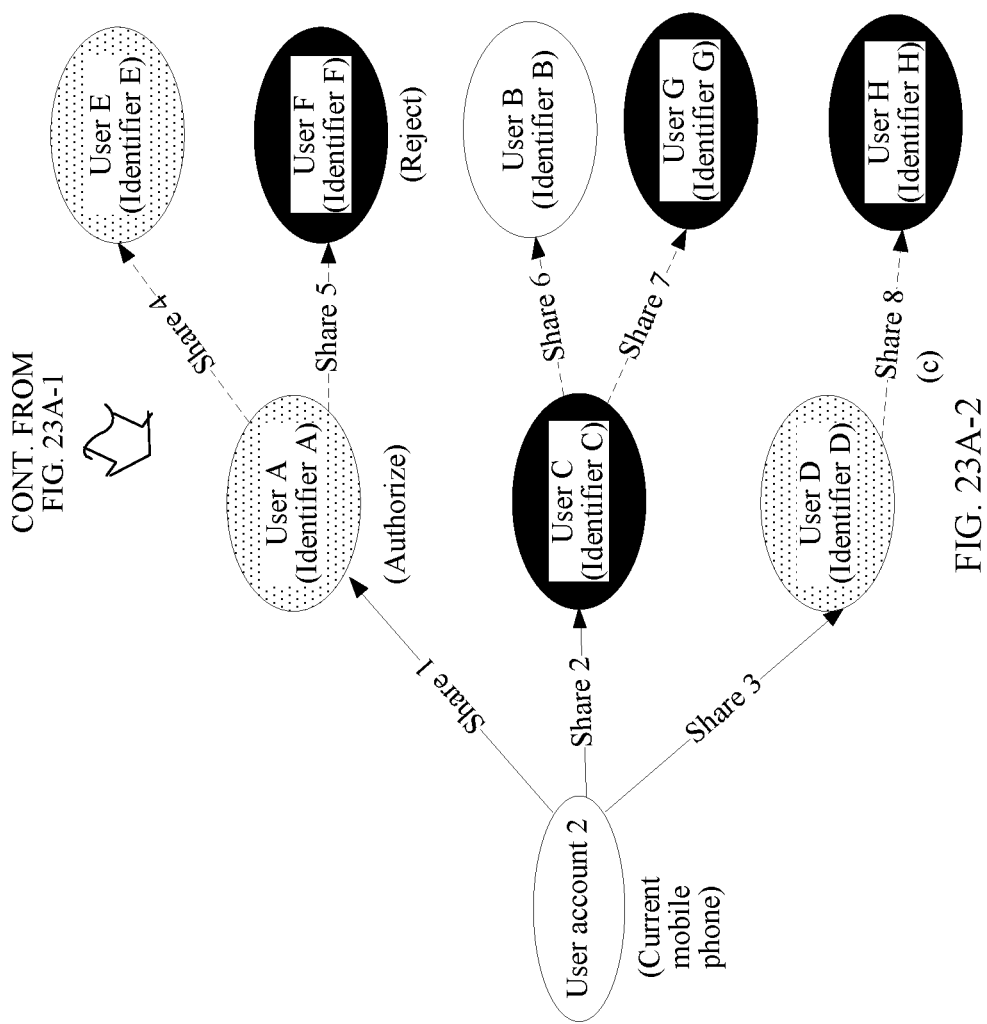

In response to the second selection operation (for example, a double-tap operation, a single-tap operation, or a touch and hold operation) performed by the user on the identifier A and the identifier C to the identifier E shown in FIG. 22 or (a) of FIG. 23A-1, the terminal 2 may change the user accounts identified by the identifier A and the identifier C to the identifier E from authorized accounts of the user account 2 to rejected accounts. In response to the first selection operation (for example, a double-tap operation, a single-tap operation, or a touch and hold operation) performed by the user on the identifier F and the identifier G shown in FIG. 22 or (a) of FIG. 23A-1, the terminal 2 may change the user accounts identified by the identifier F and the identifier G from rejected accounts of the user account 2 to authorized accounts. In response to the first selection operation performed by the user on the identifier B and the identifier H shown in FIG. 22 or (a) of FIG. 23A-1, the terminal 2 may determine the user accounts identified by the identifier B and the identifier H as authorized accounts of the user account 2. In response to the second selection operation performed by the user on the identifier B and the identifier H shown in FIG. 22 or (a) of FIG. 23A-1, the terminal 2 may determine the user accounts identified by the identifier B and the identifier H as rejected accounts of the user account 2. In this embodiment of this application, the first selection operation is different from the second selection operation.

For example, it is assumed that the first selection operation is a touch and hold operation, and the second selection operation is a double-tap operation. When the user double taps the identifier C on the fourth interface shown in (a) of FIG. 23A-1, in response to the double-tap operation (that is, the second selection operation) performed by the user on the identifier C, the mobile phone 200 determines the user account identified by the identifier C as a rejected account of the user account 2, and displays the identifier C on the fourth interface shown in (b) of FIG. 23A-1 in a manner of marking the identifier C as black (that is, the second preset manner). When the user double taps the identifier H on the fourth interface shown in (b) of FIG. 23A-1, in response to the double-tap operation (that is, the second selection operation) performed by the user on the identifier H, the mobile phone 200 determines the user account identified by the identifier H as a rejected account of the user account 2, and displays the identifier H on the fourth interface shown in (c) of FIG. 23A-2 in a manner of marking the identifier H as black (that is, the second preset manner).

When the user double taps the identifier C on the fourth interface shown in (a) of FIG. 23A-2, it indicates that the user intends to set the user account identified by the identifier C as a rejected account of the user account 2. Dashed lines corresponding to share 6 and share 7 are used to indicate that the electronic business card 2 is pushed to the user account B (the user account identified by the identifier B) and the user account G (the user account identified by the identifier G) by the user account C (the user account identified by the identifier C) that is logged in to. Therefore, when the user account identified by the identifier C is a rejected account of the user account 2, the user account B and the user account G receiving the electronic business card 2 pushed by the user account C may not be trusted accounts of the user.

Figures 1, 23B:
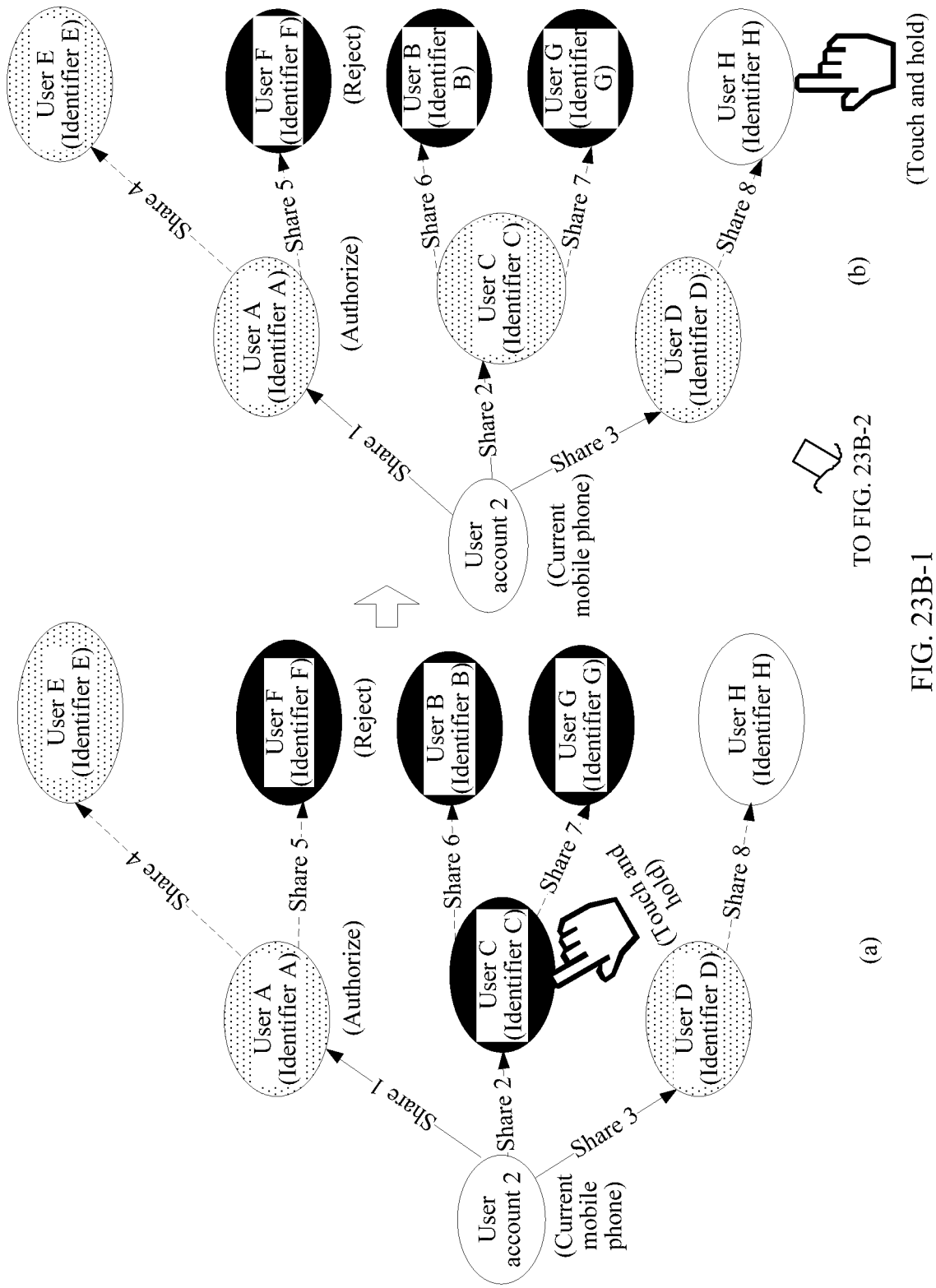
Figures 2, 23B:
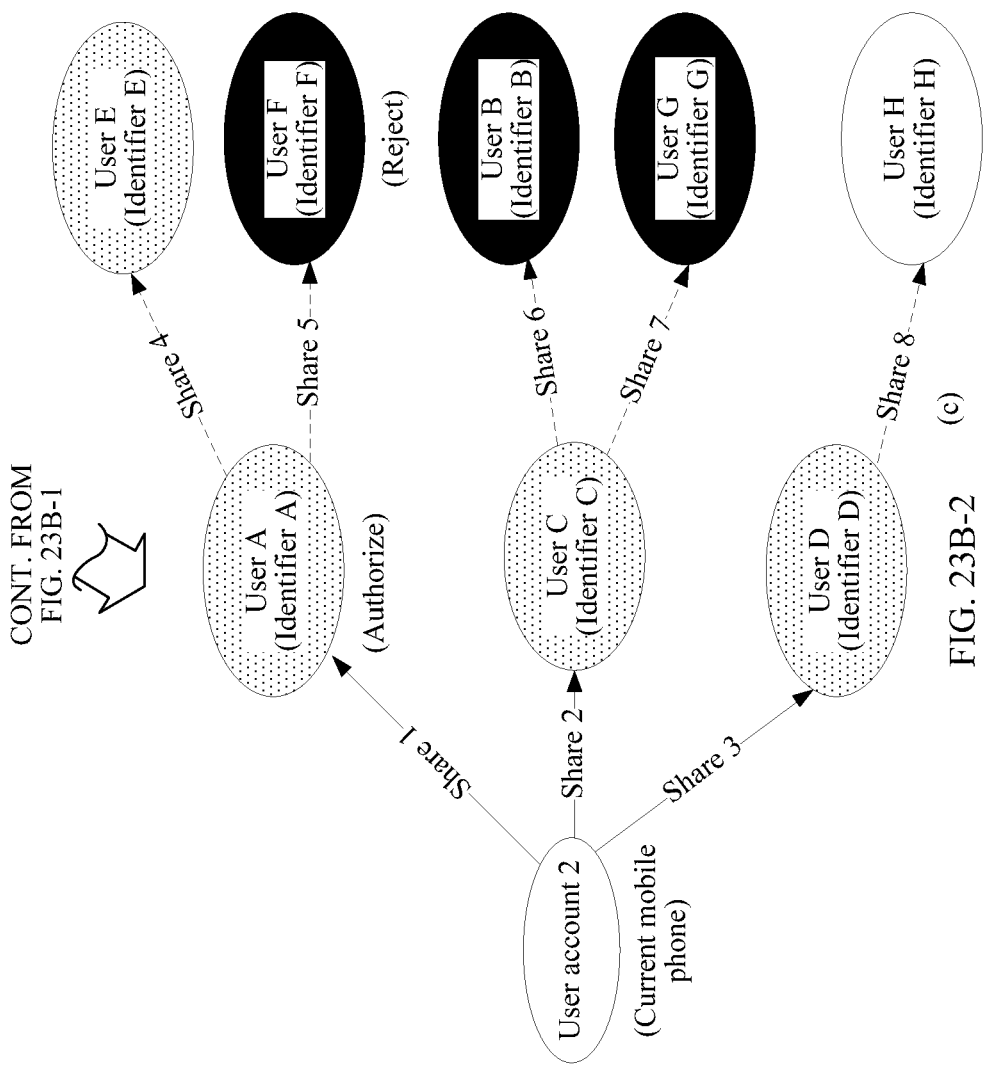

Optionally, in response to the double-tap operation performed by the user on the identifier C shown in (a) of FIG. 23A-2, the mobile phone 200 may simultaneously determine all the user accounts identified by the identifier C, the identifier B, and the identifier G as rejected accounts of the user account 2, and display the identifier C, the identifier B, and the identifier G on the fourth interface shown in (a) of FIG. 23B-1 in a manner of marking the identifier C, the identifier B, and the identifier G as black (that is, the second preset manner).

When the user touches and holds the identifier C on the fourth interface shown in (a) of FIG. 23B-1, in response to the touch and hold operation (that is, the first selection operation) performed by the user on the identifier C, the mobile phone 200 determines the user account identified by the identifier C as an authorized account of the user account 2, and displays the identifier C on the fourth interface shown in (b) of FIG. 23B-1 in a manner of filling with black points (that is, the first preset manner). When the user double taps the identifier H on the fourth interface shown in (b) of FIG. 23B-1, in response to the touch and hold operation (that is, the first selection operation) performed by the user on the identifier H, the mobile phone 200 determines the user account identified by the identifier H as an authorized account of the user account 2, and displays the identifier H on the fourth interface shown in (c) of FIG. 23B-2 in a manner of filling with black points (that is, the first preset manner).

Further, the terminal 2 may further classify the sharing relationship and the authorization relationship of the user account 2 for display. For example, in response to an operation performed by the user on the "Authorization management" option, the mobile phone 200 may display a management interface shown in (a) of FIG. 23C, and the management interface shown in (a) of FIG. 23C includes a "Sharing relationship" option and an "Authorization relationship" option.

The "Sharing relationship" option is used to trigger the mobile phone 200 to display a sharing relationship of the user account 2. For example, in response to a tap operation performed by the user on the "Sharing relationship" option, the mobile phone 200 may display a sharing relationship shown in (b) of FIG. 23C or (c) of FIG. 23C. As shown in (b) of FIG. 23C, rays pointing from A to B, C, and D are used to indicate that the electronic business card of the user account 2 is shared by A with B, C, and D, and rays pointing from B to E and F are used to indicate that the electronic business card of the user account 2 is shared by B with E and F.

The "Authorization relationship" option is used to trigger the mobile phone 200 to display an authorization relationship of the user account 2. For example, in response to a tap operation performed by the user on the "Authorization relationship" option, the mobile phone 200 may display an authorization relationship shown in (a) of FIG. 23D or (b) of FIG. 23D. B, C, and D filled with black points are used to indicate that user accounts corresponding to B, C, and D are authorized accounts of the user account 2; E marked as black is used to indicate that a user account corresponding to E is a rejected account of the user account 2; and F not filled is used to indicate that a user account corresponding to F is neither an authorized account of the user account 2 nor a rejected account of the user account 2.

Figure 23C:
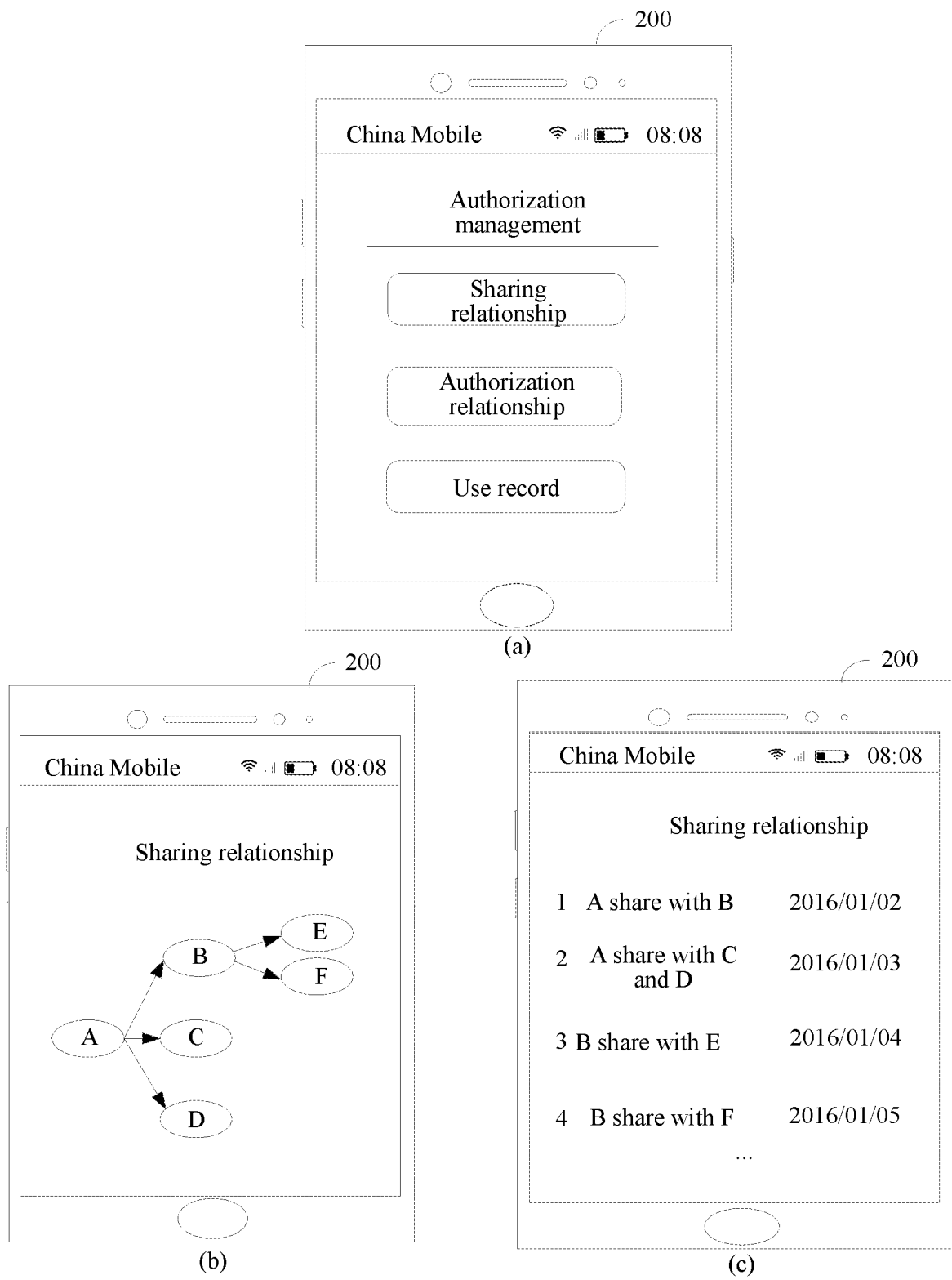
FIG. 23C is a schematic diagram 22 of an example of an interface of a terminal according to an embodiment of this application.
Figure 23D:
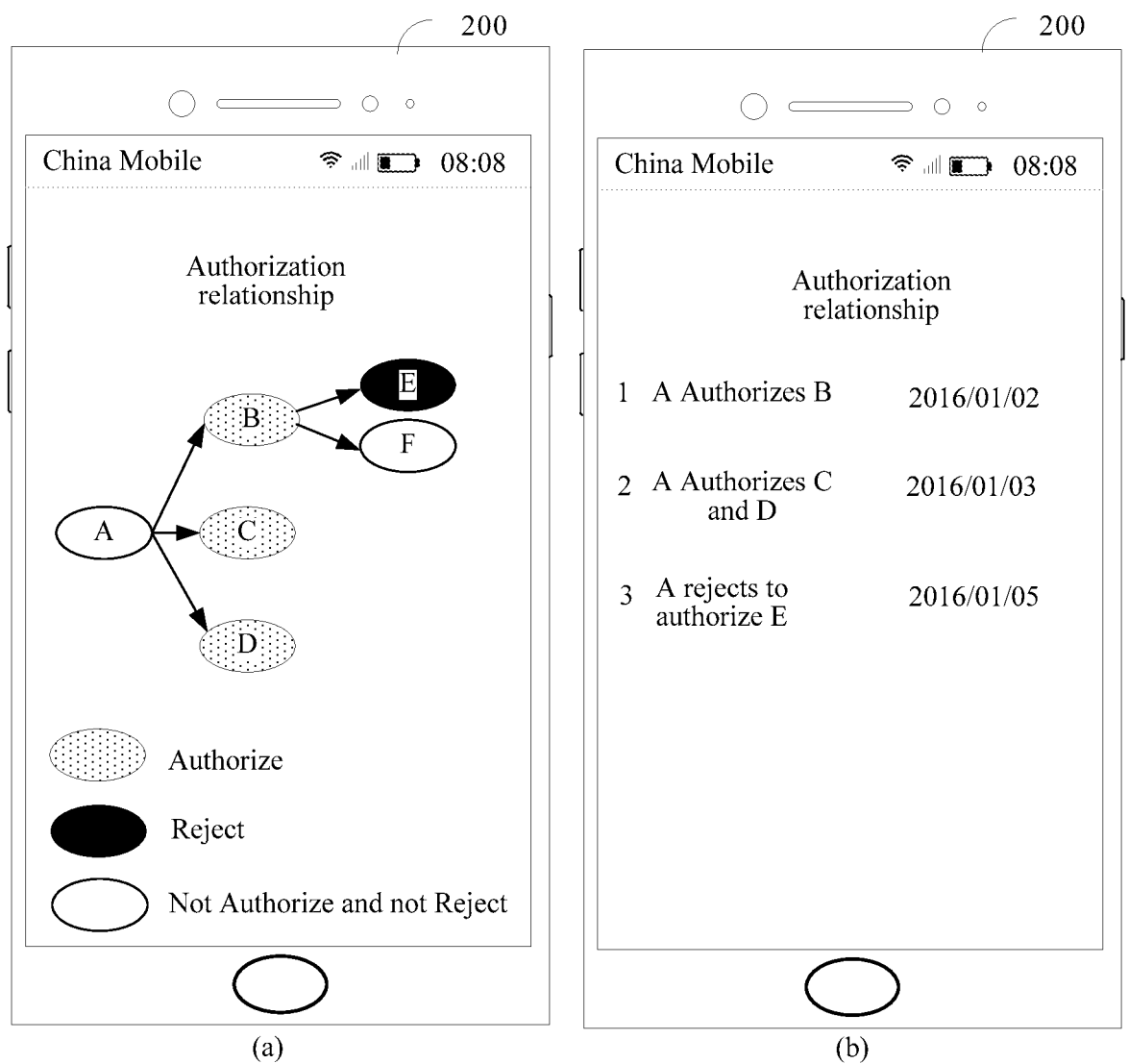
FIG. 23D is a schematic diagram 23 of an example of an interface of a terminal according to an embodiment of this application.
Figure 23E:
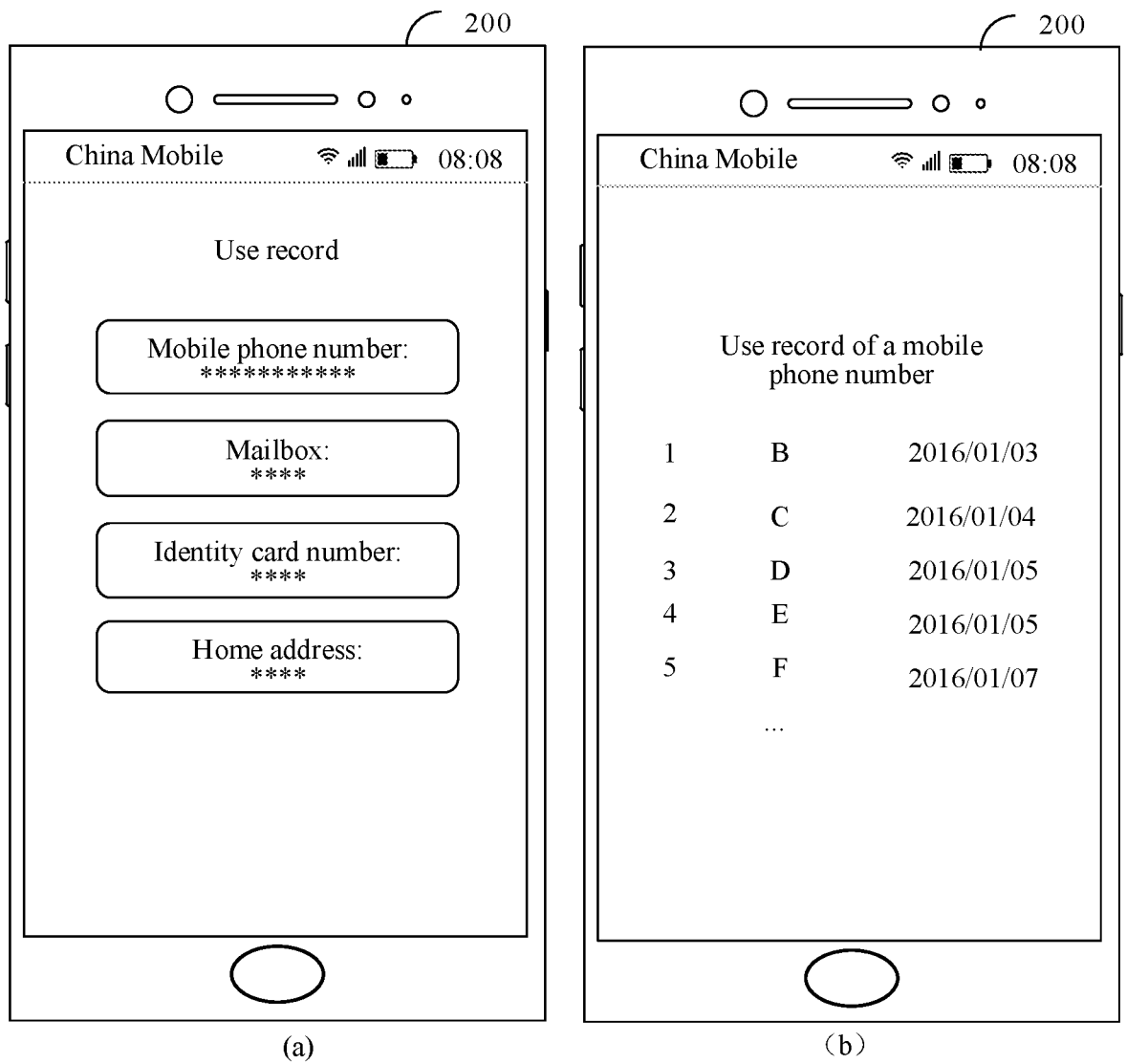
FIG. 23E is a schematic diagram 24 of an example of an interface of a terminal according to an embodiment of this application.

Optionally, the management interface shown in (a) of FIG. 23C further includes a "Use record" option. The "Use record" option is used to trigger the mobile phone 200 to display a record of communicating with the mobile phone 200 by another terminal by using the user account 2. For example, in response to a tap operation performed by the user on the "Use record" option, the mobile phone 200 may display a mobile phone number use record shown in (b) of FIG. 23E.

It may be understood that the mobile phone 200 may store authorization relationships, sharing relationships, and use records of a plurality of information items such as a phone number, a mailbox, an identity card number, and a home address. Therefore, in response to a tap operation performed by the user on the "Authorization relationship" option, the "Sharing relationship" option, or the "Use record" option, the mobile phone 200 displays an interface corresponding to the option selected by the user. The mobile phone 200 may display a selection interface of the information items (the phone number, the mailbox, the identity card number, the home address, and the like), so that the user chooses to view an authorization relationship, a sharing relationship, or a use record corresponding to an information item, and then displays the authorization relationship, the sharing relationship, or the use record corresponding to the information item. For example, the user views a use record. In response to a tap operation performed by the user on the "Use record" option, the mobile phone 200 may display a selection interface of information items shown in (a) of FIG. 23E. Only after the user selects a "Mobile phone number" option, in response to the selection operation performed by the user on the "Mobile phone number" option, the mobile phone 200 displays a mobile phone number use record shown in (b) of FIG. 23E.

Scenario (b): A setting interface of the terminal 2 includes an "Authorization management" option; and in response to an operation performed by the user on the "Authorization management" option, the terminal 2 displays a fourth interface.

Figure 24A:
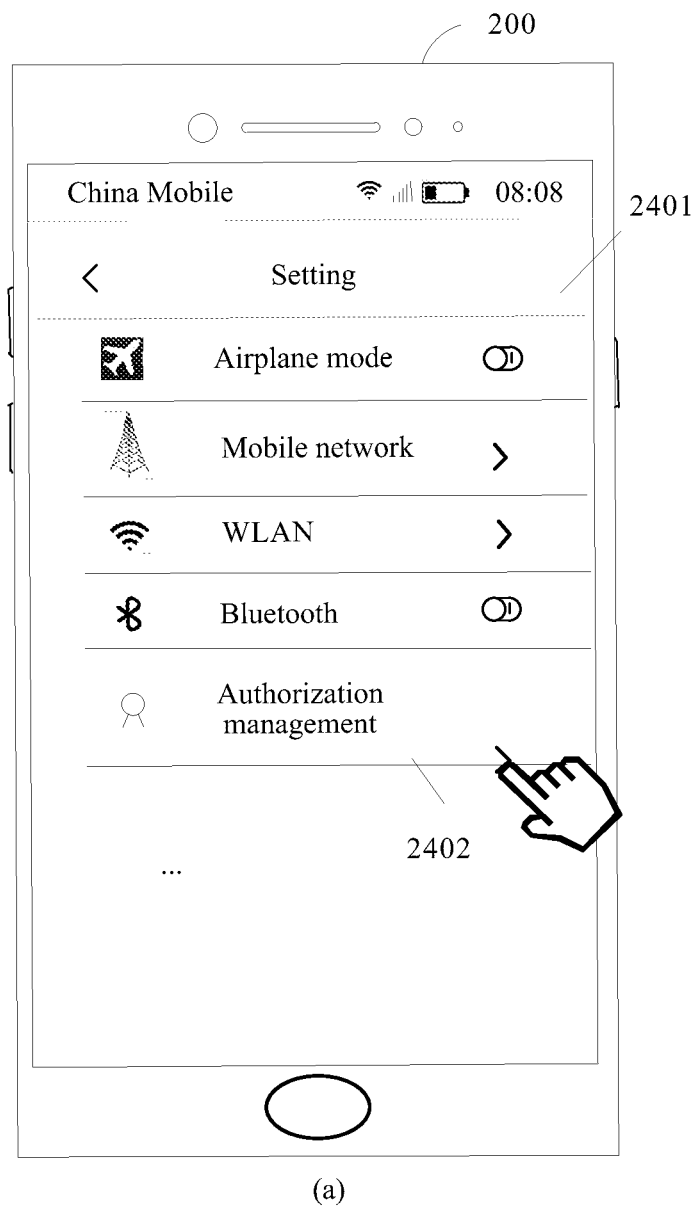
FIG. 24A, FIG. 24B and FIG. 24C are a schematic diagram 25 of an example of an interface of a terminal according to an embodiment of this application.

For example, as shown in (a) of FIG. 24A, a setting interface 2401 of the mobile phone 200 includes an "Authorization management" option 2402. When the user taps the "Authorization management" option 2402, in response to the tap operation performed by the user on the "Authorization management" option 2402, the mobile phone 200 displays the fourth interface.

Scenario (c): An address book interface of the terminal 2 includes an "Authorization management" option; and in response to an operation performed by the user on the "Authorization management" option, the terminal 2 displays a fourth interface.

Figure 24B:
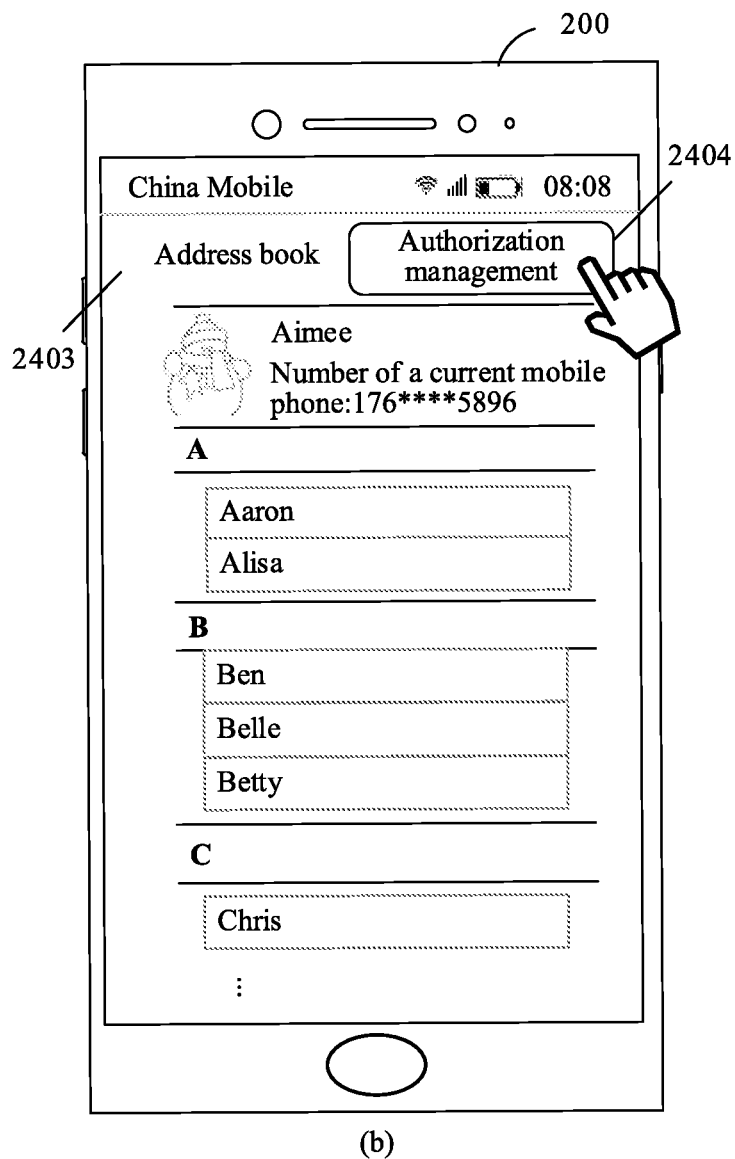

For example, as shown in (b) of FIG. 24B, an address book interface 2403 of the mobile phone 200 includes an "Authorization management" option 2404. When the user taps the "Authorization management" option 2404, in response to the tap operation performed by the user on the "Authorization management" option 2404, the mobile phone 200 displays the fourth interface.

Scenario (d): A drop-down list of the terminal 2 includes an "Authorization management" option; and in response to an operation performed by the user on the "Authorization management" option, the terminal 2 displays a fourth interface.

Figure 24C:
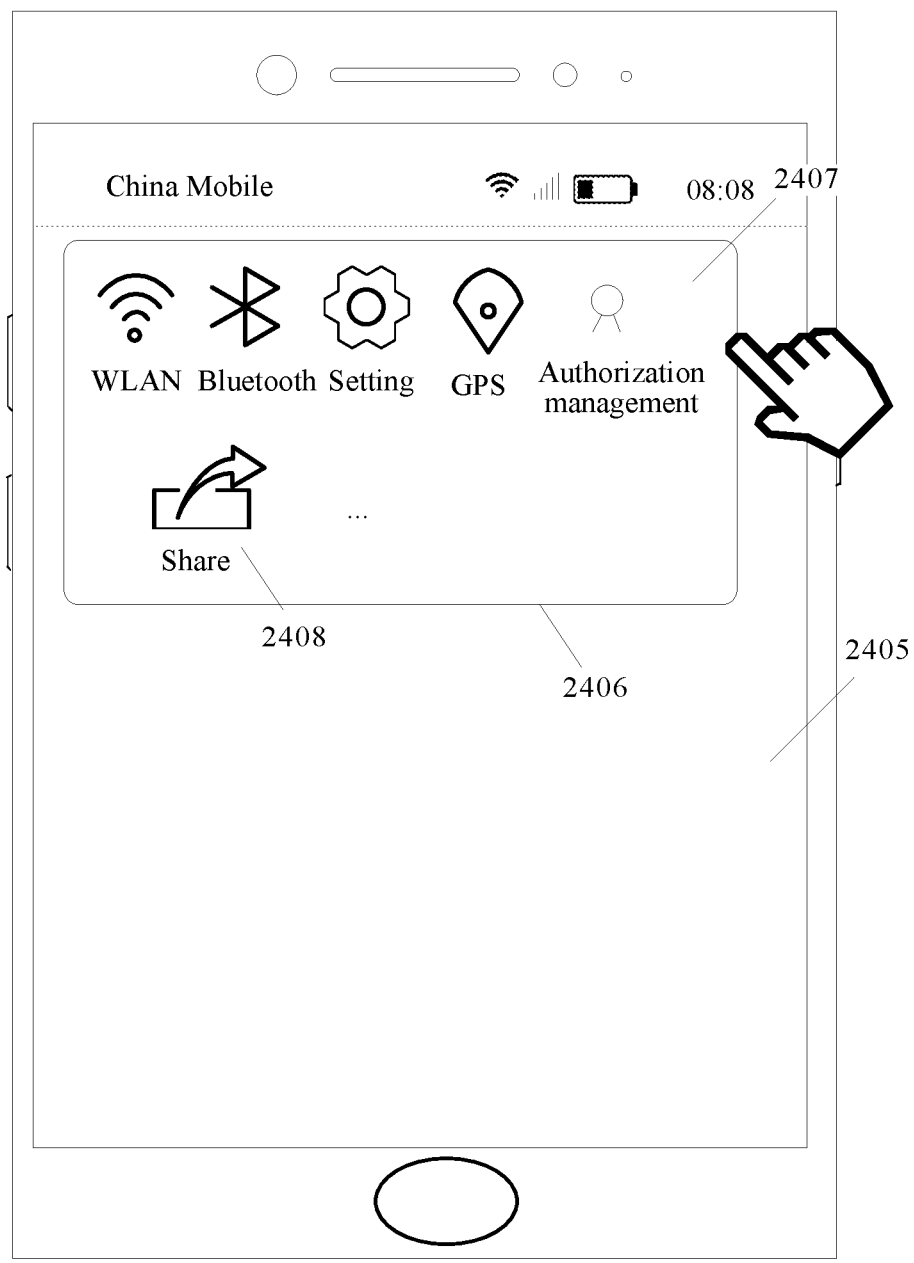

For example, as shown in (c) of FIG. 24C, a drop-down list 2406 of the mobile phone 200 includes an "Authorization management" option 2407. When the user taps the "Authorization management" option 2407, in response to the tap operation performed by the user on the "Authorization management" option 2407, the mobile phone 200 displays the fourth interface.

When the mobile phone 200 displays any interface 2405, in response to an operation of sliding downwards from an upper frame of a touchscreen of the mobile phone 200 by the user on the touchscreen, the mobile phone 200 displays a drop-down list 2406. For example, the interface 2405 may be any one of a lock screen interface, a setting interface, a mobile phone desktop, and an application interface of the mobile phone 200.

Optionally, as shown in (c) of FIG. 24C, the drop-down list 2406 may further include a "Sharing" option 2408, and the "Sharing" option 2408 is used to trigger the mobile phone 200 to push the electronic business card to another terminal.

Scenario (e): A fourth interface is a contact interface of the terminal 2, and the contact interface of the terminal 2 includes an "Authorize" button and a "Reject" button.

Figure 25:
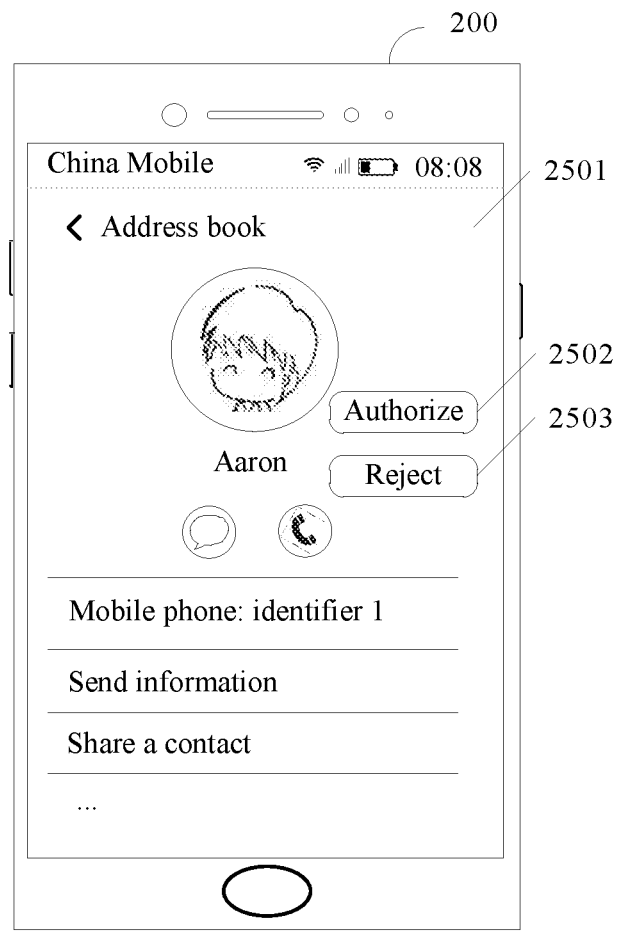
FIG. 25 is a schematic diagram 26 of an example of an interface of a terminal according to an embodiment of this application.

For example, as shown in FIG. 25, a contact interface 2501 of the mobile phone 200 includes an "Authorize" button 2502 and a "Reject" button 2503. In response to a tap operation performed by the user on the "Authorize" button 2502 or the "Reject" button 2503, the mobile phone 200 may set the user account identified by the identifier 1 as an authorized account or a rejected account of the user account 2.

Scenario (f): An "Authorization management" application used to perform authorization management on a user account identified by an identifier stored in the client a may be installed in the terminal 2. A desktop of the terminal 2 displays an icon of the "Authorization management" application. In response to a tap operation performed by the user on the icon of the "Authorization management" application, the terminal 2 displays the fourth interface.

It should be noted that in this embodiment of this application, for the fourth interface in the scenario (e) to the scenario (f), refer to the fourth interface in the scenario (a). Details are not described again in this embodiment of this application. For example, the fourth interface may be the fourth interface 2006 shown in (b) of FIG. 20 or the fourth interface 2012 shown in (c) of FIG. 20.

In addition, in this embodiment of this application, the fourth interface includes but is not limited to the fourth interface shown in any one of FIG. 20 to FIG. 23. In this embodiment of this application, details of other examples of the fourth interface are not described.

It may be understood that after starting to display the fourth interface, if receiving a first selection operation or a second selection operation performed by the user on any identifier, the terminal 2 may store an authorization permission identifier corresponding to the first selection operation performed by the user on the fourth interface and/or an authorization rejection identifier corresponding to the second selection operation performed by the user on the fourth interface; and periodically send an authorization message including the authorization permission identifier and/or the authorization rejection identifier stored by the terminal 2 to the server a. After sending the authorization message, the terminal 2 may delete the identifier (including the authorization identifier and/or the authorization rejection identifier) stored in the terminal 2 and already sent by using the authorization message.

Optionally, in response to the first selection operation or the second selection operation performed by the user on an identifier, the terminal 2 may further send an authorization message (including the identifier corresponding to the first selection operation or the second selection operation) to the server a. In this way, the authorization message received by the server a includes only the identifier.

S1903: The server a receives the authorization message sent by the terminal 2, where the authorization message includes an authorization permission identifier and/or an authorization rejection identifier.

The authorization permission identifier and the authorization rejection identifier are both identifiers stored in the third terminal to identify user accounts, and the authorization permission identifier is different from the authorization rejection identifier. In this embodiment of this application, the authorization permission identifier and the authorization rejection identifier each include one or more identifiers.

S1904: In response to receiving of the authorization message, the server a stores the authorization permission identifier in first authorization information of the user account 2, and stores the authorization rejection identifier in second authorization information of the user account 2.

For example, in this embodiment of this application, the terminal 2 may add different tags to the authorization permission identifier and the authorization rejection identifier, so that the server a can recognize the authorization permission identifier and the authorization rejection identifier from a plurality of identifiers included in the authorization message.

Alternatively, the terminal 2 may add the authorization permission identifier and the authorization rejection identifier to different preset fields of the authorization message. For example, the terminal 2 may add the authorization permission identifier to a first preset field of the authorization message, and add the authorization rejection identifier to a second preset field of the authorization message. In this way, the server a may determine that the identifier included in the first preset field of the authorization message is the authorization permission identifier, and the identifier included in the second preset field of the authorization message is the authorization rejection identifier.

It should be noted that a manner of distinguishing the authorization permission identifier from the authorization rejection identifier by the terminal 2 in the authorization message includes but is not limited to the manner described in the foregoing example. In this embodiment of this application, details of another distinguishing manner are not described.

For example, it is assumed that the authorization message includes the following authorization permission identifiers: the identifier A and the identifier E, the authorization message includes the following authorization rejection identifier: the identifier N, and the server a stores the authorization information table shown in Table 4. In this case, after receiving the authorization message including the authorization permission identifier (the identifier A and the identifier E) and the authorization rejection identifier (the identifier N), the server a may perform S1904, and obtain an authorization information table shown in Table 5:

TABLE 5

Authorization information table

| User account (or an identifier) | First authorization information | Second authorization information |
| --- | --- | --- |
| User account 1 (or an identifier 1) | Identifier A (or a user account A) Identifier B (or a user account B) | Identifier E (or a user account E) |
| User account 2 (or an identifier 2) | Identifier C (or a user account C) Identifier D (or a user account D) Identifier A (or a user account A) Identifier E (or a user account E) | Identifier F (or a user account F) Identifier N (or a user account N) |
| . . . | . . . | . . . |
| User account n (or an identifier n) | Identifier N (or a user account N) | Identifier G (or a user account G) |

As can be learned by comparing Table 4 with Table 5, compared with Table 4, the authorization permission identifiers: the identifier A and the identifier E in the authorization message are added to the first authorization information of the user account 2 shown in Table 5; and the authorization rejection identifier: the identifier N in the authorization message is added to the second authorization information of the user account 2 shown in Table 5.

It may be understood that the user not only may add an authorized account and a rejected account for the user account a, but also may modify an authorized account of the user account a to a rejected account and modify a rejected account of the user account a to an authorized account. Based on this, as shown in FIG. 19, after S1904, the method in this embodiment of this application may include S2101 and S2102:

S2101: When the first authorization information of the user account 2 includes the authorization rejection identifier, the server deletes the authorization rejection identifier from the first authorization information of the user account 2.

S2102: When the second authorization information of the user account 2 includes the authorization permission identifier, the server deletes the authorization permission identifier from the second authorization information of the user account 2.

For example, it is assumed that in addition to the authorization permission identifiers—the identifier A and the identifier E, the authorization message further includes an authorization permission identifier—the identifier F, and in addition to the authorization rejection identifier—the identifier N, the authorization message further includes the identifier C. In this case, after performing S1904, the server a may obtain an authorization information table shown in Table 6:

TABLE 6

Authorization information table

| User account (or an identifier) | First authorization information | Second authorization information |
| --- | --- | --- |
| User account 1 (or an identifier 1) | Identifier A (or a user account A) Identifier B (or a user account B) | Identifier E (or a user account E) |
| User account 2 (or an identifier 2) | Identifier C (or a user account C) Identifier D (or a user account D) Identifier A (or a user account A) Identifier E (or a user account E) Identifier F (or a user account F) | Identifier F (or a user account F) Identifier N (or a user account N) Identifier C (or a user account C) |
| . . . | . . . | . . . |
| User account n (or an identifier n) | Identifier N (or a user account N) | Identifier G (or a user account G) |

It may be understood that a user account (for example, the user account C or the user account F shown in Table 6) cannot be both an authorized account and a rejected account of the user account 2. Therefore, the server may perform S2101 and S2102. Because the first authorization information of the user account 2 includes the authorization rejection identifier—the identifier C, and the second authorization information of the user account 2 includes the authorization permission identifier—the identifier F, the server a may delete the authorization rejection identifier—the identifier C from the first authorization information of the user account 2 (perform S2101), and delete the authorization permission identifier—the identifier F from the second authorization information of the user account 2 (perform S2102), to obtain an authorization information table shown in Table 7:

TABLE 7

Authorization information table

| User account (or an identifier) | First authorization information | Second authorization information |
| --- | --- | --- |
| User account 1 (or an identifier 1) | Identifier A (or a user account A) Identifier B (or a user account B) | Identifier E (or a user account E) |
| User account 2 (or an identifier 2) | Identifier D (or a user account D) Identifier A (or a user account A) | Identifier N (or a user account N) Identifier C (or a user account C) |

TABLE 7-continued

Authorization information table

| User account (or an identifier) | First authorization information | Second authorization information |
|---|---|---|
| | Identifier E (or a user account E) | |
| | Identifier F (or a user account F) | |
| ... | ... | ... |
| User account n (or an identifier n) | Identifier N (or a user account N) | Identifier G (or a user account G) |

In the communication method provided in this embodiment of this application, the terminal corresponding to the electronic business card is less possible to receive harassment information or a harassment call, and the terminal may further display the fourth interface, so that the user may perform, on the fourth interface at any time in batches, authorization management on permission of communicating with the user account corresponding to the terminal by using a contact account (that is, another user account), so that the terminal can be less possible to receive harassment information or a harassment call.

It should be noted that in this embodiment of this application, interaction among the terminal X, the terminal 1, and the terminal 2 is only used to describe the method in this embodiment of this application, instead of limiting a function of each terminal. In this embodiment of this application, each terminal may be configured to perform the steps of the method that are performed by another terminal, to communicate with another device (for example, another terminal or the server a). For example, the terminal X has all functions of performing the steps of the related method by the terminal 1 and the terminal 2 in the foregoing embodiment, the terminal 1 has all functions of performing the steps of the related method by the terminal X and the terminal 2 in the foregoing embodiment, and the terminal 2 has all functions of performing the steps of the related method by the terminal X and the terminal 1 in the foregoing embodiment.

It may be understood that the terminals (the terminal X, the terminal 1, the terminal 2, and the terminal 3), the server, and the like are configured to perform the foregoing functions, and include corresponding hardware structures and/or software modules performing the functions. A person skilled in the art should easily be aware that, in combination with the examples described in the embodiments disclosed in this specification, units, algorithms, and steps may be implemented by hardware or a combination of hardware and computer software in the embodiments of this application. Whether a function is implemented by hardware or in a manner of driving hardware by a computer software depends on a particular application and a design constraint condition of the technical solution. For specific applications, a person skilled in the art may use different methods to implement the described functions; however, this implementation should not be construed as going beyond the scope of the embodiments of this application.

In the embodiments of this application, the terminal, the server, and the like may be divided into functional modules based on the foregoing method examples. For example, various functional modules corresponding to various functions may be obtained through division, or two or more functions may be integrated into one processing module. The integrated module may be implemented in a form of hardware, or may be implemented in a form of a functional module of software. It should be noted that module division in the embodiments of this application is an example and is merely logical function division. During actual implementation, there may be another division manner.

Figure 26:
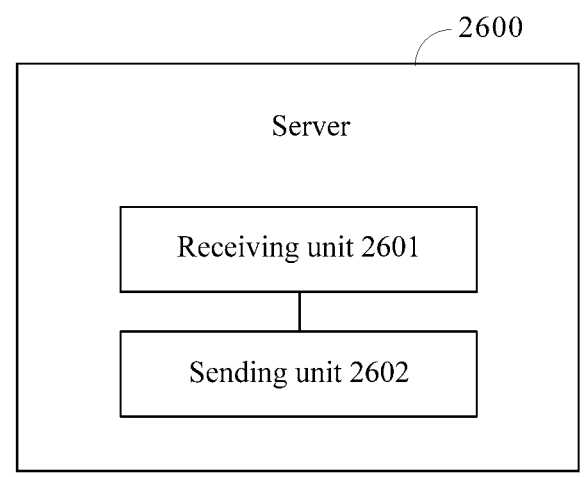
FIG. 26 is a schematic structural composition diagram 1 of a server according to an embodiment of this application.

When various functional modules are divided based on various corresponding functions, as shown in FIG. 26, an embodiment of this application provides a server 2600. The server 2600 includes a receiving unit 2601 and a sending unit 2602.

The receiving unit 2601 is configured to support the server 2600 in performing S301b2, S301g, S1503, S1705, S1709, and S1903 in the foregoing method embodiment, and/or is configured to perform another technical process described in this specification.

The sending unit 2602 is configured to support the server 2600 in performing S301c2, S301f, S1602, S1701, and S1706 in the foregoing method embodiment, and/or is configured to perform another technical process described in this specification.

Further, the server 2600 may further include: a storage unit.

Further, the server 2600 may further include a query unit and a communication service unit.

The query unit is configured to support the server 2600 in performing S301d, S1504, and S1601 in the foregoing method embodiment, and/or is configured to perform another technical process described in this specification.

The communication service unit is configured to support the server 2600 in performing S1505 in the foregoing method embodiment, and/or is configured to perform another technical process described in this specification.

Further, the server 2600 may further include a deletion unit. The deletion unit 2602 is configured to support the server 2600 in performing S2101 and S2102 in the foregoing method embodiment, and/or is configured to perform another technical process described in this specification.

Certainly, the server 2600 includes but is not limited to the units and the modules listed above. In addition, functions that can be specifically performed by the functional units also include but are not limited to the functions corresponding to the steps of the method in the foregoing example. For detailed descriptions of another unit of the server 2600, refer to detailed descriptions of the steps of the corresponding method thereof. Details are not described herein again in this embodiment of this application.

When an integrated unit is used, the deletion unit, the query unit, and the like may be integrated in a processing module for implementation, the receiving unit 2601, the sending unit 2602, and the communication service unit may be an RF circuit of the terminal, and the storage unit may be a storage module of the terminal.

Figure 27:
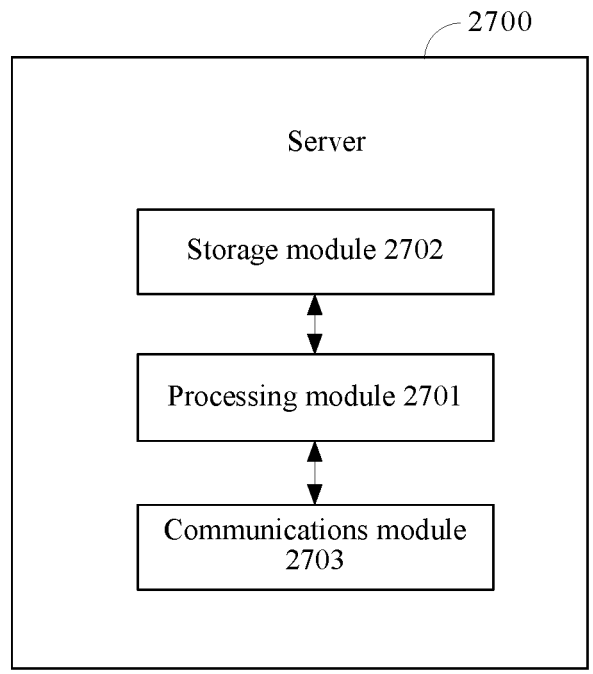
FIG. 27 is a schematic structural composition diagram 2 of a server according to an embodiment of this application.

FIG. 27 is a possible schematic structural diagram of the server in the foregoing embodiments. A server 2700 includes a processing module 2701, a storage module 2702, and a communications module 2703.

The processing module 2701 is configured to control and manage the server 2700. The storage module 2702 is configured to store program code and data of the server 2700. The communications module 2703 is configured to communicate with another device. For example, the communications module is configured to receive a message or send a message to a terminal.

The processing module 2701 may be a processor or a controller, for example, a CPU, a general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The processing module 2701 may implement or execute various example logical blocks, modules, and circuits described with reference to content disclosed in this application. The processor may be a combination for implementing a computing function, for example, a combination of one or more microprocessors or a combination of the DSP and a microprocessor. The communications module 2703 may be a transceiver, a transceiver circuit, a communications interface, or the like. The storage module 2702 may be a memory.

Figure 28:
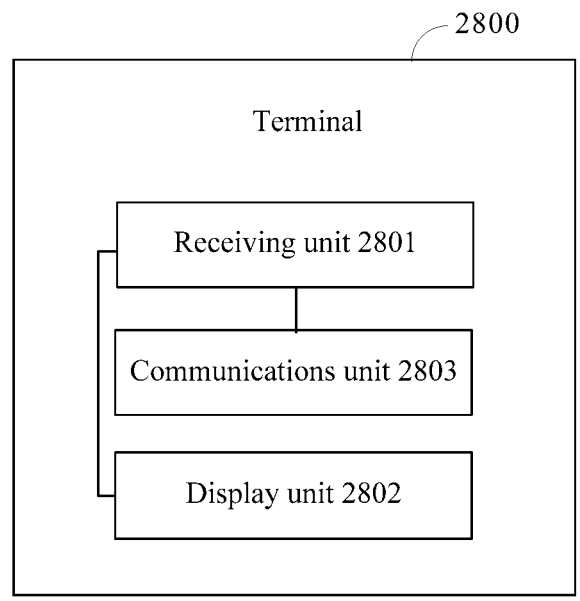
FIG. 28 is a schematic structural composition diagram 1 of a terminal according to an embodiment of this application.

When various functional modules are divided based on various corresponding functions, as shown in FIG. 28, an embodiment of this application provides a terminal 2800. The terminal 2800 is integrated with functions of all terminals (including the terminal X, the terminal 1, the terminal 2, the terminal 3, the first terminal, the second terminal, the third terminal, and the like) in the embodiments of this application. The terminal 2800 includes a receiving unit 2801, a display unit 2802, and a communications unit 2803.

The receiving unit 2801 is configured to support the terminal 2800 in performing S302, S302a, S301g, S302b, S1603, and S1702 in the foregoing method embodiment, and/or is configured to perform another technical process described in this specification.

The display unit 2802 is configured to support the server 2800 in performing S1501, S1703, S1901, S2001, and S2002 in the foregoing method embodiment, and/or is configured to perform another technical process described in this specification.

The communications unit 2803 is configured to support the terminal 2800 in performing voice communication with another terminal, and/or is configured to perform another technical process described in this specification.

The communications unit 2803 cannot directly communicate, based on the first identifier, with a terminal of the user corresponding to the first user account, and instead, obtains the first user account based on the first identifier, to communicate with the terminal of the user corresponding to the first user account.

Further, the terminal 2800 further includes a storage unit, a sending unit, a prompt unit, and the like. The storage unit is configured to support the terminal 2800 in performing S303 in the foregoing method embodiment, and/or is configured to perform another technical process described in this specification. The sending unit is configured to support the terminal 2800 in performing S301, S301a1, S301a2, S1502, S1704, S1708, and S1902 in the foregoing method embodiment, and/or is configured to perform another technical process described in this specification. The prompt unit is configured to support the terminal 2800 in performing S301h and S1604 in the foregoing method embodiment, and/or is configured to perform another technical process described in this specification.

It should be noted that in this embodiment of this application, that the receiving unit performs S302, S302a, S301g, S302b, S1603, and S1702 is only used to illustrate that the terminal 2800 has a capability of receiving related information sent by another device (for example, the server 2600 or another terminal); and that the sending unit performs S301, S301a1, S301a2, S1502, S1704, S1708, and S1902 is only used to illustrate that the terminal 2800 has a capability of sending related information to another device (for example, the server 2600 or another terminal).

If "a transmit end device of some steps of the method performed by the receiving unit" is the same as "an execution body of some steps of the method performed by the sending unit", or "a receive end device of some steps of the method performed by the sending unit 2803" is the same as "an execution body of some steps of the method performed by the receiving unit", it is understood that the receiving unit 2801 of the terminal 2800 has a capability of receiving related information sent by another device in the steps of the method, and the sending unit 2803 has a capability of sending related information to another device in the steps of the method.

Further, the terminal 2800 may further include: a deletion unit. The deletion unit is configured to: after a voice communications unit establishes a communication connection to another terminal by using a user account and starts communication, or after communication ends, support the terminal 2800 in deleting the user account in a client a of the terminal 2800, and/or is configured to perform another technical process described in this specification.

When an integrated unit is used, the prompt unit, the voice communication unit, the deletion unit, and the like may be integrated in a processing module for implementation, the receiving unit 2801 and the sending unit 2803 may be an RF circuit, a Wi-Fi module, or a Bluetooth module of the terminal, the storage unit 2802 may be a storage module of the terminal, and the display unit 2802 may be a display module such as a display (a touchscreen).

Figure 29:
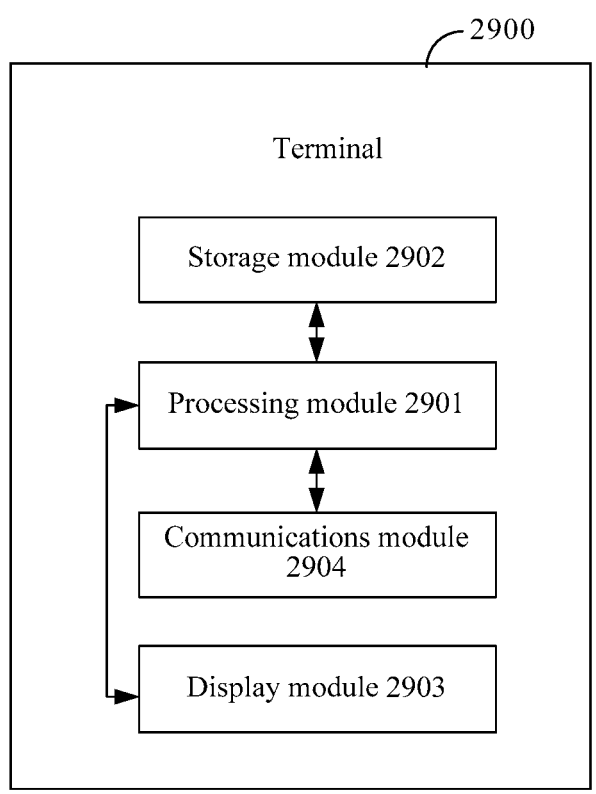
FIG. 29 is a schematic structural composition diagram 2 of a terminal according to an embodiment of this application.

FIG. 29 shows a possible schematic structural diagram of the device in the foregoing embodiments. The terminal 2900 includes a processing module 2901, a storage module 2902, a display module 2903, and a communications module 2904.

The processing module 2901 is configured to control and manage the terminal 2900. The display module 2903 is configured to display an image generated by the processing module 2901. The storage module 2902 is configured to store program code and data of the terminal 2900. The communications module 2704 is configured to communicate with another device. For example, the communications module 2904 is configured to receive a message or an electronic business card or send a message or an electronic business card to a terminal.

The processing module 2901 may be a processor or a controller, for example, may be a CPU, a general purpose processor, a DSP, an ASIC, an FPGA, or another programmable logic device, a transistor logic device, a hardware component, or any combination thereof. The processing module 2901 may implement or execute various example logical blocks, modules, and circuits described with reference to content disclosed in this application. The processor may be a combination for implementing a computing function, for example, a combination of one or more microprocessors or a combination of the DSP and a microprocessor. The communications module 2904 may be a transceiver, a transceiver circuit, a communications interface, or the like. The storage module 2902 may be a memory.

When the processing module 2901 is a processor (the processor 120 shown in FIG. 1), the communications module 2904 is an RF circuit (the radio frequency circuit 140 shown in FIG. 1), the storage module 2902 is a memory (the memory 130 shown in FIG. 1), and the display module 2903 is a touchscreen (including the touch panel 152 and the display panel 151 shown in FIG. 1), the device provided in this application may be the mobile phone 100 shown in FIG. 1. The communications module 2904 not only may include an RF circuit, but also may include a Wi-Fi module and a Bluetooth module. Communications module such as an RF circuit, a Wi-Fi module, and a Bluetooth module may be collectively referred to as a communications interface. The processor, the communications interface, the touchscreen, and the memory may be coupled by using a bus.

An embodiment of this application further provides a control device, including a processor and a memory. The memory is configured to store computer program code, the computer program code includes a computer instruction, and when executing the computer instruction, the processor performs the communication method in the foregoing method embodiment.

An embodiment of this application further provides a computer storage medium. The computer storage medium stores computer program code. When the foregoing processor executes the computer program code, the device performs the steps of the related method in any one of FIG. 3, FIG. 5, FIG. 12, FIG. 15A and FIG. 15B, and FIG. 19 to perform the method in the foregoing embodiments.

An embodiment of this application further provides a computer program product. When the computer program product runs on a computer, the computer is caused to perform the steps of the related method in any one of FIG. 3, FIG. 5, FIG. 12, FIG. 15A and FIG. 15B, and FIG. 19 to perform the method in the foregoing embodiments.

The server 2600, the server 2700, the terminal 2800, the terminal 2900, the computer storage medium, or the computer program product provided in this application are all configured to perform the corresponding method provided above. Therefore, for beneficial effects thereof, refer to the beneficial effects of the corresponding method provided above, and details are not described herein again.

The foregoing descriptions about implementations allow a person skilled in the art to clearly understand that, for the purpose of convenient and brief description, division of the foregoing function modules is used as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in other manners. For example, the described apparatus embodiment is only an example. For example, the module or unit division is only logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, a network device, or the like) or a processor to perform all or some of the steps of the methods described in the embodiments of this application. The foregoing storage medium includes: any medium that can store program code, such as a flash memory, a removable hard disk, a read-only memory, a random access memory, a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, the method comprising:
   receiving, by a first terminal, a first electronic business card sent by a second terminal, wherein the first electronic business card is an electronic business card of a user corresponding to a client of a third terminal or a client of the second terminal; and
   displaying, by the first terminal, a first identifier based on the first electronic business card, wherein displaying the first identifiers includes not displaying a first user account, wherein the first user account is an account of the user corresponding to the first electronic business card, and wherein the first identifier is used to identify the first user account,
   wherein the first terminal cannot directly communicate, based on the first identifier, with a terminal of the user corresponding to the first user account, and wherein the first terminal obtains the first user account based on the first identifier to communicate with the terminal of the user corresponding to the first user account.

2. The method according to claim 1, wherein after the displaying, by the first terminal, a first identifier based on the first electronic business card, the method further comprises:
   sending, by the first terminal, a first communication message to a server; and
   displaying a second interface in response to an operation performed by a user on a first interface comprising the first identifier;
   wherein the first communication message comprises the first identifier, wherein the first communication message is used to request to communicate with the terminal of the user corresponding to the first user account identified by the first identifier, wherein the second interface is an interface on which the first terminal requests to communicate with the terminal of the user corresponding to the first user account, and wherein the first communication message comprises one of an instant messaging message, an email, or a voice call request.

3. The method according to claim 2, wherein the first communication message is a voice call request, wherein the first communication message further comprises a second identifier, wherein the second identifier is used to identify a second user account, wherein the second user account is an account of a user corresponding to a client of the first terminal, and wherein the first identifier is different from the second identifier; and wherein after the sending, by the first terminal, a first communication message to a server, and displaying a second interface in response to an operation performed by a user on a first interface comprising the first identifier, the method further comprises:

receiving, by the first terminal, the first user account sent by the server, wherein the first user account is not displayed to a user on the first terminal, wherein the first user account is sent by the server when the second user account identified by the second identifier is an authorized account of the first user account, and wherein a terminal of a user corresponding to the authorized account of the first user account has permission of communicating with the terminal of the user corresponding to the first user account; and requesting, by the first terminal in response to receiving of the first user account and based on the first user account, to perform voice communication with the terminal of the user corresponding to the first user account.

4. The method according to claim 3, wherein, after the requesting, by the first terminal in response to receiving of the first user account and based on the first user account, to perform voice communication with the terminal of the user corresponding to the first user account, the method further comprises:

deleting, by the first terminal, the first user account.

5. The method according to claim 2, wherein the first communication message further comprises a second identifier, wherein the second identifier is used to identify a second user account, wherein the second user account is the account of the user corresponding to the client of the first terminal, and wherein the first identifier is different from the second identifier; and wherein after the sending, by the first terminal, a first communication message to a server, and displaying a second interface in response to an operation performed by a user on a first interface comprising the first identifier, the method further comprises:

receiving, by the first terminal, a communication failure message sent by the server, wherein the communication failure message is used to indicate that communication between the first terminal and the terminal of the user corresponding to the first user account fails, wherein the communication failure message is sent by the server when the second user account identified by the second identifier is a rejected account of the first user account, and wherein a terminal of a user corresponding to the rejected account of the first user account has no permission of communicating with the terminal of the user corresponding to the first user account; and sending, by the first terminal, first prompt information in response to receiving of the communication failure message, wherein the first prompt information is used to indicate that the communication between the first terminal and the terminal of the user corresponding to the first user account fails.

6. The method according to claim 1, wherein the method further comprises:

receiving, by the first terminal, an authorization request sent by a server, wherein the authorization request comprises a third identifier, wherein the authorization request is used to confirm with the first terminal whether to determine a user account identified by the third identifier as an authorized account of a second user account, wherein the second user account is the account of the user corresponding to the client on the first terminal, and wherein a terminal of a user corresponding to the authorized account of the second user account has permission of communicating with the first terminal;

in response to receiving the authorization request, displaying, by the first terminal, a third interface comprising an authorization acceptance option and an authorization rejection option;

in response to a selection operation performed by the user on the authorization acceptance option on the third interface, sending, by the first terminal, a first authorization response to the server, wherein the first authorization response indicates that the first terminal allows determining the user account identified by the third identifier as the authorized account of the second user account; and in response to a selection operation performed by the user on the authorization rejection option on the third interface, sending, by the first terminal, a second authorization response to the server, wherein the second authorization response indicates that the first terminal rejects to determine the user account identified by the third identifier as the authorized account of the second user account.

7. The method according to claim 1, wherein the method further comprises:

receiving, by the first terminal, a first notification message sent by a server, wherein the first notification message comprises a fourth identifier, wherein the first notification message is used to indicate that a second identifier is pushed to a terminal of a user corresponding to a user account identified by the fourth identifier, wherein the second identifier is used to identify a second user account, wherein the second user account is the account of the user corresponding to the client on the first terminal, and wherein the second identifier is different from the fourth identifier; and sending, by the first terminal, second prompt information in response to receiving of the first notification message, wherein the second prompt information is used to indicate that the second identifier is pushed to the terminal of the user corresponding to the user account identified by the fourth identifier.

8. The method according to claim 1, wherein the method further comprises:

displaying, by the first terminal, a fourth interface, wherein the fourth interface comprises a plurality of identifiers stored in the first terminal, and wherein each identifier is used to identify a user account; and in response to at least one of a first selection operation performed by the user on some of the plurality of identifiers or a second selection operation performed by the user on some of the plurality of identifiers, sending, by the first terminal, an authorization message to a server, wherein the authorization message comprises at least one of an authorization permission identifier or an authorization rejection identifier, wherein the authorization permission identifier comprises an identifier that is of the plurality of identifiers and that corresponds to the first selection operation, wherein the authorization rejection identifier comprises an identifier that is of the plurality of identifiers and that corresponds to the second selection operation, and wherein the authorization permission identifier is different from the authorization rejection identifier.

9. The method according to claim 8, wherein the method further comprises:
in response to the first selection operation, displaying, by the first terminal on the fourth interface in a first preset manner, the identifier corresponding to the first selection operation; and
in response to the second selection operation, displaying, by the first terminal on the fourth interface in a second preset manner, the identifier corresponding to the second selection operation,
wherein the first preset manner is different from the second preset manner.

10. The method according to claim 1, wherein the method further comprises:
in response to a pushing operation performed by the user on a fifth interface comprising a second identifier, sending, by the first terminal, a second electronic business card comprising the second identifier to the second terminal, wherein the second identifier is used to identify a second user account, and wherein the second user account is the account of the user corresponding to the client on the first terminal.

11. A communication method, the method comprising:
receiving, by a server, a business card push message sent by a second terminal, wherein the business card push message is used to request to push a first electronic business card to a first terminal, wherein the first electronic business card comprises a first identifier, wherein the first identifier is used to identify a first user account, wherein the first electronic business card is an electronic business card of a user corresponding to a client of a third terminal or a client of the second terminal, and wherein the first user account is an account of the user corresponding to the first electronic business card; and
sending, by the server, the first electronic business card to the first terminal in response to receiving of the business card push message;
wherein the first terminal cannot directly communicate, based on the first identifier, with a terminal of the user corresponding to the first user account, and wherein the first terminal obtains the first user account based on the first identifier to communicate with the terminal of the user corresponding to the first user account.

12. The method according to claim 11, wherein the business card push message further comprises a second identifier, wherein the second identifier is used to identify a second user account, wherein the second user account is an account of a user corresponding to a client of the first terminal, and wherein the first identifier is different from the second identifier; and wherein the method further comprises:
in response to receiving of the business card push message, when the first electronic business card is an electronic business card of the user corresponding to the client on the second terminal, storing, by the server, the second identifier in first authorization information of the first user account,
wherein the server stores first authorization information of a plurality of user accounts, wherein the first authorization information of the first user account comprises a plurality of authorization identifiers, wherein each authorization identifier is used to identify an authorized account of the first user account, and wherein a terminal of a user corresponding to the authorized account has permission of communicating with the terminal of the user corresponding to the first user account.

13. The method according to claim 12, wherein the method further comprises:
in response to receiving the business card push message, when the first electronic business card is the electronic business card of the user corresponding to the client on the third terminal, sending, by the server, a first notification message or an authorization request to the third terminal,
wherein the first notification message comprises the second identifier, wherein the first notification message is used to indicate that the first identifier is pushed to the terminal of the user corresponding to the user account identified by the second identifier, wherein the authorization request comprises the second identifier, and wherein the authorization request is used to confirm with the third terminal whether to determine the user account identified by the second identifier as an authorized account.

14. The method according to claim 11, wherein after the sending, by the server, the first electronic business card to the first terminal in response to receiving of the business card push message, the method further comprises:
receiving, by the server, a first communication message sent by the first terminal, wherein the first communication message comprises the first identifier, wherein the first communication message is used to request to communicate with the terminal of the user corresponding to the first user account identified by the first identifier, wherein the first communication message further comprises a second identifier, wherein the second identifier is used to identify a second user account, and wherein the second user account is the account of the user corresponding to the client of the first terminal;
querying, by the server, a first authorization information of the first user account identified by the first identifier, to determine whether the second user account identified by the second identifier is an authorized account of the first user account, wherein the first authorization information comprises a plurality of authorization identifiers, wherein each authorization identifier is used to identify an authorized account of the first user account, and wherein a terminal of a user corresponding to the authorized account has permission of communicating with the terminal of the user corresponding to the first user account;
when the second user account is an authorized account of the first user account, obtaining, by the server, the first user account based on the first identifier; and
providing, for the first terminal and based on the first user account, a service of communicating with the terminal of the user corresponding to the first user account.

15. The method according to claim 14, wherein the server further stores second authorization information of a plurality of user accounts, wherein second authorization information of the first user account comprises a plurality of rejection identifiers, wherein each rejection identifier is used to identify a rejected account of the first user account, and wherein a terminal of a user corresponding to the rejected account has no permission of communicating with the terminal of the user corresponding to the first user account; and wherein the method further comprises:
  when the second user account is not an authorized account of the first user account, querying the second authorization information of the first user account to determine whether the second user account is a rejected account of the first user account;
  when the second user account is not a rejected account of the first user account, sending, by the server, an authorization request to the terminal of the user corresponding to the first user account, wherein the authorization request comprises the second identifier, and wherein the authorization request is used to confirm with the terminal of the user corresponding to the first user account whether to determine the second user account as an authorized account;
  receiving, by the server, a first authorization response sent by the terminal of the user corresponding to the first user account, wherein the first authorization response indicates that the terminal of the user corresponding to the first user account allows determining the second user account as an authorized account;
  in response to receiving the first authorization response, obtaining, by the server, the first user account based on the first identifier; and
  providing, for the first terminal based on the first user account, the service of communicating with the terminal of the user corresponding to the first user account.

16. The method according to claim 15, wherein the method further comprises:
  in response to receiving the first authorization response, storing, by the server, the second identifier in the first authorization information of the first user account.

17. The method according to claim 15, wherein the method further comprises:
  receiving, by the server, a second authorization response sent by the terminal of the user corresponding to the first user account, wherein the second authorization response indicates that the terminal of the user corresponding to the first user account rejects to determine the second user account as an authorized account; and
  in response to receiving the second authorization response, sending, by the server, a communication failure message to the first terminal, wherein the communication failure message is used to indicate that communication between the first terminal and the terminal of the user corresponding to the first user account fails.

18. The method according to claim 17, wherein the method further comprises:
  in response to receiving the second authorization response, storing, by the server, the second identifier in the second authorization information of the first user account.

19. The method according to claim 15, wherein the method further comprises:
  when the second user account is a rejected account of the first user account, sending, by the server, a communication failure message to the first terminal, wherein the communication failure message is used to indicate that the communication between the first terminal and the terminal of the user corresponding to the first user account fails.

20. The method according to claim 11, wherein the method further comprises:
  receiving, by the server, an authorization message sent by the third terminal, wherein the authorization message comprises at least one of an authorization permission identifier an authorization rejection identifier, wherein both the authorization permission identifier and the authorization rejection identifier are identifiers stored in the third terminal to identify user accounts, and wherein the authorization permission identifier is different from the authorization rejection identifier;
  in response to receiving of the authorization message, storing, by the server, the authorization permission identifier in first authorization information of an account of the user corresponding to the client on the third terminal; and
  storing the authorization rejection identifier in second authorization information of the account of the user corresponding to the client on the third terminal.

* * * * *

UNITED STATES PATENT AND TRADEMARK OFFICE
CERTIFICATE OF CORRECTION

| | | |
|---|---|---|
| PATENT NO. | : 11,337,060 B2 | Page 1 of 1 |
| APPLICATION NO. | : 16/479670 | |
| DATED | : May 17, 2022 | |
| INVENTOR(S) | : Zhe Wang | |

It is certified that error appears in the above-identified patent and that said Letters Patent is hereby corrected as shown below:

In the Claims

In Column 72 Line 28 In Claim 20, delete "identifier an" and insert -- identifier or an --.

Signed and Sealed this
Twenty-fifth Day of October, 2022

Katherine Kelly Vidal
*Director of the United States Patent and Trademark Office*